(12) United States Patent
Tang et al.

(10) Patent No.: US 11,391,928 B2
(45) Date of Patent: Jul. 19, 2022

(54) OPTICAL IMAGE LENS ASSEMBLY, IMAGE CAPTURING UNIT AND ELECTRONIC DEVICE

(71) Applicant: LARGAN PRECISION CO., LTD., Taichung (TW)

(72) Inventors: Hsiang-Chi Tang, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 81 days.

(21) Appl. No.: 17/094,558

(22) Filed: Nov. 10, 2020

(65) Prior Publication Data

US 2022/0050274 A1 Feb. 17, 2022

Related U.S. Application Data

(60) Provisional application No. 63/066,126, filed on Aug. 14, 2020.

(51) Int. Cl.
| | |
|---|---|
| *G02B 13/00* | (2006.01) |
| *G02B 9/62* | (2006.01) |
| *H04N 5/225* | (2006.01) |
| *H04N 5/247* | (2006.01) |
| *G03B 30/00* | (2021.01) |

(52) U.S. Cl.
CPC ........ *G02B 13/0045* (2013.01); *G02B 9/62* (2013.01); *G03B 30/00* (2021.01); *H04N 5/2253* (2013.01); *H04N 5/247* (2013.01)

(58) Field of Classification Search
CPC ...... G02B 13/0045; G02B 9/62; G03B 30/00; H04N 5/2253; H04N 5/247
See application file for complete search history.

(56) References Cited

U.S. PATENT DOCUMENTS

| | | | |
|---|---|---|---|
| 2,596,799 | A | 5/1952 | Tillyer et al. |
| 5,007,719 | A | 4/1991 | Hasegawa |
| 5,694,244 | A | 12/1997 | Abe et al. |
| 5,828,498 | A | 10/1998 | Sekiya et al. |
| 8,885,268 | B2 | 11/2014 | Tang et al. |

(Continued)

FOREIGN PATENT DOCUMENTS

| | | |
|---|---|---|
| CN | 106772955 A | 5/2017 |
| CN | 206684370 U | 11/2017 |

(Continued)

*Primary Examiner* — Sinh Tran
*Assistant Examiner* — Zhenzhen Wu
(74) *Attorney, Agent, or Firm* — Maschoff Brennan

(57) ABSTRACT

An optical image lens assembly includes six lens elements which are, in order from an object side to an image side along an optical path: a first lens element, a second lens element, a third lens element, a fourth lens element, a fifth lens element and a sixth lens element. The first lens element has positive refractive power. The sixth lens element has an object-side surface being convex in a paraxial region thereof and an image-side surface being concave in a paraxial region thereof. At least one of the object-side surface and the image-side surface of at least one lens element of the optical image lens assembly has at least one inflection point. A thickness along an optical axis of the first lens element is a maximum value among thicknesses along the optical axis of all lens elements of the optical image lens assembly.

37 Claims, 34 Drawing Sheets

(56) References Cited

U.S. PATENT DOCUMENTS

| | | | |
|---|---|---|---|
| 2012/0243108 A1* | 9/2012 | Tsai | G02B 13/18 |
| | | | 359/713 |
| 2015/0109685 A1* | 4/2015 | Shinohara | G02B 13/0045 |
| | | | 359/714 |
| 2016/0216479 A1 | 7/2016 | Chen et al. | |
| 2016/0216482 A1 | 7/2016 | Chen et al. | |
| 2016/0216485 A1 | 7/2016 | Chen et al. | |
| 2016/0377840 A1 | 12/2016 | Shih | |
| 2017/0146776 A1 | 5/2017 | Kang et al. | |
| 2017/0315334 A1* | 11/2017 | Liao | G02B 9/62 |
| 2020/0209571 A1 | 7/2020 | Yamazaki et al. | |
| 2020/0285017 A1 | 9/2020 | Jhang et al. | |
| 2020/0310083 A1* | 10/2020 | Kim | G02B 9/64 |

FOREIGN PATENT DOCUMENTS

| | | |
|---|---|---|
| CN | 107505690 A | 12/2017 |
| CN | 107783260 A | 3/2018 |
| CN | 108227138 A | 6/2018 |
| CN | 108227139 A | 6/2018 |
| CN | 108318997 A | 7/2018 |
| CN | 108319000 A | 7/2018 |
| CN | 110174748 A | 8/2019 |
| CN | 110187478 A | 8/2019 |
| CN | 110221408 A | 9/2019 |
| CN | 110275279 A | 9/2019 |
| CN | 110297318 A | 10/2019 |
| CN | 110297320 A | 10/2019 |
| CN | 110376711 A | 10/2019 |
| CN | 110398816 A | 11/2019 |
| CN | 110412723 A | 11/2019 |
| CN | 110632738 A | 12/2019 |
| CN | 111007636 A | 4/2020 |
| CN | 111142225 A | 5/2020 |
| JP | 63-155102 A | 6/1988 |
| JP | 8-43885 A | 2/1996 |
| JP | 08-122634 A | 5/1996 |
| JP | 2014-010399 A | 1/2014 |
| TW | I685675 B | 2/2020 |
| TW | I689748 B | 4/2020 |
| WO | 2018/166128 A1 | 9/2018 |
| WO | 2019/205874 A1 | 10/2019 |

* cited by examiner

OPTICAL IMAGE LENS ASSEMBLY, IMAGE CAPTURING UNIT AND ELECTRONIC DEVICE

RELATED APPLICATIONS

This application claims priority to U.S. Provisional Application 63/066,126, filed on Aug. 14, 2020, which is incorporated by reference herein in its entirety.

BACKGROUND

Technical Field

The present disclosure relates to an optical image lens assembly, an image capturing unit and an electronic device, more particularly to an optical image lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, compactness and a desirable field of view.

SUMMARY

According to one aspect of the present disclosure, an optical image lens assembly includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

The first lens element has positive refractive power. The object-side surface of the sixth lens element is convex in a paraxial region thereof, and the image-side surface of the sixth lens element is concave in a paraxial region thereof. At least one of the object-side surface and the image-side surface of at least one lens element of the optical image lens assembly has at least one inflection point. A thickness along an optical axis of the first lens element is a maximum value among thicknesses along the optical axis of all lens elements of the optical image lens assembly.

When a distance along the optical axis between the image-side surface of the sixth lens element and an image surface is BL, a distance along the optical axis between the object-side surface of the first lens element and the image-side surface of the sixth lens element is TD, an Abbe number of the fifth lens element is V5, an Abbe number of the sixth lens element is V6, a focal length of the optical image lens assembly is f, a focal length of the third lens element is f3, a curvature radius of the object-side surface of the sixth lens element is R11, and a curvature radius of the image-side surface of the sixth lens element is R12, the following conditions are satisfied:

$1.0 < BL/TD < 5.0$;

$0.10 < V5/V6 < 1.80$;

$-5.0 < f/f3 < 1.80$; and $-0.50 < (R11-R12)/(R11+R12) < 0.50$.

According to another aspect of the present disclosure, an optical image lens assembly includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

The first lens element has positive refractive power. The object-side surface of the sixth lens element is convex in a paraxial region thereof, and the image-side surface of the sixth lens element is concave in a paraxial region thereof. At least one of the object-side surface and the image-side surface of at least one lens element of the optical image lens assembly has at least one inflection point.

When a distance along an optical axis between the image-side surface of the sixth lens element and an image surface is BL, a distance along the optical axis between the object-side surface of the first lens element and the image-side surface of the sixth lens element is TD, an Abbe number of the fifth lens element is V5, an Abbe number of the sixth lens element is V6, a focal length of the second lens element is f2, and a focal length of the third lens element is f3, the following conditions are satisfied:

$0.70 < BL/TD < 5.0$;

$0.10 < V5/V6 < 0.95$; and $-0.70 < f2/f3 < 300.0$.

According to another aspect of the present disclosure, an optical image lens assembly includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

The first lens element has positive refractive power. The object-side surface of the sixth lens element is convex in a paraxial region thereof, and the image-side surface of the sixth lens element is concave in a paraxial region thereof. At least one of the object-side surface and the image-side surface of at least one lens element of the optical image lens assembly has at least one inflection point.

When a distance along an optical axis between the image-side surface of the sixth lens element and an image surface is BL, a distance along the optical axis between the object-side surface of the first lens element and the image-side surface of the sixth lens element is TD, an Abbe number of the fifth lens element is V5, an Abbe number of the sixth lens element is V6, a focal length of the optical image lens assembly is f, and a focal length of the third lens element is f3, the following conditions are satisfied:

$1.0 < BL/TD < 5.0$;

$0.10 < V5/V6 < 0.95$; and $-5.0 < f/f3 < 0.72$.

According to another aspect of the present disclosure, an image capturing unit includes one of the aforementioned optical image lens assemblies and an image sensor, wherein the image sensor is disposed on the image surface of the optical image lens assembly, and the image sensor has at least 40 megapixels.

According to another aspect of the present disclosure, an electronic device includes at least two image capturing units which face the same side. The at least two image capturing units includes a first image capturing unit and a second image capturing unit. The first image capturing unit includes one of the aforementioned optical image lens assemblies and an image sensor that is disposed on the image surface of the optical image lens assembly. The image sensor has a resolution of at least 40 megapixels. The first image capturing unit achieves an equivalent focal length between 80 mm and 150 mm with the resolution of the image sensor, and the first image capturing unit achieves an equivalent focal length between 200 mm and 500 mm with a portion of the resolution of the image sensor, which is at least eight megapixels. The second image capturing unit includes an optical lens assembly and an image sensor that is disposed on an image surface of the optical lens assembly. A maximum field of view of the first image capturing unit and a maximum field of view of the second image capturing unit differ by at least 20 degrees.

According to another aspect of the present disclosure, an electronic device includes at least two image capturing units which face the same side. The at least two image capturing units includes a first image capturing unit and a second image capturing unit. The first image capturing unit includes an optical image lens assembly and an image sensor that is disposed on an image surface of the optical image lens assembly. The image sensor has a resolution of at least 40 megapixels. The first image capturing unit achieves an equivalent focal length between 80 mm and 150 mm with the resolution of the image sensor, and the first image capturing unit achieves an equivalent focal length between 200 mm and 500 mm with a portion of the resolution of the image sensor, which is at least eight megapixels. The second image capturing unit includes an optical lens assembly and an image sensor that is disposed on an image surface of the optical lens assembly. A maximum field of view of the first image capturing unit and a maximum field of view of the second image capturing unit differ by at least 20 degrees.

The optical image lens assembly of the first image capturing unit includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

The first lens element has positive refractive power. At least one of the object-side surface and the image-side surface of at least one lens element of the optical image lens assembly has at least one inflection point.

When a minimum value among Abbe numbers of all lens elements of the optical image lens assembly is Vdmin, an f-number of the optical image lens assembly is Fno, an entrance pupil diameter of the optical image lens assembly is EPD, a maximum image height of the optical image lens assembly is ImgH, and half of a maximum field of view of the optical image lens assembly is HFOV, the following conditions are satisfied:

$10.0 < Vd\text{min} < 21.0$;

$27.0 \text{ [mm]} < Fno \times EPD < 40.0 \text{ [mm]}$;

$4.50 \text{ [mm]} < ImgH < 10.0 \text{ [mm]}$; and $5.0 \text{ [deg.]} < HFOV < 15.0 \text{ [deg.]}$.

According to another aspect of the present disclosure, an electronic device includes at least two image capturing units which face the same side. The at least two image capturing units includes a first image capturing unit and a second image capturing unit. The first image capturing unit includes an optical image lens assembly and an image sensor that is disposed on an image surface of the optical image lens assembly. The image sensor has a resolution of at least 40 megapixels. The second image capturing unit includes an optical lens assembly and an image sensor that is disposed on an image surface of the optical lens assembly. A maximum field of view of the first image capturing unit and a maximum field of view of the second image capturing unit differ by at least 20 degrees.

The optical image lens assembly of the first image capturing unit includes, in order from an object side to an image side along an optical path, a first lens element and a second lens element. Each of all lens elements of the optical image lens assembly has an object-side surface facing toward the object side and an image-side surface facing toward the image side.

The first lens element has positive refractive power. The second lens element has negative refractive power. At least one of the object-side surface and the image-side surface of at least one lens element of the optical image lens assembly has at least one inflection point.

When a minimum value among Abbe numbers of all lens elements of the optical image lens assembly is Vdmin, an f-number of the optical image lens assembly is Fno, an entrance pupil diameter of the optical image lens assembly is EPD, a focal length of the optical image lens assembly is f, and a maximum image height of the optical image lens assembly is ImgH, the following conditions are satisfied:

$10.0 < Vd\text{min} < 21.0$;

$25.0 \text{ [mm]} < Fno \times EPD < 45.0 \text{ [mm]}$; and $3.5 < f/ImgH < 9.0$.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
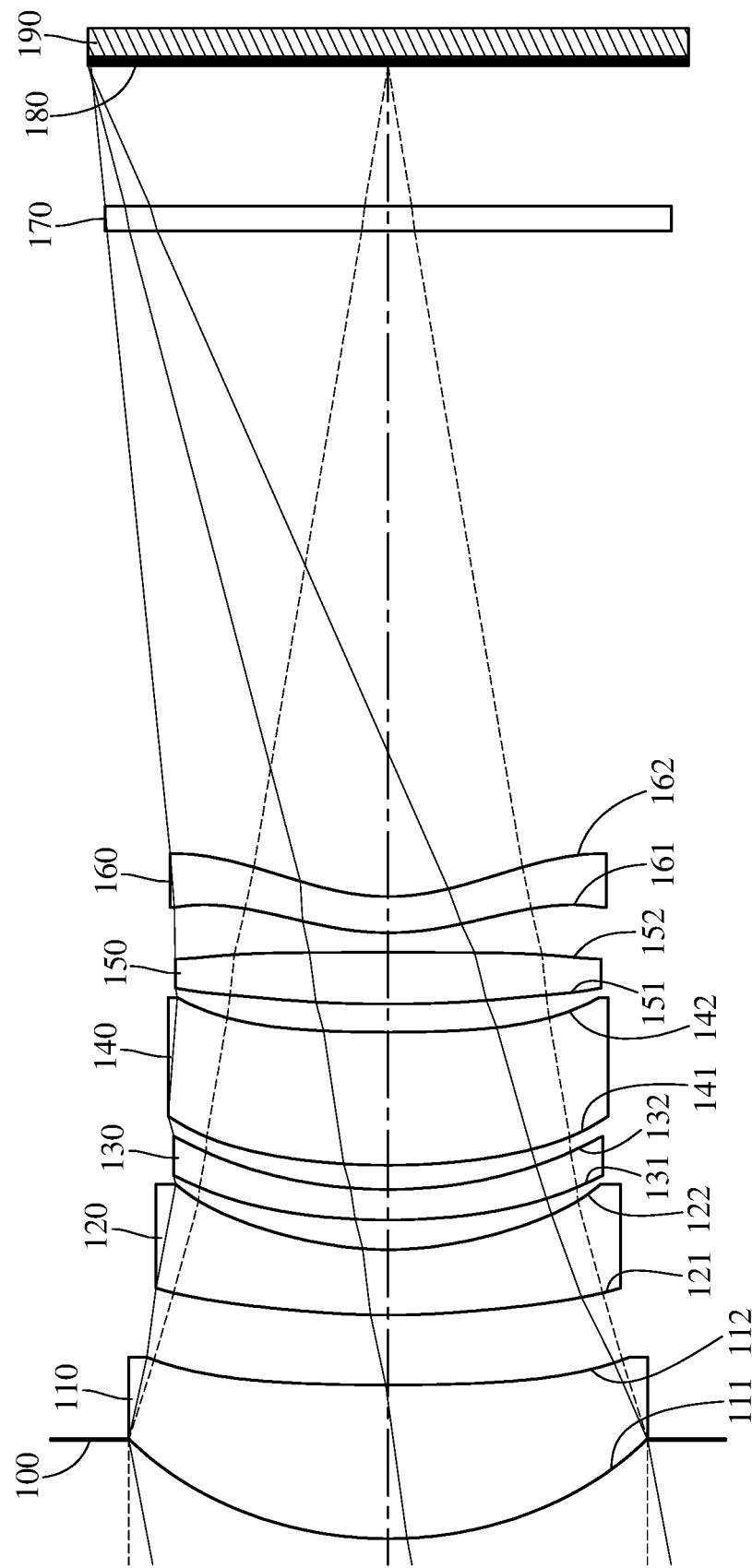
FIG. 1 is a schematic view of an image capturing unit according to the 1st embodiment of the present disclosure.

An optical image lens assembly includes, in order from an object side to an image side along an optical path, a first lens element and a second lens element. Each of all lens elements of the optical image lens assembly has an object-side surface facing toward the object side and an image-side surface facing toward the image side. Moreover, the optical image lens assembly can also include at least five lens elements. Specifically, the optical image lens assembly can also include six lens elements. The six lens elements are, in order from the object side to the image side along the optical path, the first lens element, the second lens element, a third lens element, a fourth lens element, a fifth lens element and a sixth lens element. Each of the six lens elements has the object-side surface facing toward the object side and the image-side surface facing toward the image side.

There can be an air gap along an optical axis between each of all adjacent lens elements of the optical image lens assembly. Therefore, it is favorable for reducing the assembling difficulty of the optical image lens assembly so as to increase the assembly yield rate. In detail, each of the first through sixth lens elements can be a single and non-cemented lens element. The manufacturing process of cemented lenses is more complex than the non-cemented lenses, particularly when an image-side surface of one lens element and an object-side surface of the following lens element need to have accurate curvatures to ensure both lenses being properly cemented. In addition, during the cementing process, those two lens elements might not be well cemented due to misalignment, which is not favorable for the image quality. Therefore, having an air gap in a paraxial region between each of all adjacent lens elements of the optical image lens assembly in the present disclosure is favorable for avoiding the problems of the cemented lens elements so as to improve the yield rate and to increase flexibility in designing the surface shapes of lens elements, thereby reducing the size of the optical image lens assembly and correcting aberrations.

The first lens element has positive refractive power. Therefore, it is favorable for providing significant light convergence so as to effectively reduce the size of the optical image lens assembly for the requirement of compactness. The object-side surface of the first lens element can be convex in a paraxial region thereof. Therefore, it is favorable for controlling the angle between light rays and the lens surface so as to prevent total reflection.

The second lens element can have negative refractive power. Therefore, it is favorable for correcting aberrations generated by the first lens element so as to correct spherical aberration and chromatic aberration. The image-side surface of the second lens element can be concave in a paraxial region thereof. Therefore, it is favorable for effectively correcting aberrations generated by the first lens element so as to increase image quality.

The image-side surface of the third lens element can be concave in a paraxial region thereof. Therefore, it is favorable for obtaining a balance between the field of view and the size of the optical image lens assembly so as to meet various product application requirements.

The image-side surface of the fifth lens element can be convex in a paraxial region thereof. Therefore, it is favorable for effectively reducing effective radii at the image side of the optical image lens assembly, thereby facilitating a telephoto imaging system with a lens barrel having a desirable diameter.

The object-side surface of the sixth lens element can be convex in a paraxial region thereof, and the image-side surface of the sixth lens element can be concave in a paraxial region thereof. Therefore, it is favorable for correcting coma and distortion.

Figure 30:
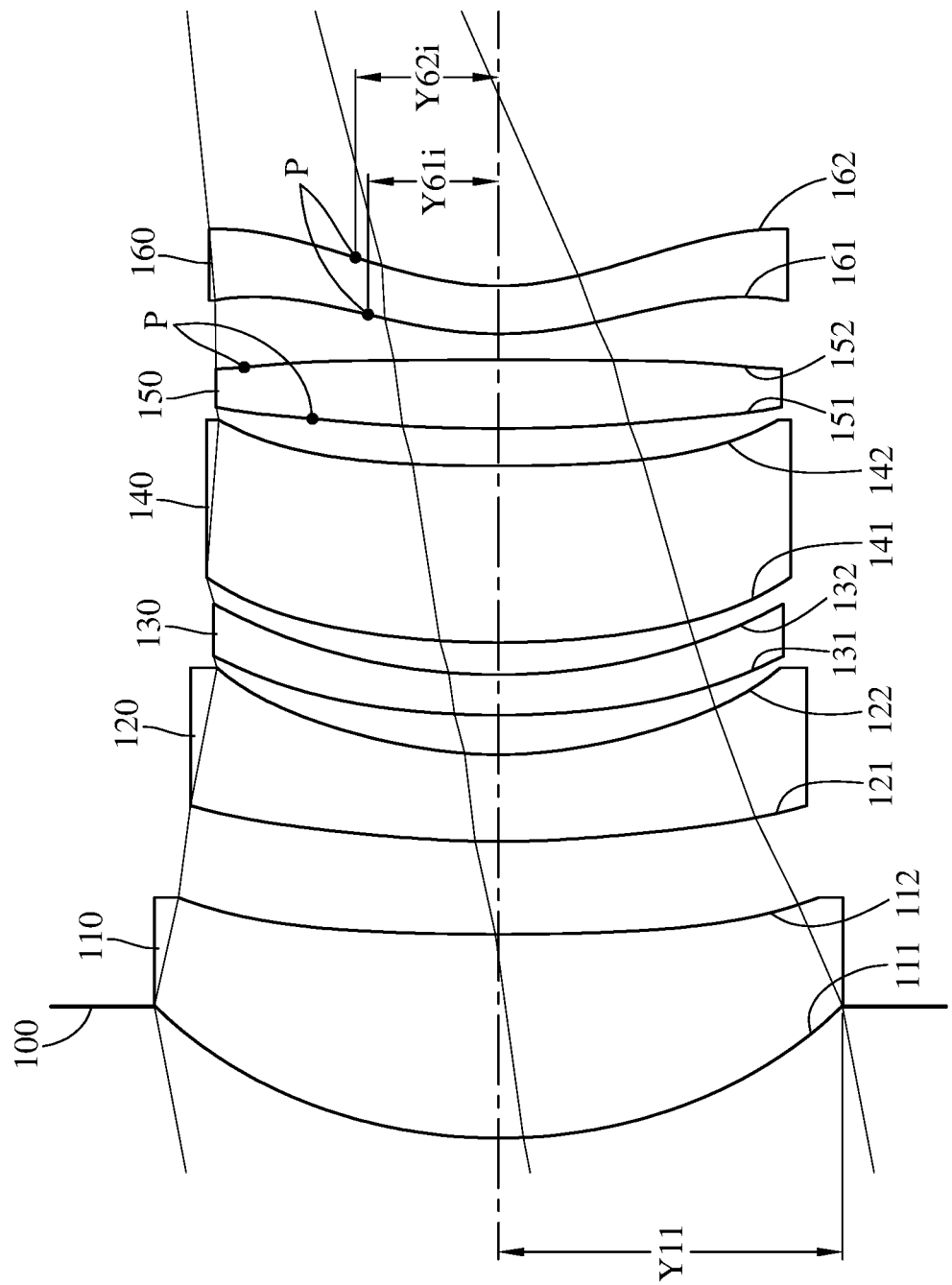
FIG. 30 shows a schematic view of Y11, Y61i, Y62i, several inflection points of the lens elements according to the 1st embodiment of the present disclosure.

According to the present disclosure, at least one of the object-side surface and the image-side surface of at least one lens element of the optical image lens assembly can have at least one inflection point. Therefore, it is favorable for correcting off-axis aberrations and reducing the size of the optical image lens assembly. Moreover, at least one of the object-side surface and the image-side surface of the sixth lens element can have at least one inflection point. Therefore, it is favorable for correcting field curvature so as to feature compactness and flatten the Petzval surface. Please refer to FIG. 30, which shows a schematic view of several inflection points P on the object-side surface 151 of the fifth lens element 150, the image-side surface 152 of the fifth lens element 150, the object-side surface 161 of the sixth lens element 160 and the image-side surface 162 of the sixth lens element 160 according to the 1st embodiment of the present disclosure. The inflection points of the fifth lens element and the sixth lens element in FIG. 30 are only exemplary. The other lens elements may also have one or more inflection points.

According to the present disclosure, a thickness along the optical axis of the first lens element can be a maximum value among thicknesses along the optical axis of all lens elements of the optical image lens assembly. Therefore, it is favorable for enhancing light control capability and environmental resistance at the object side of the optical image lens assembly, thereby stabilizing the overall lens structure and thus providing a stable image quality.

According to the present disclosure, the first lens element has a maximum effective radius of the object-side surface and a maximum effective radius of the image-side surface thereof, and one of the maximum effective radii of the first lens element can be a maximum value among maximum effective radii on the object-side surfaces and the image-side surfaces of all lens elements of the optical image lens assembly. Therefore, it is favorable for ensuring a proper aperture size of the optical image lens assembly so as to receive enough light and control the field of view, thereby achieving a telephoto imaging function.

When a distance along the optical axis between the image-side surface of the sixth lens element and an image surface is BL, and a distance along the optical axis between the object-side surface of the first lens element and the image-side surface of the sixth lens element is TD, the following condition can be satisfied: $0.70<BL/TD<5.0$. Therefore, it is favorable for providing a proper back focal length of the optical image lens assembly so as to reduce the incident angle on the image surface. Moreover, the following condition can also be satisfied: $1.0<BL/TD<5.0$. Moreover, the following condition can also be satisfied: $1.45<BL/TD<4.50$. Moreover, the following condition can also be satisfied: $1.70<BL/TD<4.0$.

When an Abbe number of the fifth lens element is V5, and an Abbe number of the sixth lens element is V6, the following condition can be satisfied: $0.10<V5/V6<1.80$. Therefore, it is favorable for properly configuring materials of lens elements at the image side of the optical image lens assembly so as to optimize image quality. Moreover, the following condition can also be satisfied: $0.10<V5/V6<0.95$. Moreover, the following condition can also be satisfied: $0.10<V5/V6<0.88$. Moreover, the following condition can also be satisfied: $0.20<V5/V6<0.55$.

When a focal length of the optical image lens assembly is f, and a focal length of the third lens element is f3, the following condition can be satisfied: $-5.0<f/f3<1.80$. Therefore, it is favorable for balancing the refractive power distribution of the optical image lens assembly and providing significant aberrations corrections by the middle section of the optical image lens assembly. Moreover, the following condition can also be satisfied: $-5.0<f/f3<0.72$. Moreover, the following condition can also be satisfied: $-3.0<f/f3<1.20$.

When a curvature radius of the object-side surface of the sixth lens element is R11, and a curvature radius of the image-side surface of the sixth lens element is R12, the following condition can be satisfied: $-0.50<(R11-R12)/(R11+R12)<0.50$. Therefore, it is favorable for effectively controlling the surface shapes of the sixth lens element so as to provide a good image illuminance.

When a focal length of the second lens element is f2, and the focal length of the third lens element is f3, the following condition can be satisfied: $-0.70<f2/f3<300.0$. Therefore, it is favorable for balancing the refractive power ratio between the second lens element and the third lens element so as to enhance aberrations corrections. Moreover, the following condition can also be satisfied: $-0.70<f2/f3<25.0$.

When a minimum value among Abbe numbers of all lens elements of the optical image lens assembly is Vdmin, the following condition can be satisfied: $10.0<Vdmin<21.0$. Therefore, it is favorable for controlling the light path of the optical image lens assembly and balancing the capability of refracting light of different wavelengths so as to correct aberrations. Moreover, the following condition can also be satisfied: $10.0<Vdmin<20.0$.

When an f-number of the optical image lens assembly is Fno, and an entrance pupil diameter of the optical image lens assembly is EPD, the following condition can be satisfied: $25.0\ [mm]<Fno\times EPD<45.0\ [mm]$. Therefore, it is favorable for maintaining the aperture of the optical image lens assembly at a specific ratio so as to provide good image quality. Moreover, the following condition can also be satisfied: $25.0\ [mm]<Fno\times EPD<40.0\ [mm]$. Moreover, the following condition can also be satisfied: $27.0\ [mm]<Fno\times EPD<40.0\ [mm]$. Moreover, the following condition can also be satisfied: $27.0\ [mm]<Fno\times EPD<35.0\ [mm]$.

When a maximum image height of the optical image lens assembly (half of a diagonal length of an effective photosensitive area of an image sensor) is ImgH, the following condition can be satisfied: $4.50\ [mm]<ImgH<10.0\ [mm]$. Therefore, it is favorable for controlling the light receiving area, ensuring proper image brightness, and obtaining a balance of specification requirements. Moreover, the following condition can also be satisfied: $5.0\ [mm]<ImgH<10.0\ [mm]$.

When half of a maximum field of view of the optical image lens assembly is HFOV, the following condition can be satisfied: $5.0\ [deg.]<HFOV<15.0\ [deg.]$. Therefore, it is favorable for effectively controlling the field of view of the optical image lens assembly, thereby facilitating to capture detailed images from afar.

When the focal length of the optical image lens assembly is f, and the maximum image height of the optical image lens assembly is ImgH, the following condition can be satisfied: $2.6<f/ImgH<15.0$. Therefore, it is favorable for providing a proper field of view of the optical image lens assembly so as to enable telephoto photography with image capturing from afar. Moreover, the following condition can also be satisfied: 3.5<f/ImgH<9.0.

When an Abbe number of the first lens element is V1, an Abbe number of the second lens element is V2, an Abbe number of the third lens element is V3, an Abbe number of the fourth lens element is V4, the Abbe number of the fifth lens element is V5, the Abbe number of the sixth lens element is V6, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the i-th lens element is Ni, and a minimum value of Vi/Ni is (Vi/Ni) min, at least one lens element of the optical image lens assembly can satisfy the following condition: 3.0<(Vi/Ni) min<12.0, wherein i=1, 2, 3, 4, 5 or 6. Therefore, it is favorable for effectively adjusting focusing positions among light of different wavelengths so as to prevent overlapped images. Moreover, at least one lens element of the optical image lens assembly can also satisfy the following condition: 4.0<(Vi/Ni) min<11.0, wherein i=1, 2, 3, 4, 5 or 6.

When a curvature radius of the image-side surface of the fifth lens element is R10, and the curvature radius of the object-side surface of the sixth lens element is R11, the following condition can be satisfied: −0.10<(R10+R11)/(R10−R11)<1.30. Therefore, it is favorable for effectively controlling the lens surfaces between the fifth lens element and the sixth lens element so as to achieve a proper back focal length.

When the thickness along the optical axis of the first lens element is CT1, and a maximum value among distances along the optical axis between each of all adjacent lens elements of the optical image lens assembly is ATmax, the following condition can be satisfied: 1.0<CT1/ATmax<5.0. Therefore, it is favorable for ensuring a proper thickness of the first lens element so as to enhance the structural strength of the optical image lens assembly; and it is also favorable for controlling the spacing among the lens elements for effective space utilization. Moreover, the following condition can also be satisfied: 1.5<CT1/ATmax<4.0.

When a distance along the optical axis between the object-side surface of the first lens element and the image surface is TL, and the focal length of the optical image lens assembly is f, the following condition can be satisfied: 0.70<TL/f<1.05. Therefore, it is favorable for controlling the total track length and the field of view of the optical image lens assembly so as to meet various product application requirements.

When the entrance pupil diameter of the optical image lens assembly is EPD, and a maximum effective radius of the object-side surface of the first lens element is Y11, the following condition can be satisfied: 1.60<EPD/Y11<2.10. Therefore, it is favorable for controlling the light incident range of the optical image lens assembly and the maximum effective radius of the object-side surface of the first lens element so as to increase the overall light incidence thereof. Please refer to FIG. 30, which shows a schematic view of Y11 according to the 1st embodiment of the present disclosure.

When the entrance pupil diameter of the optical image lens assembly is EPD, and a sum of distances along the optical axis between each of all adjacent lens elements of the optical image lens assembly is ΣAT, the following condition can be satisfied: 2.20<EPD/ΣAT. Therefore, it is favorable for increasing the light incident range of the optical image lens assembly and space utilization efficiency so as to prevent increased assembling difficulty due to an overly long length of the corresponding lens barrel. Moreover, the following condition can also be satisfied: 3.20<EPD/ΣAT<9.0.

When the distance along the optical axis between the image-side surface of the sixth lens element and the image surface is BL, and the maximum image height of the optical image lens assembly is ImgH, the following condition can be satisfied: 2.0<BL/ImgH<5.5. Therefore, it is favorable for providing a proper back focal length of the optical image lens assembly so as to configure additional optical elements; and it is also favorable for controlling the incident angle on the image surface so as to ensure sufficient peripheral image brightness. Moreover, the following condition can also be satisfied: 2.50<BL/ImgH<5.0.

When the maximum image height of the optical image lens assembly is ImgH, and the maximum field of view of the optical image lens assembly is FOV, the following condition can be satisfied: 10.5 [mm]<ImgH/tan(FOV)<30.0 [mm]. Therefore, it is favorable for ensuring a proper image height of the optical image lens assembly so as to receive a large area of light and meet the image requirement in high pixel counts.

According to the present disclosure, at least one lens element of the optical image lens assembly can be a non-circular lens element. When a minimum distance from a center to an outer rim of the non-circular lens element is Dmin, and a maximum distance from the center to the outer rim of the non-circular lens element is Dmax, the following condition can be satisfied: Dmin/Dmax<0.80. Therefore, it is favorable for effectively reducing the size of a corresponding image capturing unit so as to provide a smaller electronic device that is easy to carry, thereby meeting the market requirements of compactness. Moreover, at least two lens elements of the optical image lens assembly can also be non-circular lens elements and can also satisfy the following condition: Dmin/Dmax<0.80. Moreover, at least three lens elements of the optical image lens assembly can also be non-circular lens elements and can also satisfy the following condition: Dmin/Dmax<0.80. Please refer to FIG. 31, which shows a schematic view of Dmin and Dmax according to the 1st embodiment of the present disclosure.

When the sum of distances along the optical axis between each of all adjacent lens elements of the optical image lens assembly is ΣAT, and the distance along the optical axis between the image-side surface of the sixth lens element and the image surface is BL, the following condition can be satisfied: ΣAT/BL<0.30. Therefore, it is favorable for effectively reducing the height of the lens barrel of the optical image lens assembly so as to enhance lens assembling and its yield rate. Moreover, the following condition can also be satisfied: 0.03<ΣAT/BL<0.18.

When a maximum value among maximum effective radii of all lens surfaces of the optical image lens assembly is Ymax, and a minimum value among maximum effective radii of all lens surfaces of the optical image lens assembly is Ymin, the following condition can be satisfied: 1.0<Ymax/Ymin<1.60. Therefore, it is favorable for balancing the sizes of lens elements of the optical image lens assembly and reducing the sensitivity of the optical image lens assembly so as to properly control the dimensional tolerance in molding the lens elements.

When the thickness along the optical axis of the first lens element is CT1, and a thickness along the optical axis of the second lens element is CT2, the following condition can be satisfied: 1.50<CT1/CT2<4.0. Therefore, it is favorable for ensuring a proper thickness of the first lens element so as to enhance the structural strength of the optical image lens assembly and to minimize the influence of environmental factors.

When a curvature radius of the object-side surface of the second lens element is R3, and a curvature radius of the image-side surface of the second lens element is R4, the following condition can be satisfied: 0<(R3−R4)/(R3+R4)<1.80. Therefore, it is favorable for controlling the surface shapes of the second lens element so as to correct astigmatism of the optical image lens assembly. Moreover, the following condition can also be satisfied: 0<(R3−R4)/(R3+R4)<0.50.

When the maximum effective radius of the object-side surface of the first lens element is Y11, and the maximum image height of the optical image lens assembly is ImgH, the following condition can be satisfied: 0.70<Y11/ImgH<1.20. Therefore, it is favorable for ensuring similar size areas at the light incident position and the image surface of the optical image lens assembly, such that images have sufficient brightness; and it is also favorable for enhancing the symmetry of the optical image lens assembly so as to increase image quality. Moreover, the following condition can also be satisfied: 0.80<Y11/ImgH<1.10.

When a vertical distance between an inflection point on the object-side surface of the sixth lens element and the optical axis is Y61i, and a vertical distance between an inflection point on the image-side surface of the sixth lens element and the optical axis is Y62i, at least one inflection point on the object-side surface of the sixth lens element and at least one inflection point on the image-side surface of the sixth lens element satisfy the following condition: 0.70<Y61i/Y62i<1.50. Therefore, it is favorable for correcting off-axis aberrations and field curvature of the optical image lens assembly. Please refer to FIG. 30, which shows a schematic view of Y61i and Y62i according to the 1st embodiment of the present disclosure.

According to the present disclosure, the aforementioned features and conditions can be utilized in numerous combinations so as to achieve corresponding effects.

According to the present disclosure, the lens elements of the optical image lens assembly can be made of either glass or plastic material. When the lens elements are made of glass material, the refractive power distribution of the optical image lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the optical image lens assembly can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, the image surface of the optical image lens assembly, based on the corresponding image sensor, can be flat or curved, especially a curved surface being concave facing towards the object side of the optical image lens assembly.

According to the present disclosure, an image correction unit, such as a field flattener, can be optionally disposed between the lens element closest to the image side of the optical image lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 32:
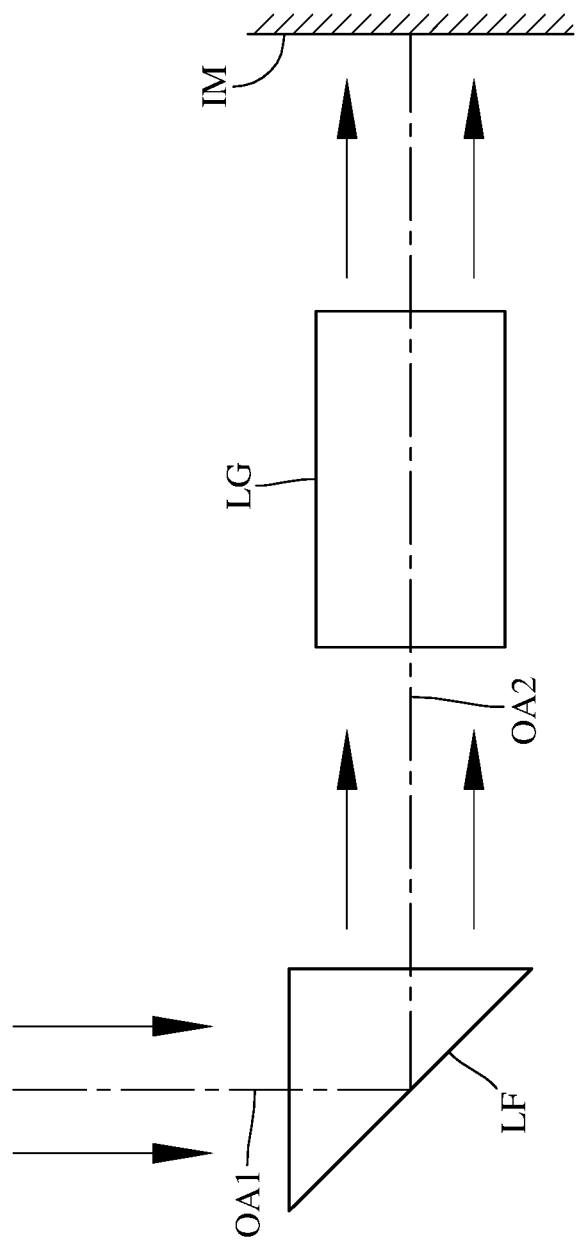
FIG. 32 shows a schematic view of a configuration of a reflective element in an optical image lens assembly according to one embodiment of the present disclosure.
Figure 33:
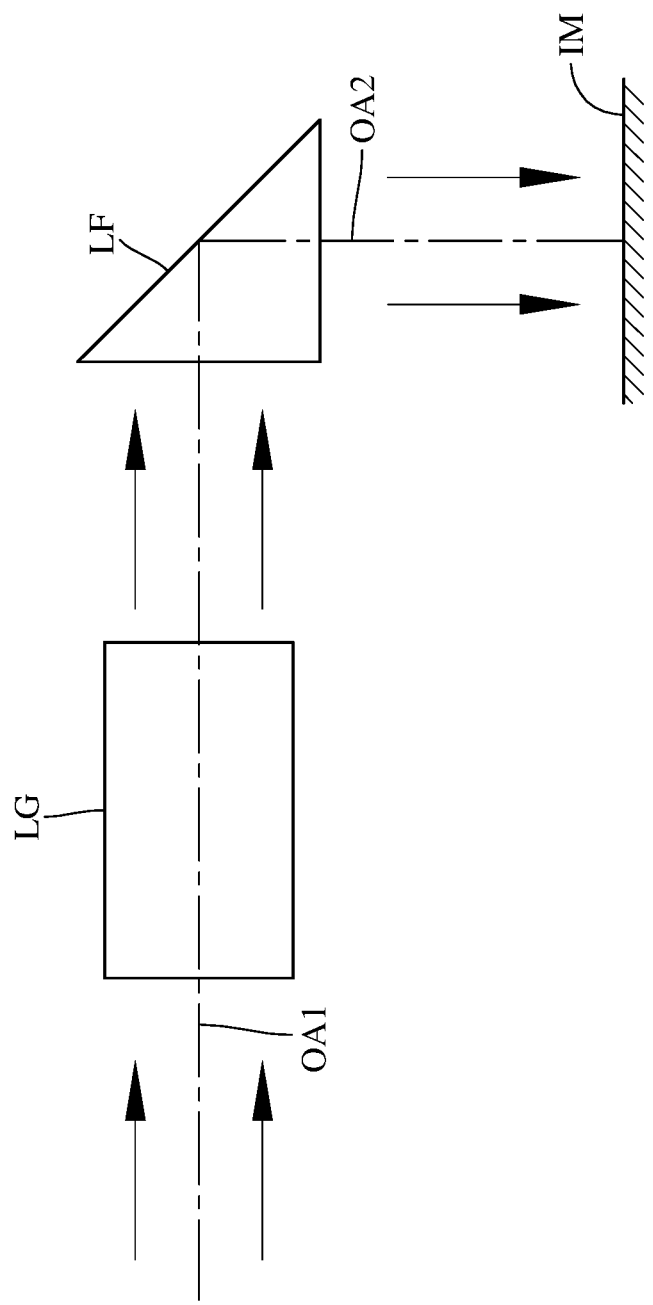
FIG. 33 shows a schematic view of another configuration of a reflective element in an optical image lens assembly according to one embodiment of the present disclosure.
Figure 34:
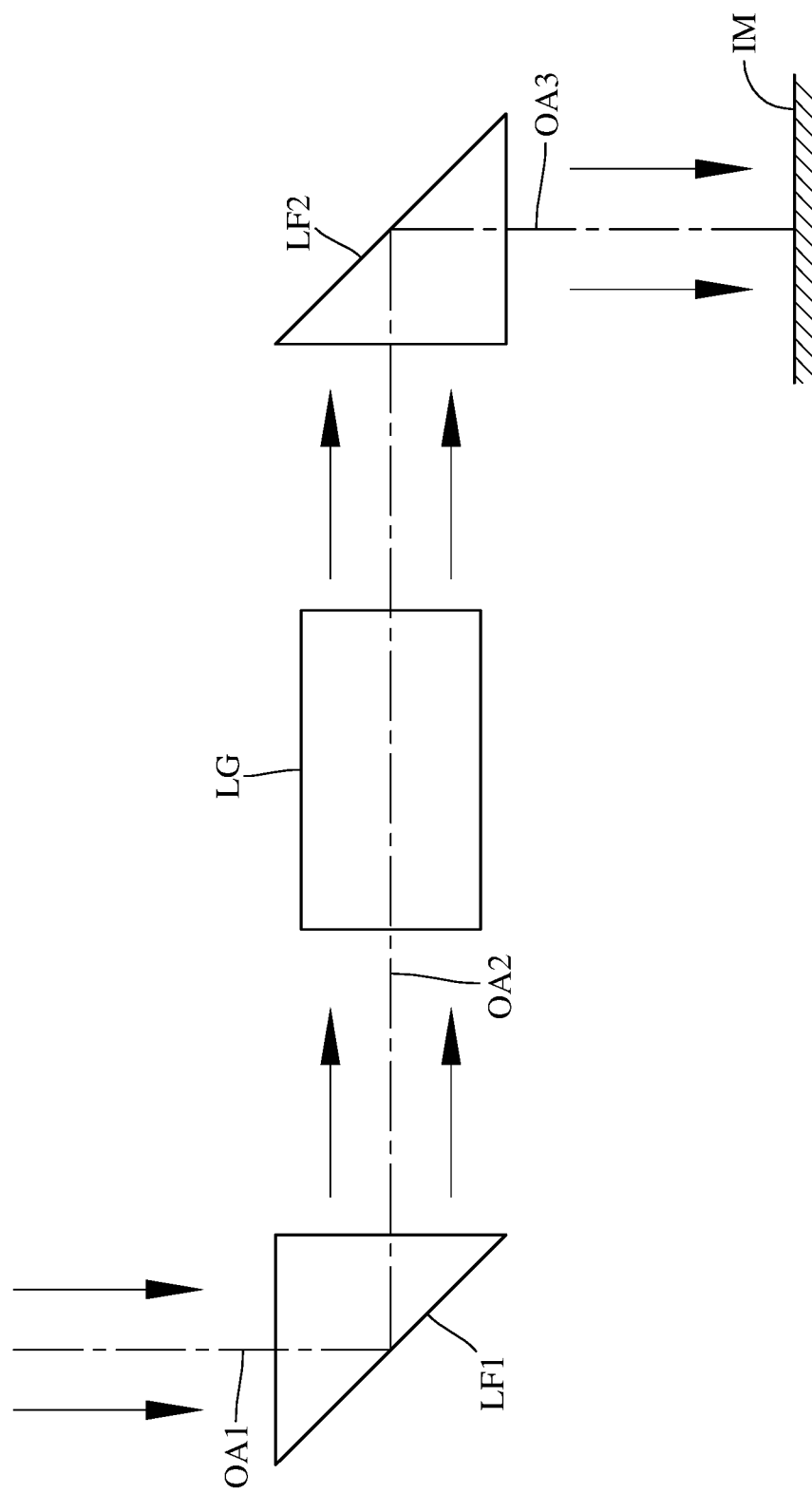
FIG. 34 shows a schematic view of a configuration of two reflective elements in an optical image lens assembly according to one embodiment of the present disclosure.

According to the present disclosure, at least one reflective element, such as a prism or a mirror, can be optionally disposed between an imaged object and the image surface on the imaging optical path, such that the optical image lens assembly can have a deflected light path and can be more flexible in space arrangement, and therefore the dimensions of an electronic device is not restricted by the total track length of the optical image lens assembly, thereby achieving various specification requirements. Specifically, please refer to FIG. 32 and FIG. 33. FIG. 32 shows a schematic view of a configuration of a reflective element in an optical image lens assembly according to one embodiment of the present disclosure, and FIG. 33 shows a schematic view of another configuration of a reflective element in an optical image lens assembly according to one embodiment of the present disclosure. In FIG. 32 and FIG. 33, the optical image lens assembly can have, in order from an imaged object (not shown in the figures) to an image surface IM along an optical path, a first optical axis OA1, a reflective element LF and a second optical axis OA2. The reflective element LF can be disposed between the imaged object and a lens group LG of the optical image lens assembly as shown in FIG. 32 or disposed between a lens group LG of the optical image lens assembly and the image surface IM as shown in FIG. 33. Furthermore, please refer to FIG. 34, which shows a schematic view of a configuration of two reflective elements in an optical image lens assembly according to one embodiment of the present disclosure. In FIG. 34, the optical image lens assembly can have, in order from an imaged object (not shown in the figure) to an image surface IM along an optical path, a first optical axis OA1, a first reflective element LF1, a second optical axis OA2, a second reflective element LF2 and a third optical axis OA3. The first reflective element LF1 is disposed between the imaged object and a lens group LG of the optical image lens assembly, the second reflective element LF2 is disposed between the lens group LG of the optical image lens assembly and the image surface IM, and the travelling direction of light on the first optical axis OA1 can be the same direction as the travelling direction of light on the third optical axis OA3 as shown in FIG. 34. The optical image lens assembly can be optionally provided with three or more reflective elements, and the present disclosure is not limited to the type, amount and position of the reflective elements of the embodiments disclosed in the aforementioned figures.

According to the present disclosure, the optical image lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical image lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical image lens assembly and thereby provides a wider field of view for the same.

According to the present disclosure, the optical image lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
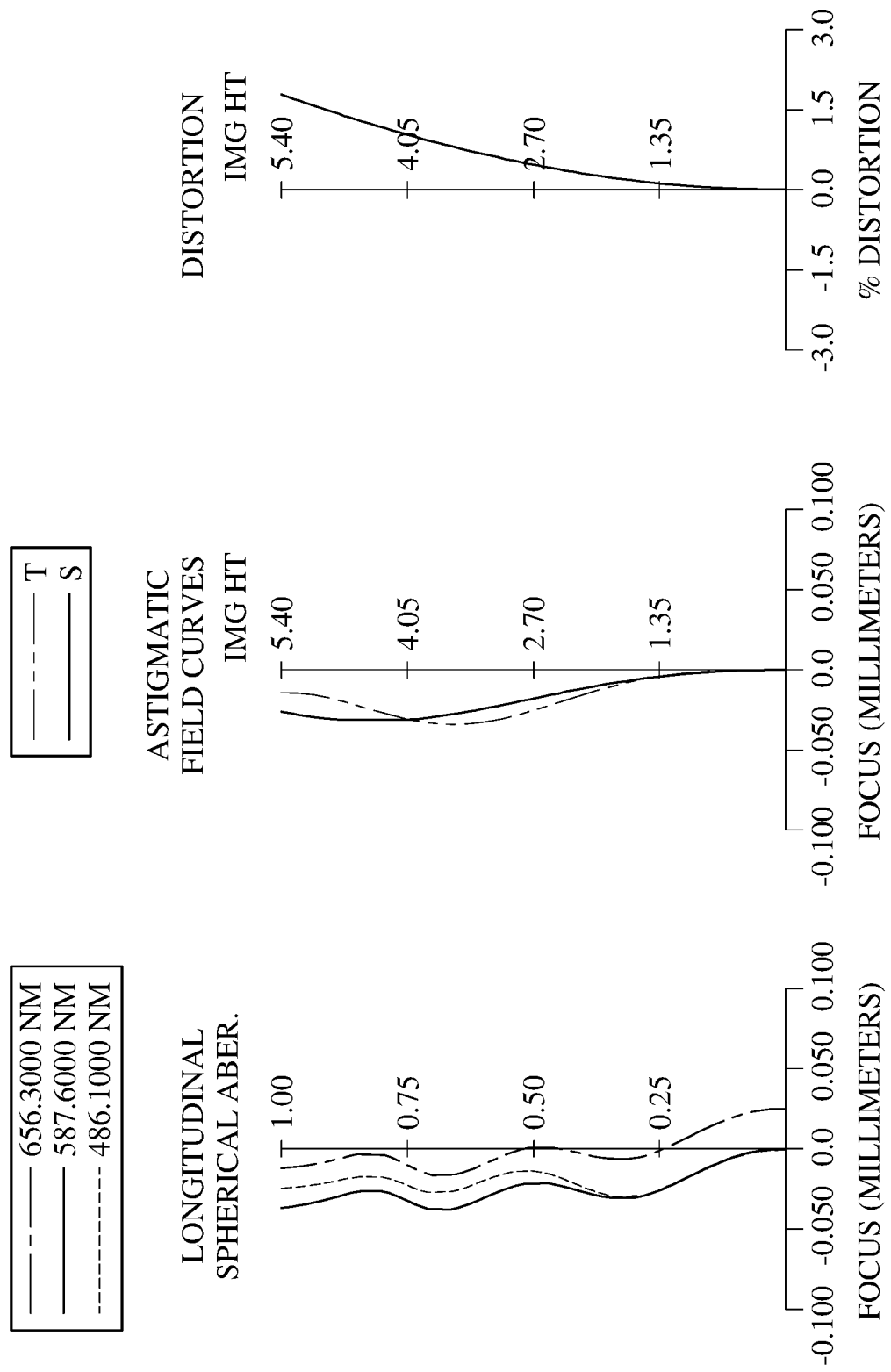
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical image lens assembly (its reference numeral is omitted) of the present disclosure and an image sensor 190. The optical image lens assembly includes, in order from an object side to an image side along an optical path, an aperture stop 100, a first lens element 110, a second lens element 120, a third lens element 130, a fourth lens element 140, a fifth lens element 150, a sixth lens element 160, a filter 170 and an image surface 180. The optical image lens assembly includes six lens elements (110, 120, 130, 140, 150 and 160) with no additional lens element disposed between each of the adjacent six lens elements, wherein there is an air gap along an optical axis between each of all adjacent lens elements. In this embodiment, an air gap along the optical axis between two adjacent lens elements means the two adjacent lens elements are two non-cemented lens elements in paraxial regions thereof.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has at least one inflection point. The image-side surface 152 of the fifth lens element 150 has at least one inflection point.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The object-side surface 161 of the sixth lens element 160 has at least one inflection point. The image-side surface 162 of the sixth lens element 160 has at least one inflection point.

The filter 170 is made of glass material and located between the sixth lens element 160 and the image surface 180, and will not affect the focal length of the optical image lens assembly. The image sensor 190 is disposed on or near the image surface 180 of the optical image lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the displacement in parallel with an optical axis from the intersection point of the aspheric surface and the optical axis to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical image lens assembly of the image capturing unit according to the 1st embodiment, when a focal length of the optical image lens assembly is f, an f-number of the optical image lens assembly is Fno, and half of a maximum field of view of the optical image lens assembly is HFOV, these parameters have the following values: f=28.00 millimeters (mm), Fno=3.00, HFOV=10.7 degrees (deg.).

When a minimum value among Abbe numbers of all lens elements of the optical image lens assembly is Vdmin, the following condition is satisfied: Vdmin=18.4. In this embodiment, among the first through sixth lens elements (110-160), an Abbe number of the second lens element 120 and an Abbe number of the fifth lens element 150 are smaller than Abbe numbers of the other lens elements, and Vdmin is equal to the Abbe number of the second lens element 120 and the Abbe number of the fifth lens element 150.

When the Abbe number of the fifth lens element 150 is V5, and an Abbe number of the sixth lens element 160 is V6, the following condition is satisfied: V5/V6=0.33.

When an Abbe number of the first lens element 110 is V1, the Abbe number of the second lens element 120 is V2, an Abbe number of the third lens element 130 is V3, an Abbe number of the fourth lens element 140 is V4, the Abbe number of the fifth lens element 150 is V5, the Abbe number of the sixth lens element 160 is V6, an Abbe number of the i-th lens element is Vi, a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, a refractive index of the i-th lens element is Ni, and a minimum value of Vi/Ni is (Vi/Ni) min, the following condition is satisfied: (Vi/Ni) min=10.90. In this embodiment, among the first through sixth lens elements (110-160), the value of Vi/Ni of the fifth lens element 150 (i.e., V5/N5) is smaller than the values of Vi/Ni of the other lens elements, and the value of (Vi/Ni) min is equal to the value of Vi/Ni of the fifth lens element 150 (i.e., V5/N5).

When a thickness along the optical axis of the first lens element 110 is CT1, and a thickness along the optical axis of the second lens element 120 is CT2, the following condition is satisfied: CT1/CT2=2.35. In this embodiment, a thickness along the optical axis of single lens element is a central thickness of the single lens element in a paraxial region thereof.

When the thickness along the optical axis of the first lens element 110 is CT1, and a maximum value among distances along the optical axis between each of all adjacent lens elements of the optical image lens assembly is ATmax, the following condition is satisfied: CT1/ATmax=2.20. In this embodiment, a distance along the optical axis between two adjacent lens elements is a distance in a paraxial region between two adjacent lens surfaces of the two adjacent lens elements. In this embodiment, among the first through sixth lens elements (110-160), the distance along the optical axis between the first lens element 110 and the second lens element 120 is larger than the distances along the optical axis between each of the other lens elements, and ATmax is equal to the distance along the optical axis between the first lens element 110 and the second lens element 120.

When a curvature radius of the object-side surface 121 of the second lens element 120 is R3, and a curvature radius of the image-side surface 122 of the second lens element 120 is R4, the following condition is satisfied: (R3-R4)/(R3+R4)=0.39.

When a curvature radius of the image-side surface 152 of the fifth lens element 150 is R10, and a curvature radius of the object-side surface 161 of the sixth lens element 160 is R11, the following condition is satisfied: (R10+R11)/(R10-R11)=0.88.

When the curvature radius of the object-side surface 161 of the sixth lens element 160 is R11, and a curvature radius of the image-side surface 162 of the sixth lens element 160 is R12, the following condition is satisfied: (R11-R12)/(R11+R12)=0.12.

When the focal length of the optical image lens assembly is f, and a focal length of the third lens element 130 is f3, the following condition is satisfied: f/f3=−0.49.

When a focal length of the second lens element 120 is f2, and the focal length of the third lens element 130 is f3, the following condition is satisfied: f2/f3=0.28.

When a distance along the optical axis between the object-side surface 111 of the first lens element 110 and the image surface 180 is TL, and the focal length of the optical image lens assembly is f, the following condition is satisfied: TL/f=0.95. In this embodiment, a distance along the optical axis between two optical surfaces or elements is a distance in a paraxial region between any two of lens surface, aperture stop, stop, image surface, etc.

When a distance along the optical axis between the image-side surface 162 of the sixth lens element 160 and the image surface 180 is BL, and a distance along the optical axis between the object-side surface 111 of the first lens element 110 and the image-side surface 162 of the sixth lens element 160 is TD, the following condition is satisfied: BL/TD=1.29.

When the f-number of the optical image lens assembly is Fno, and an entrance pupil diameter of the optical image lens assembly is EPD, the following condition is satisfied: Fno×EPD=28.00 [mm].

When the entrance pupil diameter of the optical image lens assembly is EPD, and a sum of distances along the optical axis between each of all adjacent lens elements of the optical image lens assembly is ΣAT, the following condition is satisfied: EPD/ΣAT=3.02. In this embodiment, ΣAT is a sum of axial distances between the first lens element 110 and the second lens element 120, the second lens element 120 and the third lens element 130, the third lens element 130 and the fourth lens element 140, the fourth lens element 140 and the fifth lens element 150, and the fifth lens element 150 and the sixth lens element 160.

When the entrance pupil diameter of the optical image lens assembly is EPD, and a maximum effective radius of the object-side surface 111 of the first lens element 110 is Y11, the following condition is satisfied: EPD/Y11=2.00. When a maximum value among maximum effective radii of all lens surfaces of the optical image lens assembly is Ymax, and a minimum value among maximum effective radii of all lens surfaces of the optical image lens assembly is Ymin, the following condition is satisfied: Ymax/Ymin=1.23.

When a vertical distance between an inflection point on the object-side surface 161 of the sixth lens element 160 and the optical axis is Y61i, and a vertical distance between an inflection point on the image-side surface 162 of the sixth lens element 160 and the optical axis is Y62i, at least one inflection point on the object-side surface 161 of the sixth lens element 160 and at least one inflection point on the image-side surface 162 of the sixth lens element 160 satisfy the following condition: Y61i/Y62i=0.91.

When the sum of distances along the optical axis between each of all adjacent lens elements of the optical image lens assembly is ΣAT, and the distance along the optical axis between the image-side surface 162 of the sixth lens element 160 and the image surface 180 is BL, the following condition is satisfied: ΣAT/BL=0.21.

When the distance along the optical axis between the image-side surface 162 of the sixth lens element 160 and the image surface 180 is BL, and a maximum image height of the optical image lens assembly is ImgH, the following condition is satisfied: BL/ImgH=2.77.

When the focal length of the optical image lens assembly is f, and the maximum image height of the optical image lens assembly is ImgH, the following condition is satisfied: f/ImgH=5.19.

When the maximum effective radius of the object-side surface 111 of the first lens element 110 is Y11, and the maximum image height of the optical image lens assembly is ImgH, the following condition is satisfied: Y11/ImgH=0.86.

When the maximum image height of the optical image lens assembly is ImgH, and the maximum field of view of the optical image lens assembly is FOV, the following condition is satisfied: ImgH/tan(FOV)=13.72 [mm].

When the maximum image height of the optical image lens assembly is ImgH, the following condition is satisfied: ImgH=5.40 [mm].

The detailed optical data of the 1st embodiment are shown in Table 1 and the aspheric surface data are shown in Table 2 below.

TABLE 1

1st Embodiment
f = 28.00 mm, Fno = 3.00, HFOV = 10.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.788 | | | | |
| 2 | Lens 1 | 7.384 | (ASP) | 2.770 | Plastic | 1.544 | 56.0 | 15.90 |
| 3 | | 43.943 | (ASP) | 1.260 | | | | |
| 4 | Lens 2 | 13.119 | (ASP) | 1.180 | Plastic | 1.679 | 18.4 | −16.02 |
| 5 | | 5.731 | (ASP) | 0.536 | | | | |
| 6 | Lens 3 | 12.116 | (ASP) | 0.550 | Plastic | 1.544 | 56.0 | −57.00 |
| 7 | | 8.571 | (ASP) | 0.437 | | | | |
| 8 | Lens 4 | 12.931 | (ASP) | 2.400 | Plastic | 1.544 | 56.0 | 35.98 |
| 9 | | 35.658 | (ASP) | 0.507 | | | | |
| 10 | Lens 5 | 28.330 | (ASP) | 0.933 | Plastic | 1.686 | 18.4 | 30.52 |
| 11 | | −79.199 | (ASP) | 0.352 | | | | |
| 12 | Lens 6 | 4.904 | (ASP) | 0.652 | Plastic | 1.544 | 56.0 | −43.65 |
| 13 | | 3.874 | (ASP) | 12.000 | | | | |
| 14 | Filter | Plano | | 0.452 | Glass | 1.517 | 64.2 | — |
| 15 | | Plano | | 2.528 | | | | |
| 16 | Image | Plano | | — | | | | |

Note:
Reference wavelength is 587.6 nm (d-line).

TABLE 2

Aspheric Coefficients

| Surface # | 2 | 3 | 4 | 5 | 6 |
|---|---|---|---|---|---|
| k= | 1.6670E−01 | 4.8066E+01 | −8.0197E−01 | −5.7546E−02 | 7.9152E−01 |
| A4= | 1.1053E−04 | 1.8815E−04 | −4.0939E−03 | −7.2295E−03 | −1.1003E−03 |
| A6= | −1.0972E−05 | 6.7186E−05 | 7.0418E−04 | 1.4902E−03 | 6.8266E−04 |
| A8= | 2.3642E−06 | −1.4423E−06 | −7.4668E−05 | −2.0328E−04 | −1.0768E−04 |
| A10= | −1.6579E−07 | −2.8700E−07 | 4.6082E−06 | 1.5622E−05 | 8.1205E−06 |
| A12= | 5.5808E−09 | 2.1608E−08 | −1.4426E−06 | −5.8566E−07 | −2.3953E−07 |
| A14= | −6.8205E−11 | −4.3755E−10 | 1.7519E−09 | 8.3385E−09 | −1.5293E−09 |
| A16= | — | — | — | — | 1.4608E−10 |

TABLE 2-continued

| Aspheric Coefficients | | | | | |
|---|---|---|---|---|---|
| Surface # | 7 | 8 | 9 | 10 | 11 |
| k= | 9.2372E−01 | 2.4485E+00 | 5.0000E+01 | 2.0106E+01 | −9.0000E+01 |
| A4= | −4.2017E−05 | 1.7620E−04 | 2.0762E−03 | 1.9539E−03 | 2.3151E−03 |
| A6= | −1.4908E−05 | 3.3930E−05 | 2.9698E−06 | −4.8721E−04 | −7.1231E−04 |
| A8= | 1.5668E−06 | 9.1187E−08 | −1.9543E−05 | 6.8228E−05 | 1.2002E−04 |
| A10= | 5.3741E−08 | 2.9928E−08 | 3.9704E−06 | −7.4196E−06 | −1.4928E−05 |
| A12= | −6.2742E−09 | 7.2890E−09 | −3.8352E−07 | 4.7033E−07 | 1.1300E−06 |
| A14= | −4.1941E−11 | −4.1307E−10 | 1.9478E−08 | −1.2257E−08 | −4.3822E−08 |
| A16= | — | — | −4.1290E−10 | 4.8778E−11 | 6.7306E−10 |

| Surface # | 12 | 13 |
|---|---|---|
| k= | −6.0373E+00 | −3.9510E+00 |
| A4= | −6.5626E−04 | −2.2930E−03 |
| A6= | −5.4140E−04 | −1.6681E−05 |
| A8= | 9.2519E−05 | −5.9931E−06 |
| A10= | −1.1883E−05 | 1.2851E−06 |
| A12= | 1.0108E−06 | −7.1964E−08 |
| A14= | −4.6695E−08 | 7.3681E−10 |
| A16= | 8.6656E−10 | 2.7203E−11 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
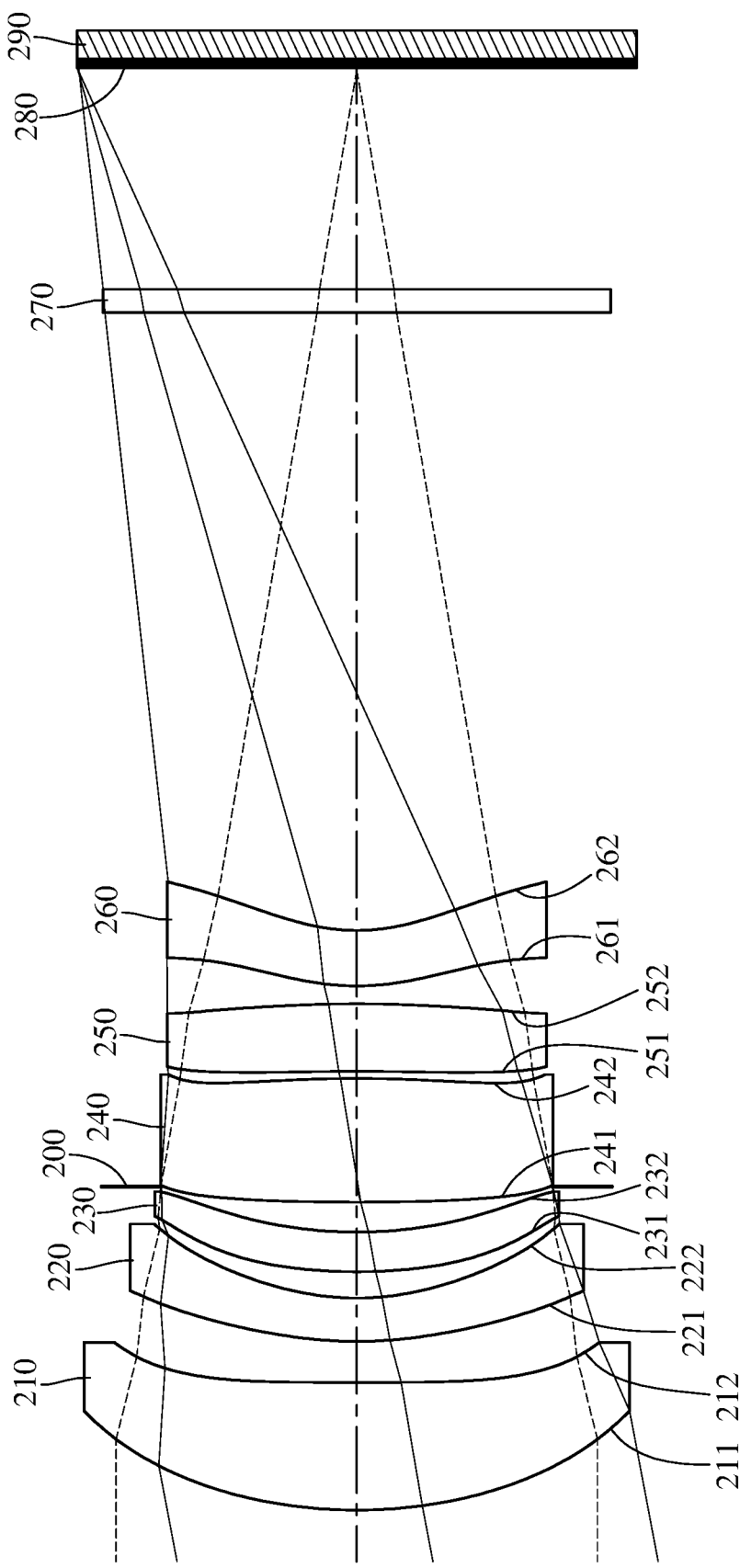
FIG. 3 is a schematic view of an image capturing unit according to the 2nd embodiment of the present disclosure.
Figure 4:
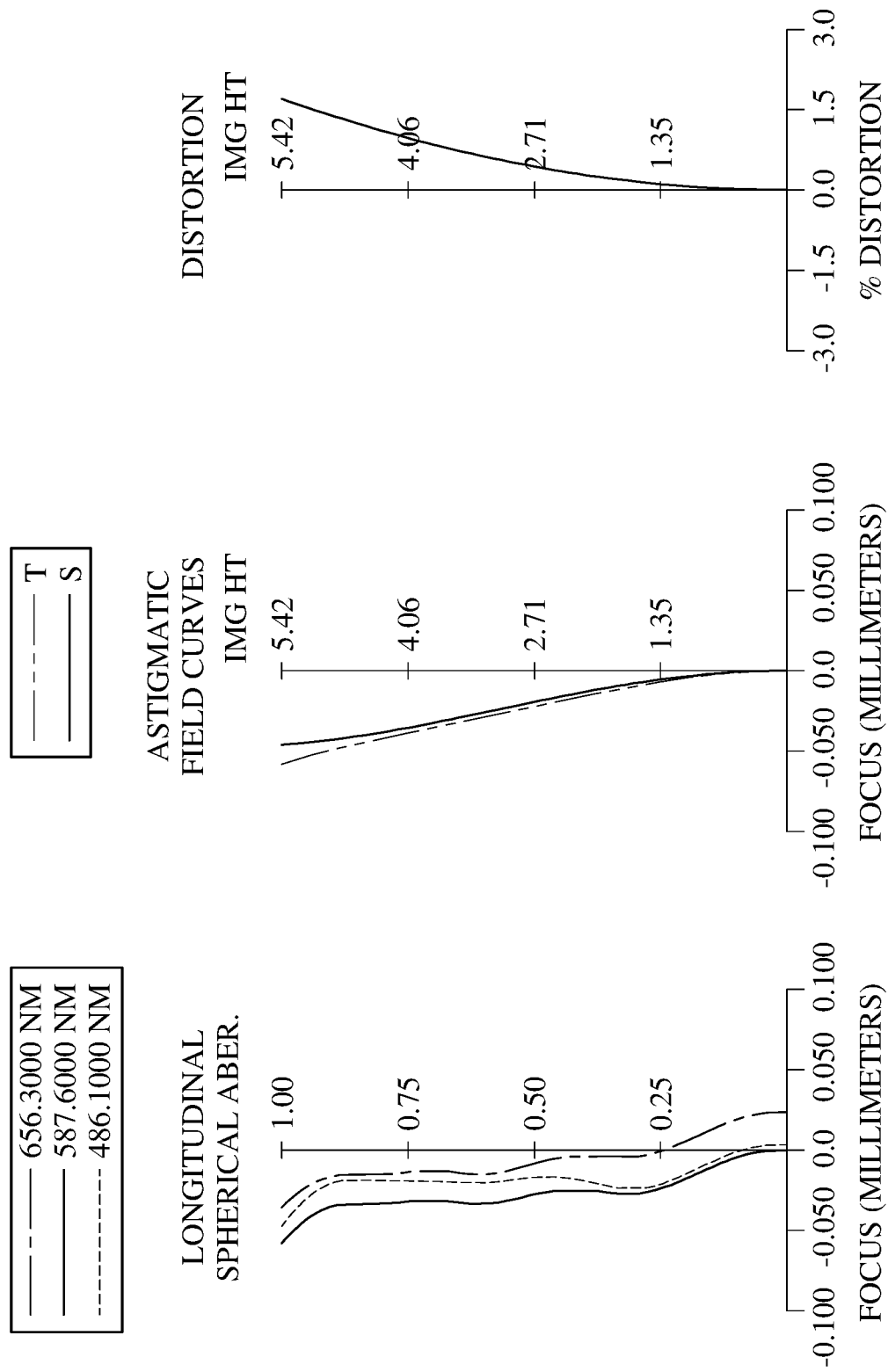
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical image lens assembly (its reference numeral is omitted) of the present disclosure and an image sensor 290. The optical image lens assembly includes, in order from an object side to an image side along an optical path, a first lens element 210, a second lens element 220, a third lens element 230, an aperture stop 200, a fourth lens element 240, a fifth lens element 250, a sixth lens element 260, a filter 270 and an image surface 280. The optical image lens assembly includes six lens elements (210, 220, 230, 240, 250 and 260) with no additional lens element disposed between each of the adjacent six lens elements, wherein there is an air gap along an optical axis between each of all adjacent lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has at least one inflection point. The image-side surface 232 of the third lens element 230 has at least one inflection point.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric. The image-side surface 242 of the fourth lens element 240 has at least one inflection point.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has at least one inflection point. The image-side surface 252 of the fifth lens element 250 has at least one inflection point.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The object-side surface 261 of the sixth lens element 260 has at least one inflection point. The image-side surface 262 of the sixth lens element 260 has at least one inflection point.

The filter 270 is made of glass material and located between the sixth lens element 260 and the image surface 280, and will not affect the focal length of the optical image lens assembly. The image sensor 290 is disposed on or near the image surface 280 of the optical image lens assembly.

The detailed optical data of the 2nd embodiment are shown in Table 3 and the aspheric surface data are shown in Table 4 below.

TABLE 3

2nd Embodiment
f = 28.00 mm, Fno = 3.00, HFOV = 10.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 9.584 | (ASP) | 2.478 | Plastic | 1.544 | 56.0 | 18.47 |
| 2 | | 189.947 | (ASP) | 0.796 | | | | |
| 3 | Lens 2 | 7.738 | (ASP) | 0.841 | Plastic | 1.679 | 18.4 | −22.95 |
| 4 | | 4.944 | (ASP) | 0.512 | | | | |
| 5 | Lens 3 | 10.378 | (ASP) | 0.771 | Plastic | 1.544 | 56.0 | −117.73 |
| 6 | | 8.697 | (ASP) | 0.882 | | | | |
| 7 | Ape. Stop | Plano | | −0.300 | | | | |
| 8 | Lens 4 | 60.581 | (ASP) | 2.400 | Plastic | 1.544 | 56.0 | 32.72 |
| 9 | | −24.833 | (ASP) | 0.138 | | | | |
| 10 | Lens 5 | −40.502 | (ASP) | 1.311 | Plastic | 1.686 | 18.4 | 73.41 |
| 11 | | −22.745 | (ASP) | 0.346 | | | | |
| 12 | Lens 6 | 4.749 | (ASP) | 1.078 | Plastic | 1.544 | 56.0 | −47.30 |
| 13 | | 3.688 | (ASP) | 12.000 | | | | |
| 14 | Filter | Plano | | 0.452 | Glass | 1.517 | 64.2 | — |
| 15 | | Plano | | 4.294 | | | | |
| 16 | Image | Plano | | — | | | | |

Note:
Reference wavelength is 587.6 nm (d-line).

TABLE 4

Aspheric Coefficients

| Surface # | 1 | 2 | 3 | 4 | 5 |
|---|---|---|---|---|---|
| k= | 2.4268E−01 | 5.0000E+01 | −1.0415E+00 | −1.0294E−01 | 2.4791E+00 |
| A4= | 1.5560E−04 | 7.0102E−04 | −4.1095E−03 | −7.0986E−03 | −8.1800E−04 |
| A6= | −9.5624E−06 | 7.1469E−05 | 6.9688E−04 | 1.4425E−03 | 7.1659E−04 |
| A8= | 2.4171E−06 | −1.2954E−06 | −7.5423E−05 | −2.0313E−04 | −1.0792E−04 |
| A10= | −1.6210E−07 | −2.8834E−07 | 4.6293E−06 | 1.5617E−05 | 8.0672E−06 |
| A12= | 5.3230E−09 | 2.1576E−08 | −1.4174E−07 | −5.8811E−07 | −2.4100E−07 |
| A14= | −6.5096E−11 | −4.2000E−10 | 1.6618E−09 | 8.3580E−09 | −1.5982E−09 |
| A16= | — | — | — | — | 1.3230E−10 |

| Surface # | 6 | 8 | 9 | 10 | 11 |
|---|---|---|---|---|---|
| k= | 1.1976E+00 | 5.0000E+01 | 3.0437E+01 | −9.0000E+01 | −4.2244E−01 |
| A4= | −1.5690E−05 | 5.1940E−04 | 9.3337E−04 | 2.8393E−03 | 2.4255E−03 |
| A6= | −2.5322E−05 | 5.3868E−06 | 1.0678E−04 | −4.9184E−04 | −6.4165E−04 |
| A8= | 7.4594E−07 | −1.0579E−06 | −2.2043E−05 | 7.3164E−05 | 1.1989E−04 |
| A10= | −6.0133E−08 | 7.1991E−08 | 3.8681E−06 | −7.3857E−06 | −1.4833E−05 |
| A12= | −1.4378E−08 | 1.4210E−08 | −3.5268E−07 | 4.5554E−07 | 1.1153E−06 |
| A14= | 3.9407E−10 | −3.9526E−10 | 2.1019E−08 | −1.2535E−08 | −4.4700E−08 |
| A16= | — | — | −5.2918E−10 | 6.8040E−11 | 7.4293E−10 |

| Surface # | 12 | 13 |
|---|---|---|
| k= | −4.7037E+00 | −3.4033E+00 |
| A4= | −2.0162E−03 | −2.1709E−03 |
| A6= | −4.2720E−04 | −3.1896E−05 |
| A8= | 9.0670E−05 | −2.1343E−07 |
| A10= | −1.2023E−05 | 1.1173E−06 |
| A12= | 1.0245E−06 | −8.8657E−08 |
| A14= | −4.7100E−08 | 1.9993E−09 |
| A16= | 8.8737E−10 | 8.3925E−12 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 28.00 | TL/f | 1.00 |
| Fno | 3.00 | BL/TD | 1.49 |
| HFOV [deg.] | 10.8 | Fno × EPD [mm] | 28.00 |
| Vdmin | 18.4 | EPD/ΣAT | 3.93 |
| V5/V6 | 0.33 | EPD/Y11 | 1.77 |
| (Vi/Ni)min | 10.90 | Ymax/Ymin | 1.45 |
| CT1/CT2 | 2.95 | Y61i/Y62i | 0.83; 1.71 |

-continued

2nd Embodiment

| | | | |
|---|---|---|---|
| CT1/ATmax | 3.11 | ΣAT/BL | 0.14 |
| (R3 − R4)/(R3 + R4) | 0.22 | BL/ImgH | 3.09 |
| (R10 + R11)/(R10 − R11) | 0.65 | f/ImgH | 5.17 |
| (R11 − R12)/(R11 + R12) | 0.13 | Y11/ImgH | 0.98 |
| f/f3 | −0.24 | ImgH/tan(FOV) [mm] | 13.71 |
| f2/f3 | 0.19 | ImgH [mm] | 5.42 |

3rd Embodiment

Figure 5:
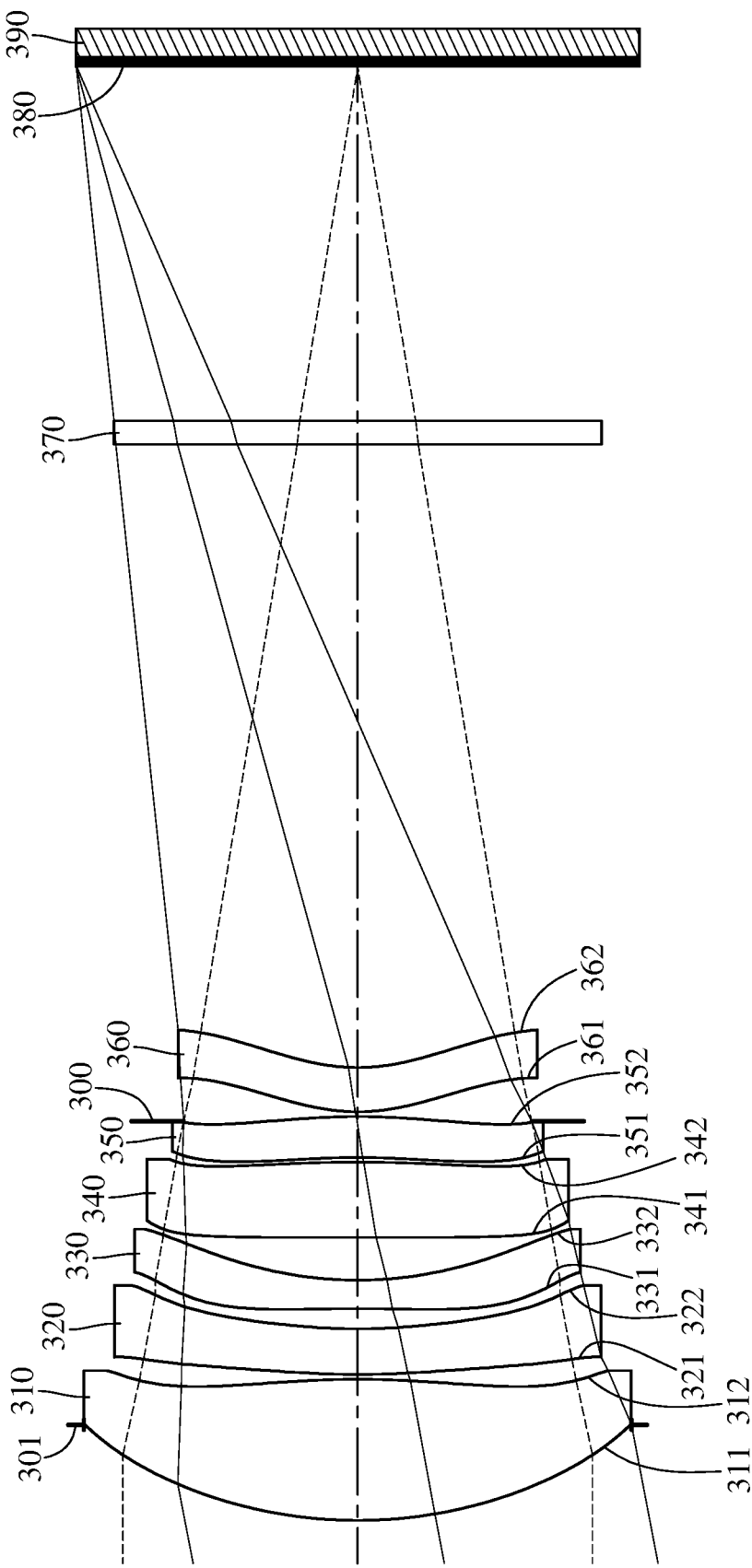
FIG. 5 is a schematic view of an image capturing unit according to the 3rd embodiment of the present disclosure.
Figure 6:
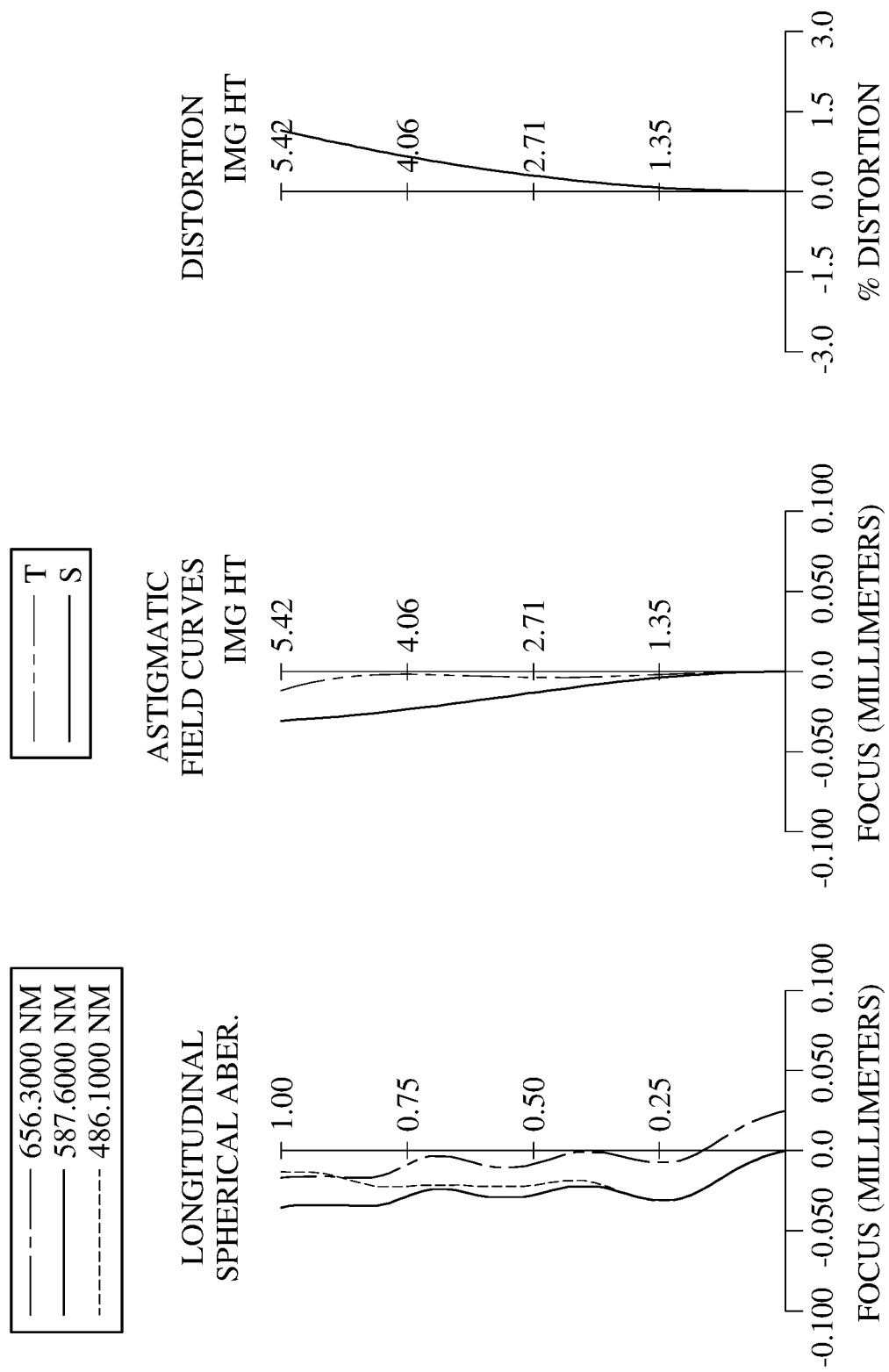
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical image lens assembly (its reference numeral is omitted) of the present disclosure and an image sensor 390. The optical image lens assembly includes, in order from an object side to an image side along an optical path, a stop 301, a first lens element 310, a second lens element 320, a third lens element 330, a fourth lens element 340, a fifth lens element 350, an aperture stop 300, a sixth lens element 360, a filter 370 and an image surface 380. The optical image lens assembly includes six lens elements (310, 320, 330, 340, 350 and 360) with no additional lens element disposed between each of the adjacent six lens elements, wherein there is an air gap along an optical axis between each of all adjacent lens elements.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric. The image-side surface 312 of the first lens element 310 has at least one inflection point.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has at least one inflection point.

The third lens element 330 with negative refractive power has an object-side surface 331 being concave in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has at least one inflection point. The image-side surface 332 of the third lens element 330 has at least one inflection point.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has at least one inflection point. The image-side surface 342 of the fourth lens element 340 has at least one inflection point.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The object-side surface 351 of the fifth lens element 350 has at least one inflection point. The image-side surface 352 of the fifth lens element 350 has at least one inflection point.

The sixth lens element 360 with positive refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has at least one inflection point. The image-side surface 362 of the sixth lens element 360 has at least one inflection point.

The filter 370 is made of glass material and located between the sixth lens element 360 and the image surface 380, and will not affect the focal length of the optical image lens assembly. The image sensor 390 is disposed on or near the image surface 380 of the optical image lens assembly.

The detailed optical data of the 3rd embodiment are shown in Table 5 and the aspheric surface data are shown in Table 6 below.

TABLE 5

3rd Embodiment
f = 28.00 mm, Fno = 3.10, HFOV = 10.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −1.840 | | | | |
| 2 | Lens 1 | 8.920 | (ASP) | 2.717 | Plastic | 1.544 | 56.0 | 11.26 |
| 3 | | −17.410 | (ASP) | 0.093 | | | | |
| 4 | Lens 2 | 14.909 | (ASP) | 0.877 | Plastic | 1.679 | 18.4 | −52.07 |
| 5 | | 10.238 | (ASP) | 0.389 | | | | |
| 6 | Lens 3 | −47.619 | (ASP) | 0.550 | Plastic | 1.566 | 37.4 | −11.28 |
| 7 | | 7.406 | (ASP) | 0.825 | | | | |
| 8 | Lens 4 | −181.976 | (ASP) | 1.447 | Plastic | 1.544 | 56.0 | 57.99 |
| 9 | | −26.947 | (ASP) | 0.090 | | | | |
| 10 | Lens 5 | −13.176 | (ASP) | 0.789 | Plastic | 1.686 | 18.4 | 142.51 |
| 11 | | −11.894 | (ASP) | −0.090 | | | | |
| 12 | Ape. Stop | Plano | | 0.180 | | | | |
| 13 | Lens 6 | 3.687 | (ASP) | 0.853 | Plastic | 1.544 | 56.0 | 85.30 |

TABLE 5-continued

3rd Embodiment
f = 28.00 mm, Fno = 3.10, HFOV = 10.8 deg.

| Surface # | | Curvature Radius | | Thickness | Material | Index | Abbe # | Focal Length |
|---|---|---|---|---|---|---|---|---|
| 14 | | 3.679 | (ASP) | 12.000 | | | | |
| 15 | Filter | Plano | | 0.452 | Glass | 1.517 | 64.2 | — |
| 16 | | Plano | | 6.828 | | | | |
| 17 | Image | Plano | | — | | | | |

Note:
Reference wavelength is 587.6 nm (d-line).
An effective radius of the stop 301 (Surface 1) is 5.264 mm.

TABLE 6

Aspheric Coefficients

| Surface # | 2 | 3 | 4 | 5 | 6 |
|---|---|---|---|---|---|
| k= | −2.1146E−01 | −1.2314E+01 | −2.1808E+00 | 1.4484E+00 | −9.0000E+01 |
| A4= | 1.5861E−04 | 8.2802E−04 | −4.3234E−03 | −6.4637E−03 | 9.0731E−04 |
| A6= | −3.3178E−05 | 6.6241E−05 | 6.9523E−04 | 1.4765E−03 | 7.1517E−04 |
| A8= | 3.6133E−06 | −1.6850E−06 | −7.5005E−05 | −2.0277E−04 | −1.0752E−04 |
| A10= | −1.7079E−07 | −2.5970E−07 | 4.6478E−06 | 1.5604E−05 | 8.0784E−06 |
| A12= | 4.2553E−09 | 2.1873E−08 | −1.4173E−07 | −5.8831E−07 | −2.3960E−07 |
| A14= | −3.9880E−11 | −4.7572E−10 | 1.5997E−09 | 8.3371E−09 | −1.4531E−09 |
| A16= | — | — | — | — | 1.3182E−10 |

| Surface # | 7 | 8 | 9 | 10 | 11 |
|---|---|---|---|---|---|
| k= | 1.1419E+00 | −9.0000E+01 | 8.1112E+00 | −9.0000E+01 | −4.4618E+01 |
| A4= | −9.1597E−04 | 1.0330E−03 | 5.4197E−04 | 3.1005E−03 | 2.5698E−03 |
| A6= | 1.1252E−06 | −5.3629E−05 | 1.2945E−04 | −4.7209E−04 | −6.1359E−04 |
| A8= | 4.7795E−07 | −1.0553E−06 | −2.3643E−05 | 7.6273E−05 | 1.2159E−04 |
| A10= | −1.1164E−07 | 2.0414E−07 | 3.7623E−06 | −7.2195E−06 | −1.4570E−05 |
| A12= | −1.4129E−08 | 1.8845E−08 | −3.5068E−07 | 4.5516E−07 | 1.1248E−06 |
| A14= | 6.3638E−10 | −6.4735E−10 | 2.1420E−08 | −1.3074E−08 | −4.5444E−08 |
| A16= | — | — | −5.4736E−10 | 4.2364E−11 | 7.0470E−10 |

| Surface # | 13 | 14 |
|---|---|---|
| k= | −4.1776E+00 | −4.0866E+00 |
| A4= | −2.2546E−03 | −2.6369E−03 |
| A6= | −4.3075E−04 | −5.0030E−05 |
| A8= | 9.1425E−05 | 3.0380E−06 |
| A10= | −1.2087E−05 | 7.1577E−07 |
| A12= | 1.0213E−06 | −1.0215E−07 |
| A14= | −4.8143E−08 | 5.2137E−09 |
| A16= | 9.3772E−10 | −1.0504E−10 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 28.00 | TL/f | 1.00 |
| Fno | 3.10 | BL/TD | 2.21 |
| HFOV [deg.] | 10.8 | Fno × EPD [mm] | 28.00 |
| Vdmin | 18.4 | EPD/ΣAT | 6.08 |
| V5/V6 | 0.33 | EPD/Y11 | 1.72 |
| (Vi/Ni)min | 10.90 | Ymax/Ymin | 1.57 |
| CT1/CT2 | 3.10 | Y61i/Y62i | 0.94 |
| CT1/ATmax | 3.29 | ΣAT/BL | 0.08 |
| (R3 − R4)/(R3 + R4) | 0.19 | BL/ImgH | 3.56 |
| (R10 + R11)/(R10 − R11) | 0.53 | f/ImgH | 5.17 |
| (R11 − R12)/(R11 + R12) | 0.00 | Y11/ImgH | 0.97 |
| f/f3 | −2.48 | ImgH/tan(FOV) [mm] | 13.63 |
| f2/f3 | 4.62 | ImgH [mm] | 5.42 |

4th Embodiment

Figure 7:
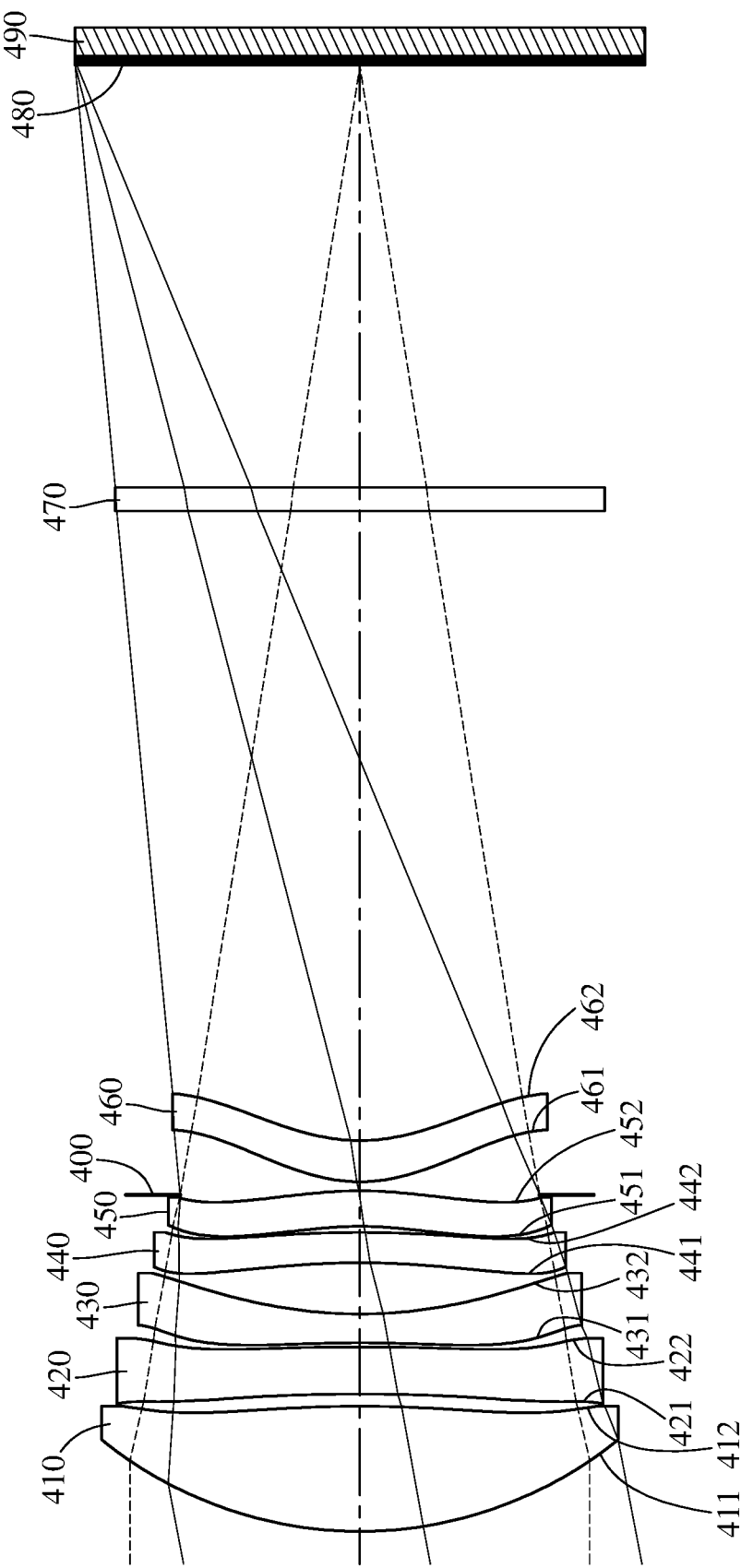
FIG. 7 is a schematic view of an image capturing unit according to the 4th embodiment of the present disclosure.
Figure 8:
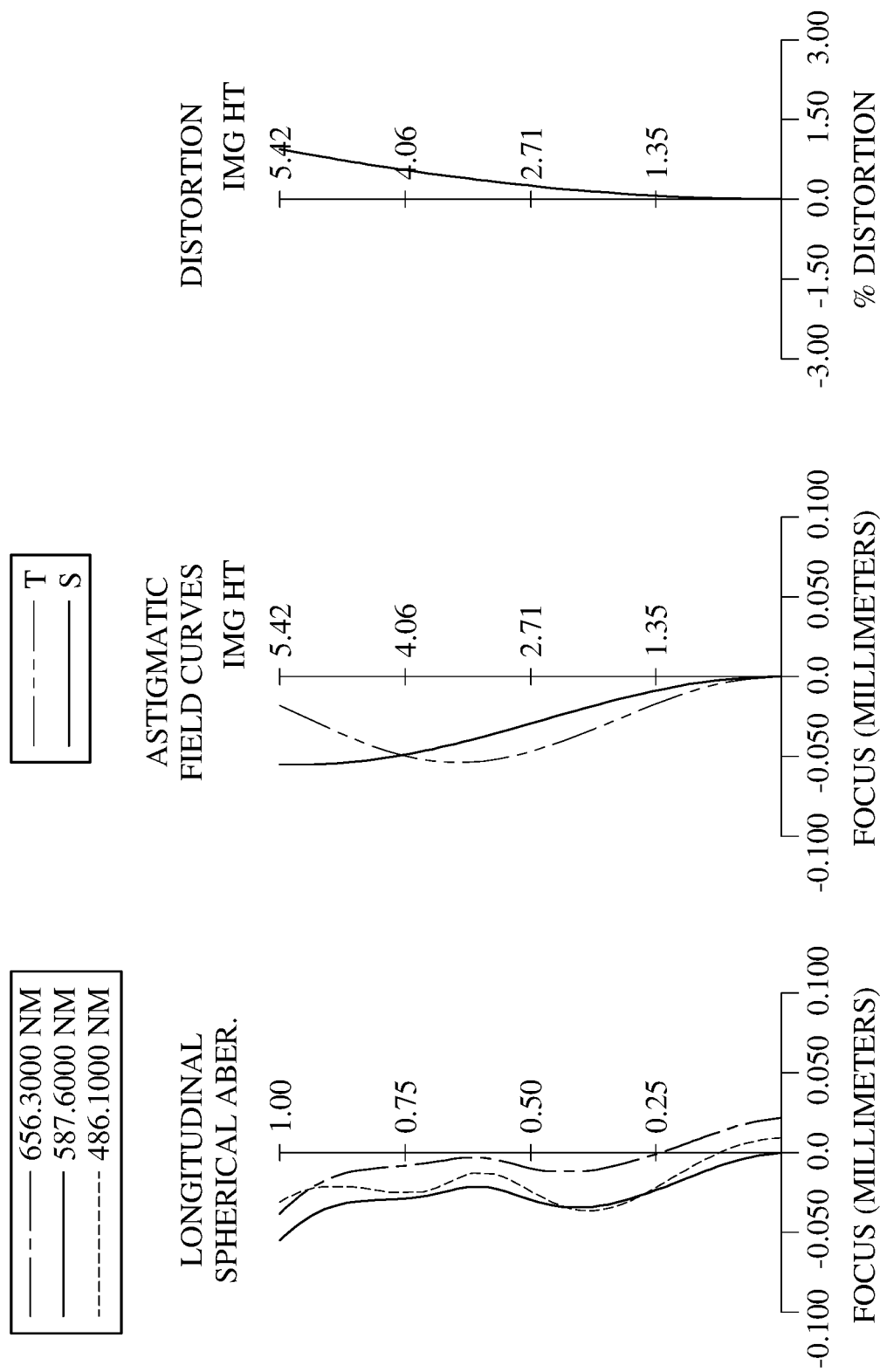
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical image lens assembly (its reference numeral is omitted) of the present disclosure and an image sensor 490. The optical image lens assembly includes, in order from an object side to an image side along an optical path, a first lens element 410, a second lens element 420, a third lens element 430, a fourth lens element 440, a fifth lens element 450, an aperture stop 400, a sixth lens element 460, a filter 470 and an image surface 480. The optical image lens assembly includes six lens elements (410, 420, 430, 440, 450 and 460) with no additional lens element disposed between each of the adjacent six lens elements, wherein there is an air gap along an optical axis between each of all adjacent lens elements.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric. The image-side surface 412 of the first lens element 410 has at least one inflection point.

The second lens element 420 with negative refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric. The object-side surface 421 of the second lens element 420 has at least one inflection point. The image-side surface 422 of the second lens element 420 has at least one inflection point.

The third lens element 430 with negative refractive power has an object-side surface 431 being concave in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has at least one inflection point. The image-side surface 432 of the third lens element 430 has at least one inflection point.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric. The object-side surface 441 of the fourth lens element 440 has at least one inflection point. The image-side surface 442 of the fourth lens element 440 has at least one inflection point.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The object-side surface 451 of the fifth lens element 450 has at least one inflection point. The image-side surface 452 of the fifth lens element 450 has at least one inflection point.

The sixth lens element 460 with positive refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The object-side surface 461 of the sixth lens element 460 has at least one inflection point. The image-side surface 462 of the sixth lens element 460 has at least one inflection point.

The filter 470 is made of glass material and located between the sixth lens element 460 and the image surface 480, and will not affect the focal length of the optical image lens assembly. The image sensor 490 is disposed on or near the image surface 480 of the optical image lens assembly.

The detailed optical data of the 4th embodiment are shown in Table 7 and the aspheric surface data are shown in Table 8 below.

TABLE 7

4th Embodiment
f = 28.00 mm, Fno = 3.20, HFOV = 10.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.672 | (ASP) | 2.386 | Plastic | 1.544 | 56.0 | 10.81 |
| 2 | | −22.398 | (ASP) | 0.230 | | | | |
| 3 | Lens 2 | −65.733 | (ASP) | 0.897 | Plastic | 1.679 | 18.4 | −191.55 |
| 4 | | −133.595 | (ASP) | 0.080 | | | | |
| 5 | Lens 3 | −28.799 | (ASP) | 0.550 | Plastic | 1.566 | 37.4 | −11.73 |
| 6 | | 8.686 | (ASP) | 0.978 | | | | |
| 7 | Lens 4 | −14.104 | (ASP) | 0.577 | Plastic | 1.544 | 56.0 | −71.90 |
| 8 | | −22.383 | (ASP) | 0.118 | | | | |
| 9 | Lens 5 | −6.415 | (ASP) | 0.677 | Plastic | 1.686 | 18.4 | −141.25 |
| 10 | | −7.165 | (ASP) | −0.080 | | | | |
| 11 | Ape. Stop | Plano | | 0.250 | | | | |
| 12 | Lens 6 | 2.948 | (ASP) | 0.787 | Plastic | 1.544 | 56.0 | 24.96 |
| 13 | | 3.413 | (ASP) | 12.000 | | | | |
| 14 | Filter | Plano | | 0.452 | Glass | 1.517 | 64.2 | — |
| 15 | | Plano | | 8.045 | | | | |
| 16 | Image | Plano | | — | | | | |

Note:
Reference wavelength is 587.6 nm (d-line).

TABLE 8

Aspheric Coefficients

| Surface # | 1 | 2 | 3 | 4 |
|---|---|---|---|---|
| k = | −2.2808E−01 | 1.6785E−02 | −9.0000E+01 | −9.0000E+01 |
| A4 = | 1.9152E−04 | 5.4874E−04 | −3.4602E−03 | −4.8215E−03 |
| A6 = | −4.2275E−05 | 6.6033E−05 | 7.1320E−04 | 1.4857E−03 |
| A8 = | 3.8156E−06 | −1.2420E−06 | −7.5401E−05 | −2.0386E−04 |
| A10 = | −1.7035E−07 | −2.4724E−07 | 4.6006E−06 | 1.5548E−05 |
| A12 = | 3.8045E−09 | 2.1419E−08 | −1.4297E−07 | −5.8879E−07 |
| A14 = | −2.9604E−11 | −5.3560E−10 | 1.6811E−09 | 8.4465E−09 |
| A16 = | — | — | — | — |

| Surface # | 5 | 6 | 7 | 8 |
|---|---|---|---|---|
| k = | 3.2163E+01 | 1.0472E+00 | −1.7060E+01 | 2.0785E+01 |
| A4 = | 2.4336E−03 | −7.5977E−04 | 1.2281E−03 | 4.0846E−04 |
| A6 = | 7.1474E−04 | −8.7599E−06 | −5.4754E−05 | 1.5018E−04 |
| A8 = | −1.0704E−04 | 1.3679E−06 | −1.4198E−06 | −2.2210E−05 |
| A10 = | 8.1290E−06 | −5.2589E−08 | 2.6143E−07 | 3.7143E−06 |
| A12 = | −2.3708E−07 | −1.1770E−08 | 2.1716E−08 | −3.5446E−07 |
| A14 = | −1.4392E−09 | 5.1181E−10 | −8.1961E−10 | 2.1479E−08 |
| A16 = | 1.1963E−10 | — | — | −5.6434E−10 |

| Surface # | 9 | 10 | 12 | 13 |
|---|---|---|---|---|
| k = | −3.0505E+01 | −2.8554E+01 | −4.4377E+00 | −6.7506E+00 |
| A4 = | 3.5251E−03 | 2.8773E−03 | 4.4153E−03 | 7.2112E−03 |
| A6 = | −4.4590E−04 | −5.6755E−04 | −1.3533E−03 | −1.8412E−03 |
| A8 = | 7.6323E−05 | 1.2191E−04 | 1.7065E−04 | 2.3388E−04 |
| A10 = | −7.2828E−06 | −1.4747E−05 | −1.5801E−05 | −2.1594E−05 |
| A12 = | 4.4572E−07 | 1.1106E−06 | 9.3426E−07 | 1.3211E−06 |
| A14 = | −1.3579E−08 | −4.5359E−08 | −2.9962E−08 | −4.6255E−08 |
| A16 = | 1.1429E−10 | 8.0587E−10 | 3.8374E−10 | 6.8791E−10 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 28.00 | TL/f | 1.00 |
| Fno | 3.20 | BL/TD | 2.75 |
| HFOV [deg.] | 10.9 | Fno × EPD [mm] | 28.00 |
| Vdmin | 18.4 | EPD/ΣAT | 5.55 |
| V5/V6 | 0.33 | EPD/Y11 | 1.78 |
| (Vi/Ni)min | 10.90 | Ymax/Ymin | 1.43 |
| CT1/CT2 | 2.66 | Y61i/Y62i | 0.98 |
| CT1/ATmax | 2.44 | ΣAT/BL | 0.08 |
| (R3 − R4)/(R3 + R4) | −0.34 | BL/ImgH | 3.78 |
| (R10 + R11)/(R10 − R11) | 0.42 | f/ImgH | 5.17 |
| (R11 − R12)/(R11 + R12) | −0.07 | Y11/ImgH | 0.91 |
| f/f3 | −2.39 | ImgH/tan(FOV) [mm] | 13.60 |
| f2/f3 | 16.33 | ImgH [mm] | 5.42 |

5th Embodiment

Figure 9:
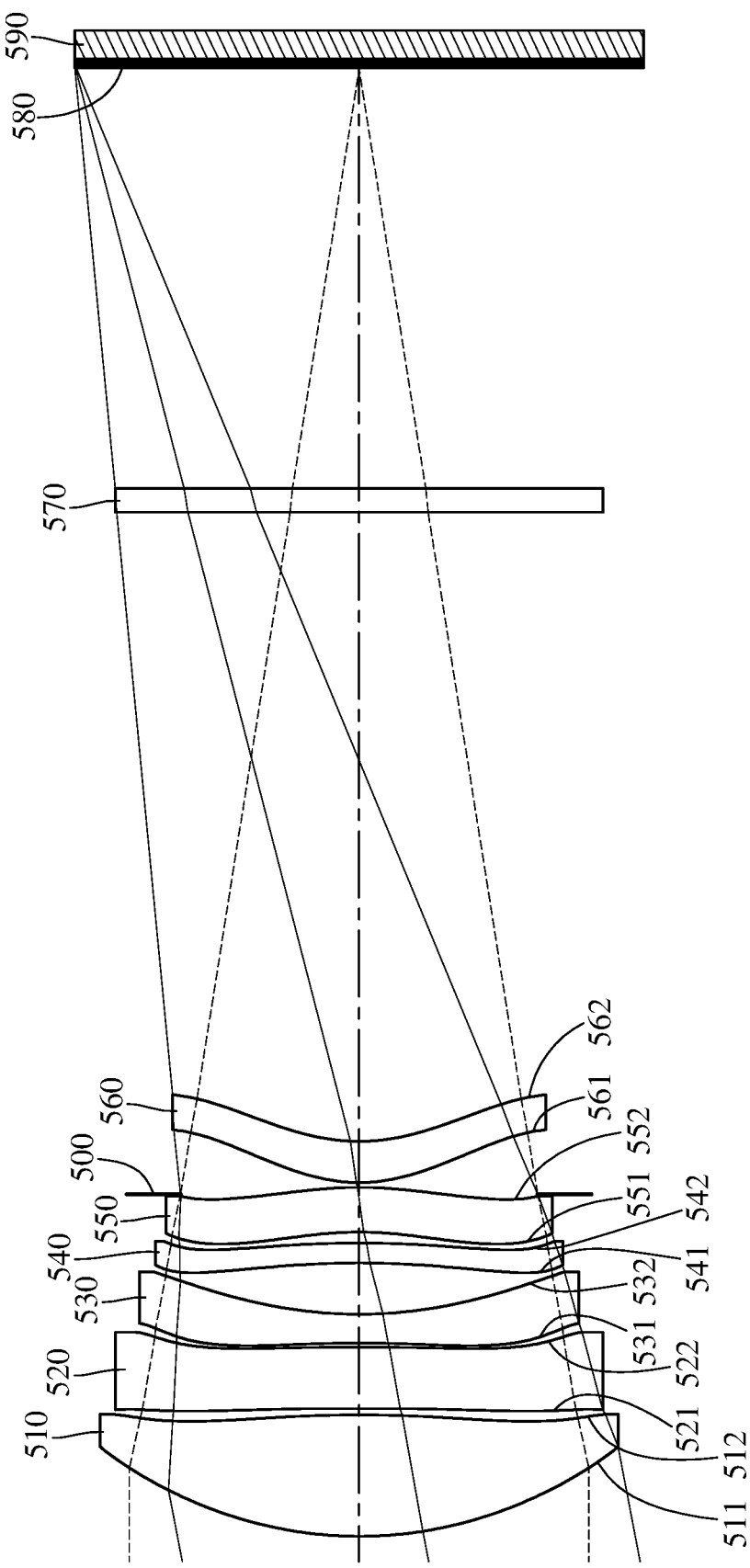
FIG. 9 is a schematic view of an image capturing unit according to the 5th embodiment of the present disclosure.
Figure 10:
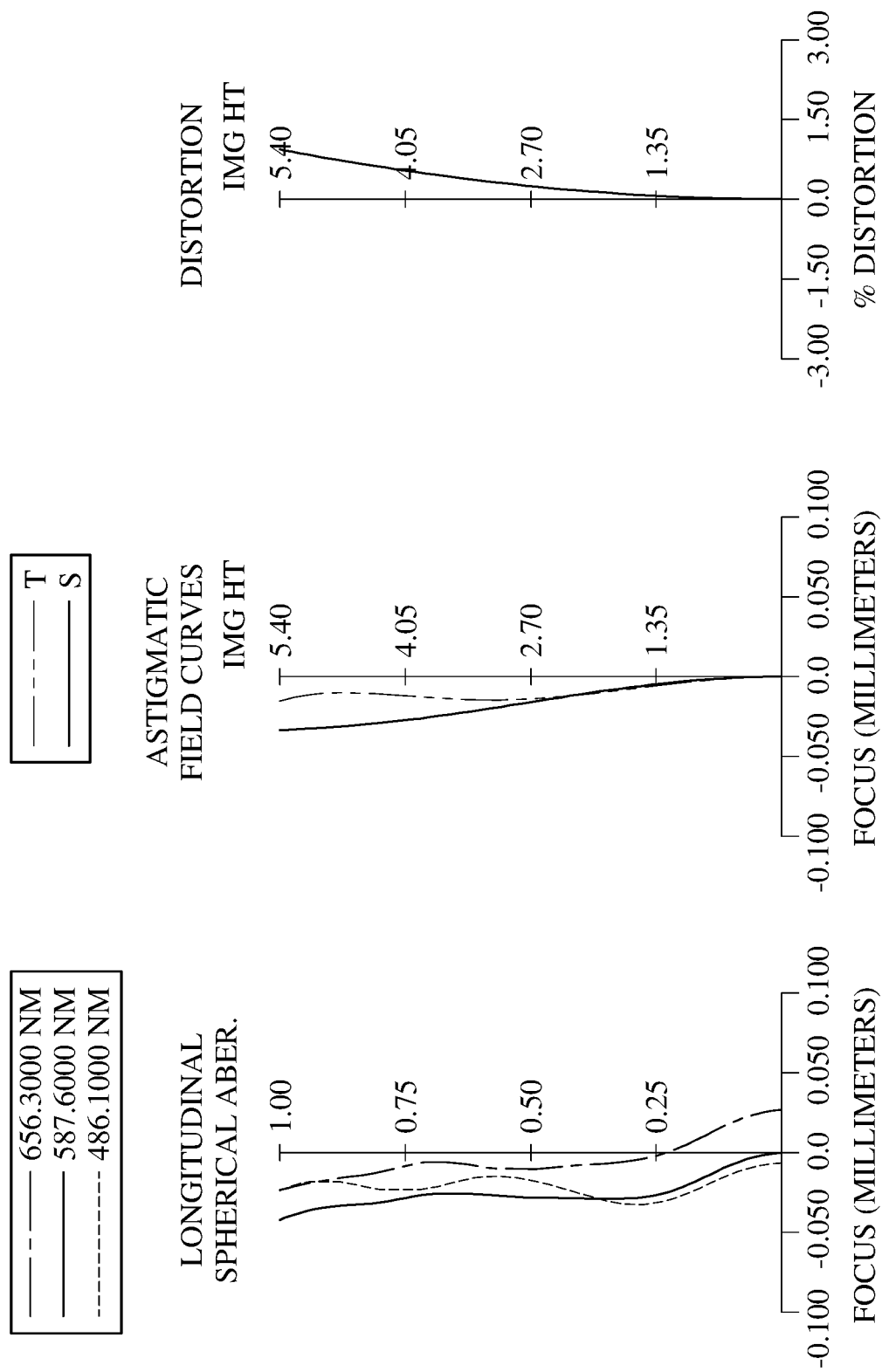
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical image lens assembly (its reference numeral is omitted) of the present disclosure and an image sensor 590. The optical image lens assembly includes, in order from an object side to an image side along an optical path, a first lens element 510, a second lens element 520, a third lens element 530, a fourth lens element 540, a fifth lens element 550, an aperture stop 500, a sixth lens element 560, a filter 570 and an image surface 580. The optical image lens assembly includes six lens elements (510, 520, 530, 540, 550 and 560) with no additional lens element disposed between each of the adjacent six lens elements, wherein there is an air gap along an optical axis between each of all adjacent lens elements.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric. The image-side surface 512 of the first lens element 510 has at least one inflection point.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric. The object-side surface 521 of the second lens element 520 has at least one inflection point. The image-side surface 522 of the second lens element 520 has at least one inflection point.

The third lens element 530 with negative refractive power has an object-side surface 531 being concave in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has at least one inflection point.

The fourth lens element 540 with negative refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has at least one inflection point. The image-side surface 542 of the fourth lens element 540 has at least one inflection point.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The object-side surface 551 of the fifth lens element 550 has at least one inflection point. The image-side surface 552 of the fifth lens element 550 has at least one inflection point.

The sixth lens element 560 with positive refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The object-side surface 561 of the sixth lens element 560 has at least one inflection point. The image-side surface 562 of the sixth lens element 560 has at least one inflection point.

The filter 570 is made of glass material and located between the sixth lens element 560 and the image surface 580, and will not affect the focal length of the optical image lens assembly. The image sensor 590 is disposed on or near the image surface 580 of the optical image lens assembly.

The detailed optical data of the 5th embodiment are shown in Table 9 and the aspheric surface data are shown in Table 10 below.

TABLE 9

5th Embodiment
f = 28.00 mm, Fno = 3.20, HFOV = 10.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.811 | (ASP) | 2.314 | Plastic | 1.544 | 56.0 | 11.21 |
| 2 | | −24.795 | (ASP) | 0.120 | | | | |
| 3 | Lens 2 | 1731.454 | (ASP) | 1.170 | Plastic | 1.679 | 18.4 | 301.08 |
| 4 | | −231.813 | (ASP) | 0.080 | | | | |
| 5 | Lens 3 | −26.050 | (ASP) | 0.550 | Plastic | 1.566 | 37.4 | −11.09 |
| 6 | | 8.332 | (ASP) | 0.978 | | | | |
| 7 | Lens 4 | −16.159 | (ASP) | 0.380 | Plastic | 1.544 | 56.0 | −160.95 |
| 8 | | −19.983 | (ASP) | 0.210 | | | | |
| 9 | Lens 5 | −6.171 | (ASP) | 0.851 | Plastic | 1.686 | 18.4 | −69.40 |
| 10 | | −7.489 | (ASP) | −0.130 | | | | |
| 11 | Ape. Stop | Plano | | 0.220 | | | | |
| 12 | Lens 6 | 3.034 | (ASP) | 0.786 | Plastic | 1.544 | 56.0 | 25.52 |
| 13 | | 3.529 | (ASP) | 12.000 | | | | |
| 14 | Filter | Plano | | 0.452 | Glass | 1.517 | 64.2 | — |
| 15 | | Plano | | 8.019 | | | | |
| 16 | Image | Plano | | — | | | | |

Note:
Reference wavelength is 587.6 nm (d-line).

TABLE 10

Aspheric Coefficients

| | Surface # | | | |
|---|---|---|---|---|
| | 1 | 2 | 3 | 4 |
| k = | −2.3147E−01 | 6.7255E+00 | 5.0000E+01 | −9.0000E+01 |
| A4 = | 2.1259E−04 | −6.3046E−05 | −3.4086E−03 | −4.5157E−03 |
| A6 = | −4.3715E−05 | 2.0961E−04 | 7.1214E−04 | 1.4865E−03 |
| A8 = | 3.5521E−06 | −2.0167E−05 | −7.5530E−05 | −2.0392E−04 |
| A10 = | −1.6259E−07 | 1.0924E−06 | 4.5908E−06 | 1.5560E−05 |
| A12 = | 3.8467E−09 | −2.7358E−08 | −1.4300E−07 | −5.8842E−07 |
| A14 = | −2.8763E−11 | 1.9506E−10 | 1.7141E−09 | 8.3962E−09 |
| A16 = | — | — | — | — |

TABLE 10-continued

Aspheric Coefficients

| Surface # | | | | |
|---|---|---|---|---|
| | 5 | 6 | 7 | 8 |
| k = | 3.0101E+01 | 8.9953E−01 | −7.4086E+00 | 1.8177E+01 |
| A4 = | 2.6350E−04 | −9.0285E−04 | 1.1360E−03 | 5.9086E−04 |
| A6 = | 7.2489E−04 | −3.5519E−06 | −4.7235E−05 | 1.5489E−04 |
| A8 = | −1.0642E−04 | 1.4668E−06 | −5.5495E−07 | −2.1967E−05 |
| A10 = | 8.1309E−06 | −3.1327E−08 | 3.0736E−07 | 3.7425E−06 |
| A12 = | −2.3765E−07 | −1.1008E−08 | 2.2358E−08 | −3.5264E−07 |
| A14 = | −1.4457E−09 | 3.8209E−10 | −1.0182E−09 | 2.1530E−08 |
| A16 = | 1.2117E−10 | — | — | −5.6750E−10 |

| Surface # | | | | |
|---|---|---|---|---|
| | 9 | 10 | 12 | 13 |
| k = | −2.5023E+01 | −2.6861E+01 | −4.5765E+00 | −6.8130E+00 |
| A4 = | 1.0718E−03 | 8.9789E−04 | 4.2825E−03 | 6.5768E−03 |
| A6 = | 4.6957E−04 | 1.9520E−04 | −1.2708E−03 | −1.7848E−03 |
| A8 = | −8.4713E−05 | −1.3202E−05 | 1.7548E−04 | 2.6443E−04 |
| A10 = | 8.6154E−06 | −2.2639E−06 | −1.8575E−05 | −2.8937E−05 |
| A12 = | −4.5942E−07 | 5.0799E−07 | 1.2540E−06 | 2.0319E−06 |
| A14 = | 1.4060E−08 | −3.2744E−08 | −4.6314E−08 | −7.9532E−08 |
| A16 = | −2.3538E−10 | 7.6556E−10 | 7.1115E−10 | 1.3113E−09 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 28.00 | TL/f | 1.00 |
| Fno | 3.20 | BL/TD | 2.72 |
| HFOV [deg.] | 10.8 | Fno × EPD [mm] | 28.00 |
| Vdmin | 18.4 | EPD/ΣAT | 5.92 |
| V5/V6 | 0.33 | EPD/Y11 | 1.77 |
| (Vi/Ni)min | 10.90 | Ymax/Ymin | 1.44 |
| CT1/CT2 | 1.98 | Y61i/Y62i | 0.99 |
| CT1/ATmax | 2.37 | ΣAT/BL | 0.07 |
| (R3 − R4)/(R3 + R4) | 1.31 | BL/ImgH | 3.79 |
| (R10 + R11)/(R10 − R11) | 0.42 | f/ImgH | 5.19 |
| (R11 − R12)/(R11 + R12) | −0.08 | Y11/ImgH | 0.91 |
| f/f3 | −2.53 | ImgH/tan(FOV) [mm] | 13.60 |
| f2/f3 | −27.15 | ImgH [mm] | 5.40 |

6th Embodiment

Figure 11:
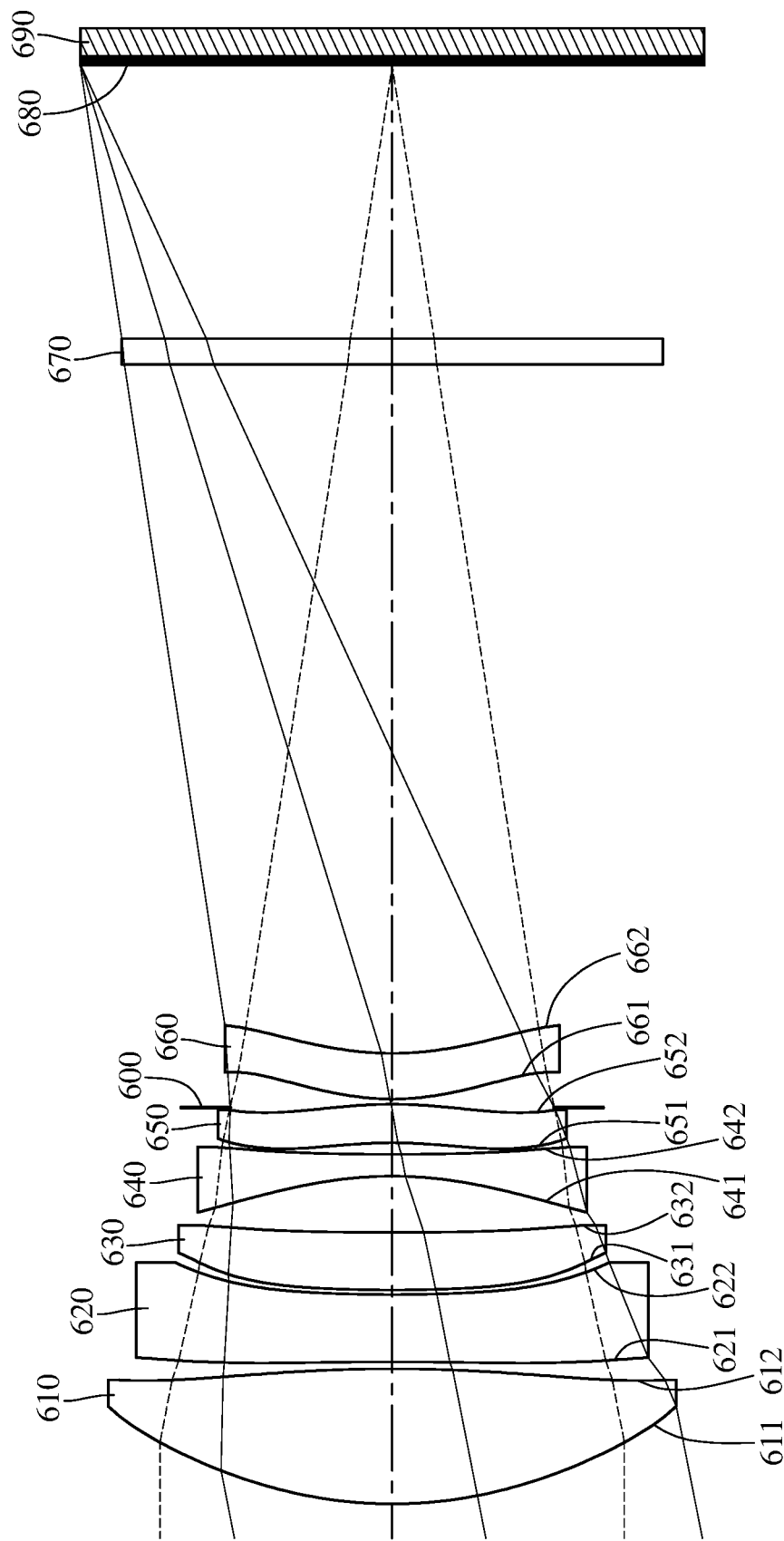
FIG. 11 is a schematic view of an image capturing unit according to the 6th embodiment of the present disclosure.
Figure 12:
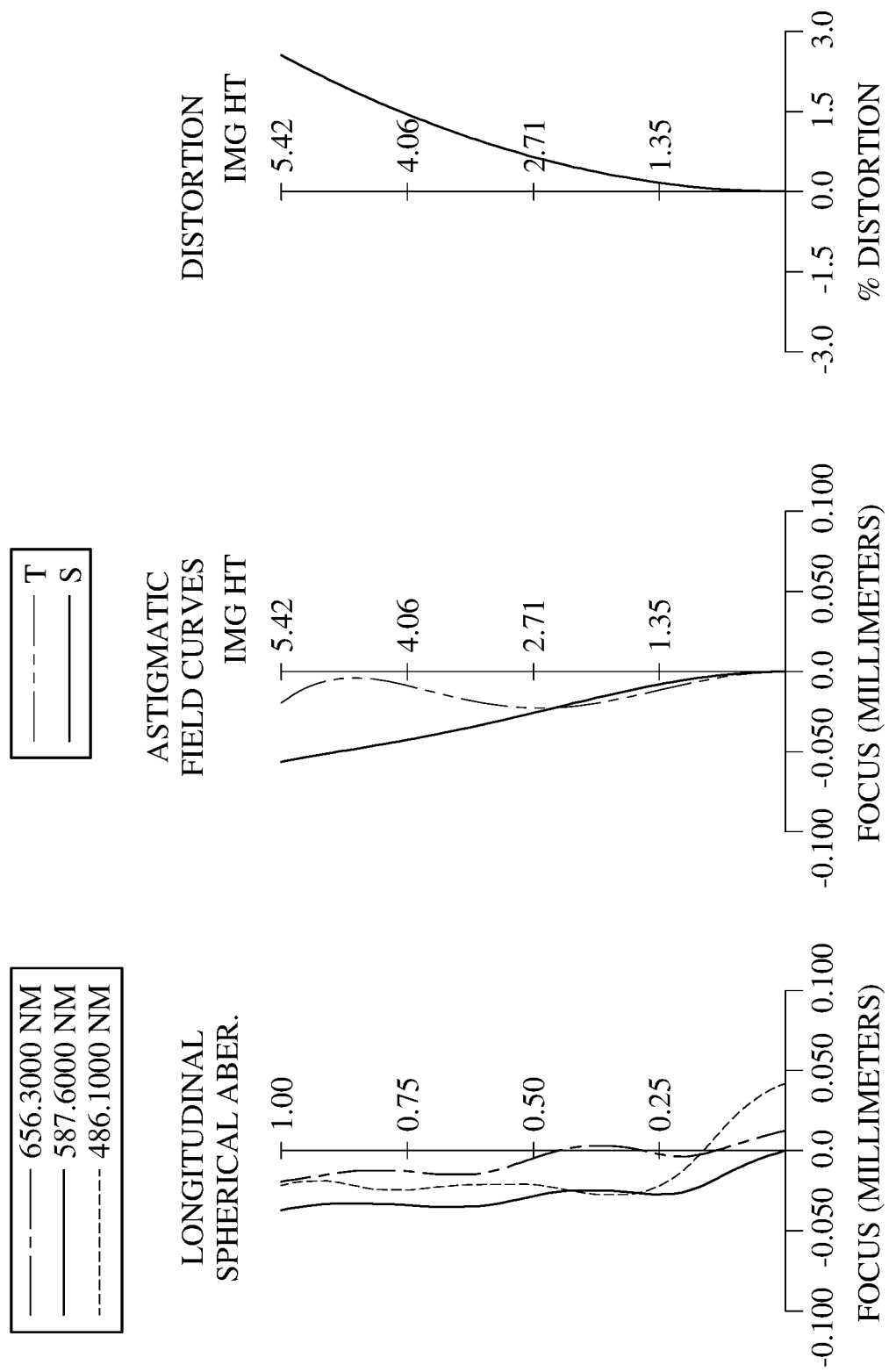
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical image lens assembly (its reference numeral is omitted) of the present disclosure and an image sensor 690. The optical image lens assembly includes, in order from an object side to an image side along an optical path, a first lens element 610, a second lens element 620, a third lens element 630, a fourth lens element 640, a fifth lens element 650, an aperture stop 600, a sixth lens element 660, a filter 670 and an image surface 680. The optical image lens assembly includes six lens elements (610, 620, 630, 640, 650 and 660) with no additional lens element disposed between each of the adjacent six lens elements, wherein there is an air gap along an optical axis between each of all adjacent lens elements.

The first lens element 610 with positive refractive power has an object-side surface 611 being convex in a paraxial region thereof and an image-side surface 612 being convex in a paraxial region thereof. The first lens element 610 is made of glass material and has the object-side surface 611 and the image-side surface 612 being both aspheric. The image-side surface 612 of the first lens element 610 has at least one inflection point.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has at least one inflection point.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has at least one inflection point. The image-side surface 632 of the third lens element 630 has at least one inflection point.

The fourth lens element 640 with negative refractive power has an object-side surface 641 being concave in a paraxial region thereof and an image-side surface 642 being concave in a paraxial region thereof. The fourth lens element 640 is made of plastic material and has the object-side surface 641 and the image-side surface 642 being both aspheric. The image-side surface 642 of the fourth lens element 640 has at least one inflection point.

The fifth lens element 650 with positive refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. The object-side surface 651 of the fifth lens element 650 has at least one inflection point. The image-side surface 652 of the fifth lens element 650 has at least one inflection point.

The sixth lens element 660 with positive refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The object-side surface 661 of the sixth lens element 660 has at least one inflection point. The image-side surface 662 of the sixth lens element 660 has at least one inflection point.

The filter 670 is made of glass material and located between the sixth lens element 660 and the image surface 680, and will not affect the focal length of the optical image lens assembly. The image sensor 690 is disposed on or near the image surface 680 of the optical image lens assembly.

The detailed optical data of the 6th embodiment are shown in Table 11 and the aspheric surface data are shown in Table 12 below.

TABLE 11

6th Embodiment
f = 26.67 mm, Fno = 3.30, HFOV = 11.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.694 | (ASP) | 2.352 | Glass | 1.571 | 53.0 | 10.85 |
| 2 | | −28.423 | (ASP) | 0.120 | | | | |
| 3 | Lens 2 | −110.014 | (ASP) | 1.174 | Plastic | 1.700 | 16.5 | −30.51 |
| 4 | | 26.622 | (ASP) | 0.080 | | | | |
| 5 | Lens 3 | 26.992 | (ASP) | 1.003 | Plastic | 1.566 | 37.4 | 70.41 |
| 6 | | 82.500 | (ASP) | 0.981 | | | | |
| 7 | Lens 4 | −6.802 | (ASP) | 0.380 | Plastic | 1.544 | 56.0 | −11.09 |
| 8 | | 53.961 | (ASP) | 0.201 | | | | |
| 9 | Lens 5 | −7.798 | (ASP) | 0.672 | Plastic | 1.686 | 18.4 | 1856.73 |
| 10 | | −8.022 | (ASP) | −0.060 | | | | |
| 11 | Ape. Stop | Plano | | 0.150 | | | | |
| 12 | Lens 6 | 4.406 | (ASP) | 0.798 | Plastic | 1.544 | 56.0 | 32.05 |
| 13 | | 5.521 | (ASP) | 12.000 | | | | |
| 14 | Filter | Plano | | 0.452 | Glass | 1.517 | 64.2 | — |
| 15 | | Plano | | 4.763 | | | | |
| 16 | Image | Plano | | — | | | | |

Note:
Reference wavelength is 587.6 nm (d-line).

TABLE 12

Aspheric Coefficients

| | Surface # | | | |
|---|---|---|---|---|
| | 1 | 2 | 3 | 4 |
| k = | −4.8705E−01 | −2.5228E+00 | −9.0000E+01 | 1.8907E+01 |
| A4 = | 4.5700E−05 | −5.6468E−04 | −1.0713E−03 | −2.0082E−03 |
| A6 = | −3.3789E−05 | 1.8285E−04 | 4.3033E−04 | 9.8238E−04 |
| A8 = | 2.8379E−06 | −1.7788E−05 | −4.9825E−05 | −1.2502E−04 |
| A10 = | −1.4803E−07 | 9.2311E−07 | 2.9502E−06 | 6.9518E−06 |
| A12 = | 4.5757E−09 | −2.3010E−08 | −8.8157E−08 | 3.4366E−09 |
| A14 = | −4.1047E−11 | 2.1301E−10 | 1.0358E−09 | −1.6700E−08 |
| A16 = | — | — | — | 5.0430E−10 |

| | Surface # | | | |
|---|---|---|---|---|
| | 5 | 6 | 7 | 8 |
| k = | −9.0000E+01 | 5.0000E+01 | −2.8173E+00 | −9.0000E+01 |
| A4 = | −1.5644E−04 | 6.4257E−04 | 1.2373E−03 | 6.3735E−04 |
| A6 = | 7.6543E−04 | −1.1462E−05 | −2.6036E−05 | 9.7741E−05 |
| A8 = | −1.0682E−04 | 1.2331E−06 | −1.2333E−06 | −2.6752E−05 |
| A10 = | 8.0483E−06 | −1.5543E−08 | 1.3983E−07 | 3.5171E−06 |
| A12 = | −2.4110E−07 | −1.2198E−08 | 1.0969E−08 | −3.5876E−07 |
| A14 = | −1.5698E−09 | −2.1561E−10 | −8.7370E−10 | 2.1310E−08 |
| A16 = | 1.0051E−10 | — | — | −5.8913E−10 |

TABLE 12-continued

Aspheric Coefficients

| Surface # | | | | |
|---|---|---|---|---|
| | 9 | 10 | 12 | 13 |
| k = | −5.4291E+01 | −4.6985E+01 | −7.0818E+00 | −5.5793E+00 |
| A4 = | −1.1528E−03 | −5.7162E−03 | −1.9346E−03 | −1.1706E−04 |
| A6 = | 2.9425E−03 | 4.1126E−03 | 1.3201E−03 | −2.3689E−04 |
| A8 = | −7.0461E−04 | −9.4432E−04 | −4.8634E−04 | 8.1607E−05 |
| A10 = | 9.6967E−05 | 1.2639E−04 | 7.8805E−05 | −2.7504E−05 |
| A12 = | −8.0108E−06 | −9.8129E−06 | −7.8585E−06 | 3.8389E−06 |
| A14 = | 3.6525E−07 | 3.9332E−07 | 4.4669E−07 | −2.4988E−07 |
| A16 = | −6.7758E−09 | −5.2114E−09 | −1.0892E−08 | 6.4297E−09 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 26.67 | TL/f | 0.94 |
| Fno | 3.30 | BL/TD | 2.19 |
| HFOV [deg.] | 11.2 | Fno × EPD [mm] | 26.67 |
| Vdmin | 16.5 | EPD/ΣAT | 5.49 |
| V5/V6 | 0.33 | EPD/Y11 | 1.63 |
| (Vi/Ni)min | 9.71 | Ymax/Ymin | 1.74 |
| CT1/CT2 | 2.00 | Y61i/Y62i | 0.90 |
| CT1/ATmax | 2.40 | ΣAT/BL | 0.09 |
| (R3 − R4)/(R3 + R4) | 1.64 | BL/ImgH | 3.18 |
| (R10 + R11)/(R10 − R11) | 0.29 | f/ImgH | 4.92 |
| (R11 − R12)/(R11 + R12) | −0.11 | Y11/ImgH | 0.91 |
| f/f3 | 0.38 | ImgH/tan(FOV) [mm] | 13.12 |
| f2/f3 | −0.43 | ImgH [mm] | 5.42 |

7th Embodiment

Figure 13:
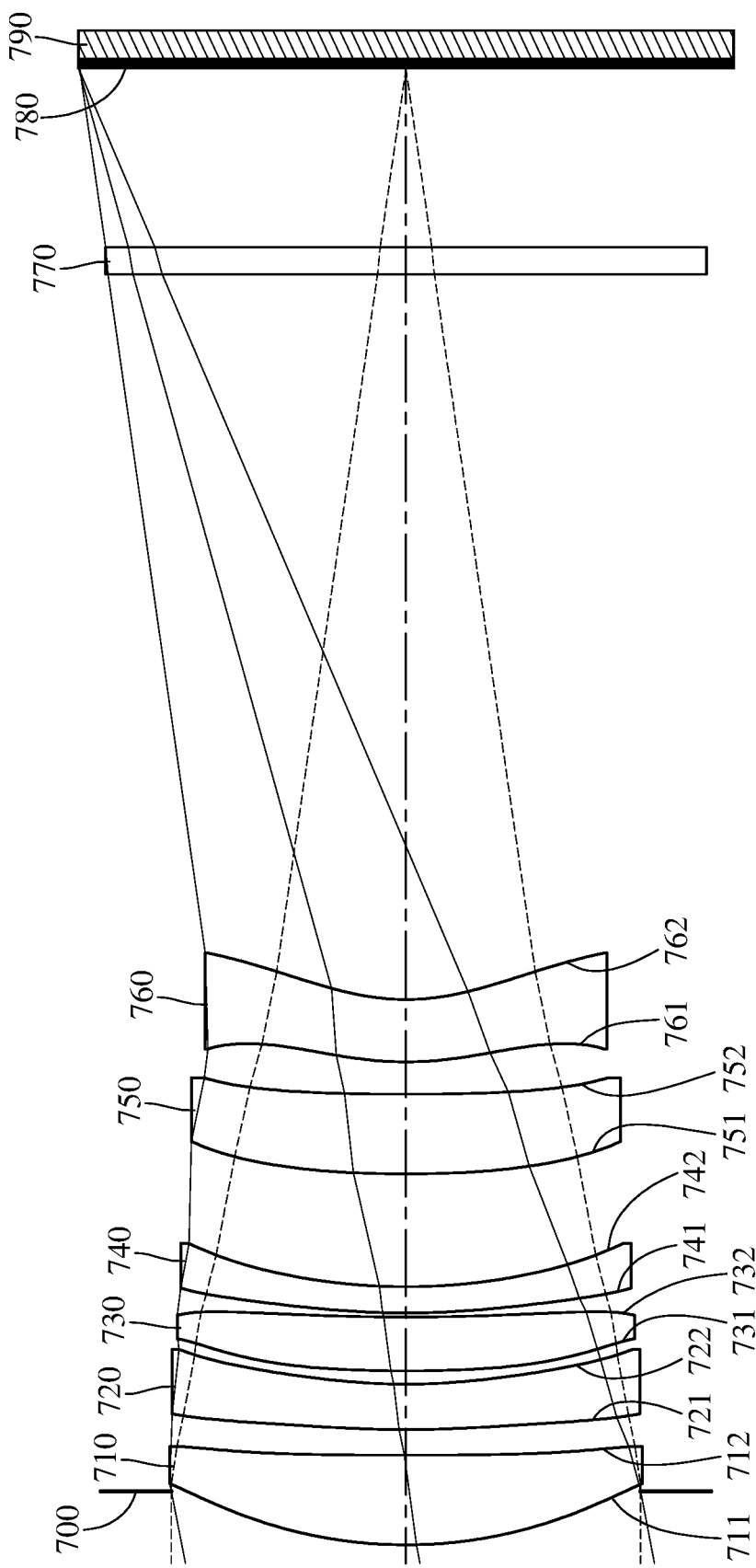
FIG. 13 is a schematic view of an image capturing unit according to the 7th embodiment of the present disclosure.
Figure 14:
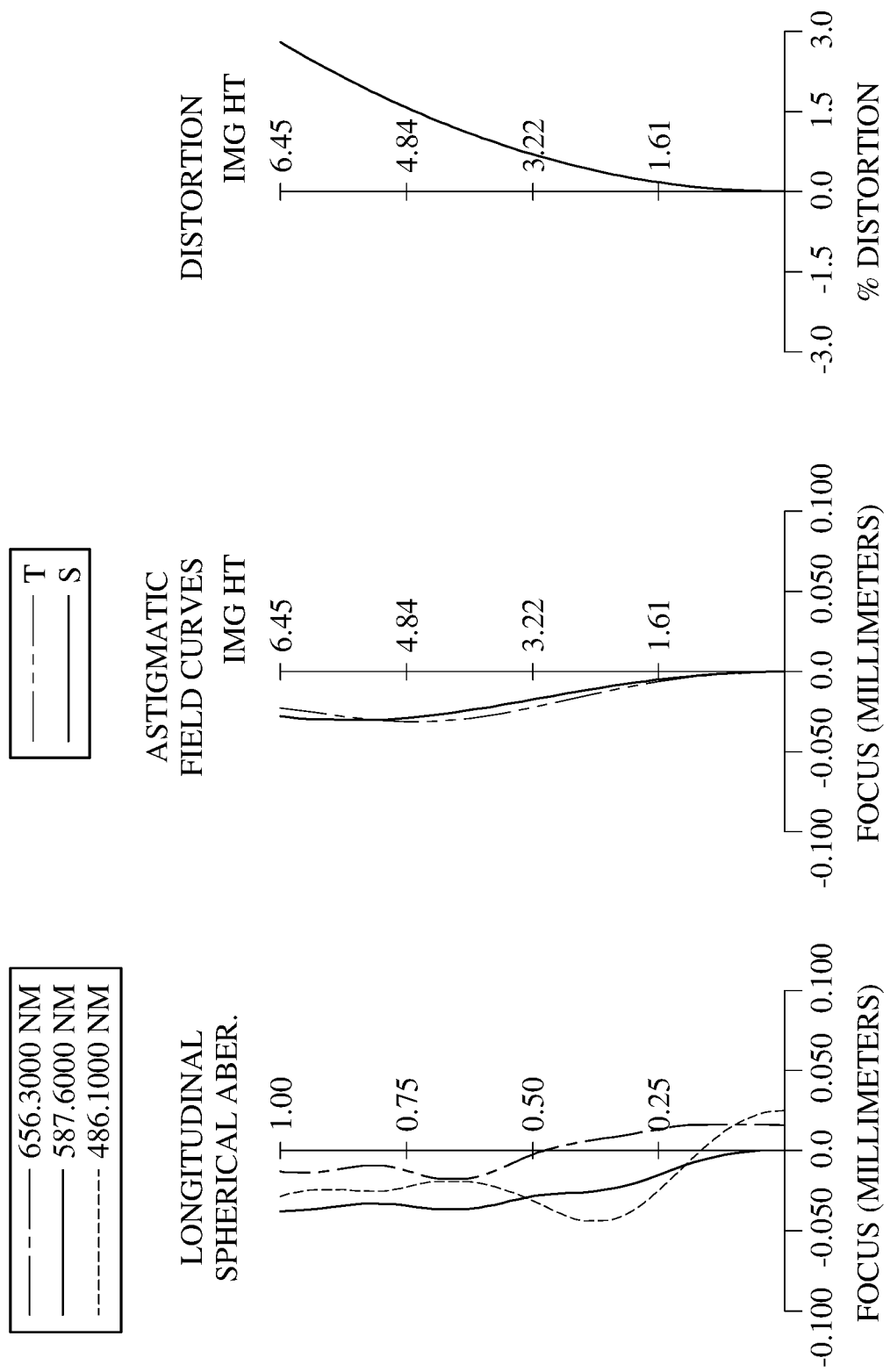
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical image lens assembly (its reference numeral is omitted) of the present disclosure and an image sensor 790. The optical image lens assembly includes, in order from an object side to an image side along an optical path, an aperture stop 700, a first lens element 710, a second lens element 720, a third lens element 730, a fourth lens element 740, a fifth lens element 750, a sixth lens element 760, a filter 770 and an image surface 780. The optical image lens assembly includes six lens elements (710, 720, 730, 740, 750 and 760) with no additional lens element disposed between each of the adjacent six lens elements, wherein there is an air gap along an optical axis between each of all adjacent lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has at least one inflection point. The image-side surface 712 of the first lens element 710 has at least one inflection point.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has at least one inflection point. The image-side surface 732 of the third lens element 730 has at least one inflection point.

The fourth lens element 740 with negative refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric.

The fifth lens element 750 with positive refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric.

The sixth lens element 760 with negative refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The object-side surface 761 of the sixth lens element 760 has at least one inflection point. The image-side surface 762 of the sixth lens element 760 has at least one inflection point.

The filter 770 is made of glass material and located between the sixth lens element 760 and the image surface 780, and will not affect the focal length of the optical image lens assembly. The image sensor 790 is disposed on or near the image surface 780 of the optical image lens assembly.

The detailed optical data of the 7th embodiment are shown in Table 13 and the aspheric surface data are shown in Table 14 below.

TABLE 13

7th Embodiment
f = 32.32 mm, Fno = 3.50, HFOV = 11.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.054 | | | | |
| 2 | Lens 1 | 9.137 | (ASP) | 1.766 | Plastic | 1.544 | 56.0 | 17.84 |
| 3 | | 146.277 | (ASP) | 0.503 | | | | |
| 4 | Lens 2 | 19.761 | (ASP) | 0.893 | Plastic | 1.710 | 15.0 | −35.25 |
| 5 | | 10.835 | (ASP) | 0.264 | | | | |
| 6 | Lens 3 | 27.139 | (ASP) | 1.060 | Plastic | 1.544 | 56.0 | 139.13 |
| 7 | | 41.741 | (ASP) | 0.080 | | | | |
| 8 | Lens 4 | 15.274 | (ASP) | 0.517 | Plastic | 1.544 | 56.0 | −108.92 |
| 9 | | 11.997 | (ASP) | 2.222 | | | | |
| 10 | Lens 5 | 25.744 | (ASP) | 1.571 | Plastic | 1.686 | 18.4 | 52.33 |
| 11 | | 88.735 | (ASP) | 0.635 | | | | |
| 12 | Lens 6 | 6.464 | (ASP) | 1.228 | Plastic | 1.535 | 56.3 | −33.27 |
| 13 | | 4.427 | (ASP) | 14.280 | | | | |
| 14 | Filter | Plano | | 0.537 | Glass | 1.517 | 64.2 | — |
| 15 | | Plano | | 3.528 | | | | |
| 16 | Image | Plano | | — | | | | |

Note:
Reference wavelength is 587.6 nm (d-line).

TABLE 14

Aspheric Coefficients

| | Surface # | | | |
|---|---|---|---|---|
| | 2 | 3 | 4 | 5 |
| k = | −1.9020E−02 | 5.0000E+01 | −1.5077E+00 | 1.1611E+00 |
| A4 = | 8.2798E−05 | 1.5936E−04 | −2.5230E−03 | −4.0904E−03 |
| A6 = | −1.3106E−05 | 2.4600E−05 | 2.9522E−04 | 6.1389E−04 |
| A8 = | 7.9674E−07 | −4.4893E−07 | −2.2267E−05 | −5.9837E−05 |
| A10 = | −3.1972E−08 | −6.4245E−08 | 9.7434E−07 | 3.2450E−06 |
| A12 = | 5.7254E−10 | 2.9389E−09 | −2.0713E−08 | −8.7509E−08 |
| A14 = | −2.4087E−11 | −5.6092E−11 | 1.5926E−10 | 9.2048E−10 |
| A16 = | — | — | — | — |

| | Surface # | | | |
|---|---|---|---|---|
| | 6 | 7 | 8 | 9 |
| k = | 2.5395E+01 | 2.3523E+01 | −4.4973E+01 | −8.6355E+00 |
| A4 = | −3.3677E−04 | −2.9595E−04 | 1.6060E−04 | 5.7985E−04 |
| A6 = | 2.8925E−04 | −8.4061E−06 | 3.7495E−07 | 1.4755E−05 |
| A8 = | −3.2547E−05 | 8.0981E−07 | −8.9053E−07 | −4.6586E−06 |
| A10 = | 1.6962E−06 | −1.1002E−08 | 2.3313E−08 | 7.1212E−07 |
| A12 = | −3.4960E−08 | −2.4002E−09 | 2.7492E−09 | −5.8933E−08 |
| A14 = | −1.9281E−10 | 2.0646E−11 | −6.5191E−11 | 2.6194E−09 |
| A16 = | 9.0098E−12 | — | — | −4.6617E−11 |

| | Surface # | | | |
|---|---|---|---|---|
| | 10 | 11 | 12 | 13 |
| k = | 4.6879E+00 | 5.0000E+01 | −5.1148E+00 | −3.0360E+00 |
| A4 = | 1.6379E−03 | 1.8616E−03 | −2.3148E−03 | −2.2509E−03 |
| A6 = | −1.8998E−04 | −2.7202E−04 | −1.7706E−04 | 2.1003E−05 |
| A8 = | 2.1296E−05 | 3.6028E−05 | 2.7067E−05 | 5.9971E−07 |
| A10 = | −1.5239E−06 | −3.0811E−06 | −2.5341E−06 | 1.4607E−07 |
| A12 = | 6.8137E−08 | 1.6521E−07 | 1.5255E−07 | −1.5228E−08 |
| A14 = | −1.5235E−09 | −4.5178E−09 | −5.1054E−09 | 5.1521E−10 |
| A16 = | 1.0968E−11 | 4.3543E−11 | 6.6018E−11 | −6.2414E−12 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 32.32 | TL/f | 0.90 |
| Fno | 3.50 | BL/TD | 1.71 |
| HFOV [deg.] | 11.0 | Fno × EPD [mm] | 32.32 |
| Vdmin | 15.0 | EPD/ΣAT | 2.49 |
| V5/V6 | 0.33 | EPD/Y11 | 1.99 |
| (Vi/Ni)min | 8.77 | Ymax/Ymin | 1.19 |
| CT1/CT2 | 1.98 | Y61i/Y62i | 0.75 |
| CT1/ATmax | 0.79 | ΣAT/BL | 0.20 |
| (R3 − R4)/(R3 + R4) | 0.29 | BL/ImgH | 2.85 |
| (R10 + R11)/(R10 − R11) | 1.16 | f/ImgH | 5.01 |
| (R11 − R12)/(R11 + R12) | 0.19 | Y11/ImgH | 0.72 |
| f/f3 | 0.23 | ImgH/tan(FOV) [mm] | 15.97 |
| f2/f3 | −0.25 | ImgH [mm] | 6.45 |

8th Embodiment

Figure 15:
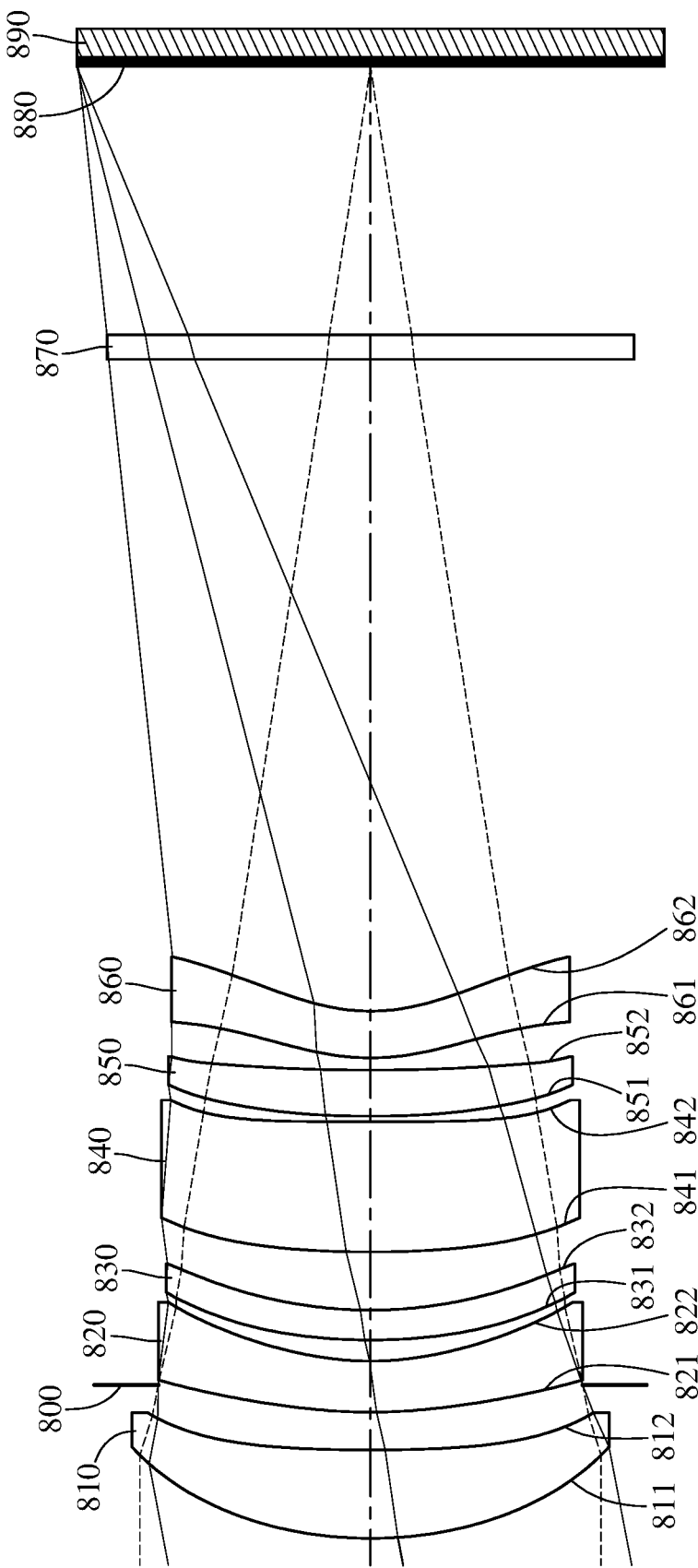
FIG. 15 is a schematic view of an image capturing unit according to the 8th embodiment of the present disclosure.
Figure 16:
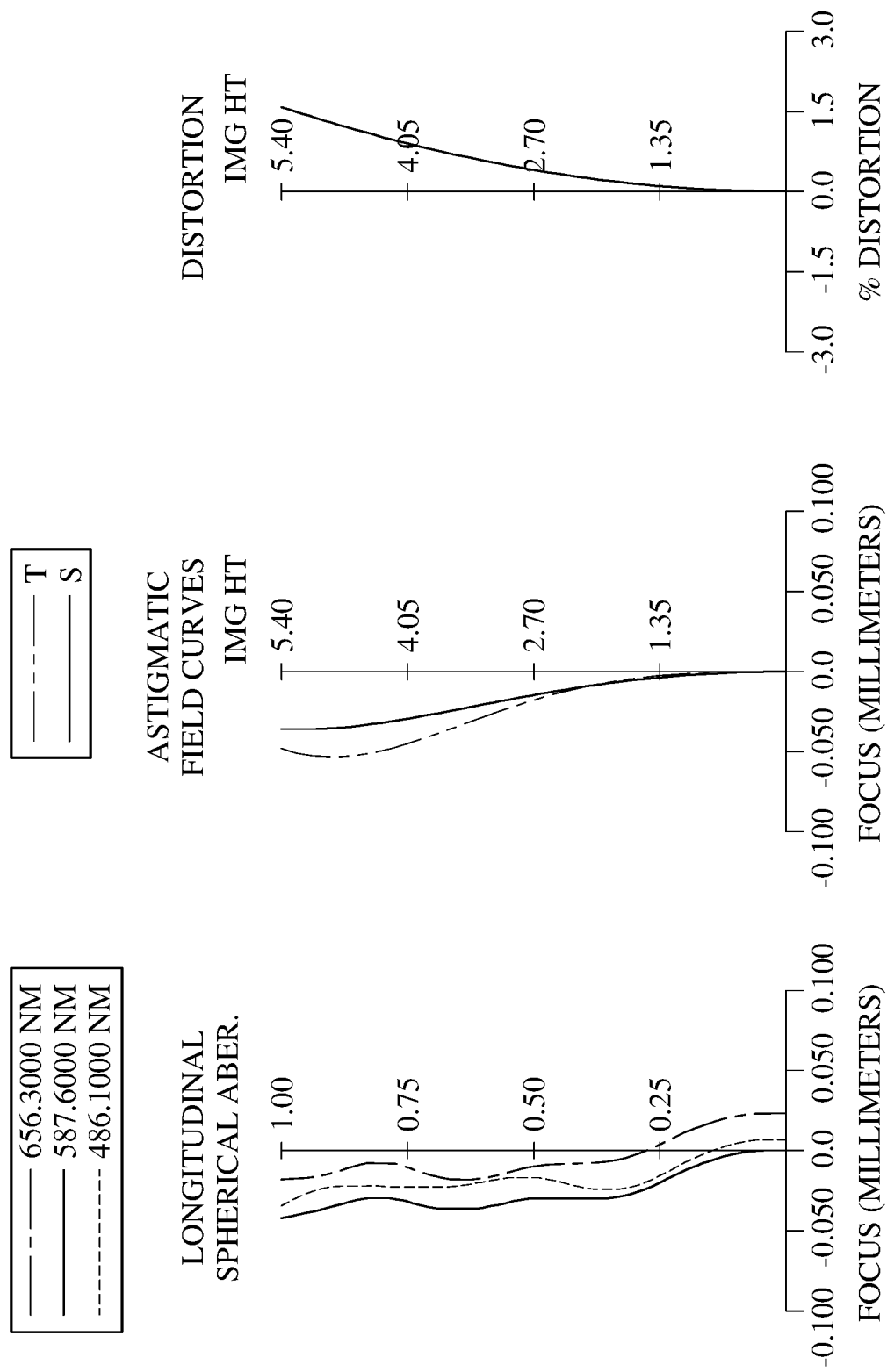
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical image lens assembly (its reference numeral is omitted) of the present disclosure and an image sensor 890. The optical image lens assembly includes, in order from an object side to an image side along an optical path, a first lens element 810, an aperture stop 800, a second lens element 820, a third lens element 830, a fourth lens element 840, a fifth lens element 850, a sixth lens element 860, a filter 870 and an image surface 880. The optical image lens assembly includes six lens elements (810, 820, 830, 840, 850 and 860) with no additional lens element disposed between each of the adjacent six lens elements, wherein there is an air gap along an optical axis between each of all adjacent lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric. The image-side surface 842 of the fourth lens element 840 has at least one inflection point.

The fifth lens element 850 with positive refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric.

The sixth lens element 860 with negative refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The object-side surface 861 of the sixth lens element 860 has at least one inflection point. The image-side surface 862 of the sixth lens element 860 has at least one inflection point.

The filter 870 is made of glass material and located between the sixth lens element 860 and the image surface 880, and will not affect the focal length of the optical image lens assembly. The image sensor 890 is disposed on or near the image surface 880 of the optical image lens assembly.

The detailed optical data of the 8th embodiment are shown in Table 15 and the aspheric surface data are shown in Table 16 below.

TABLE 15

8th Embodiment
f = 28.00 mm, Fno = 3.30, HFOV = 10.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.562 | (ASP) | 1.626 | Plastic | 1.545 | 56.1 | 17.76 |
| 2 | | 31.985 | (ASP) | 1.195 | | | | |
| 3 | Ape. Stop | Plano | | −0.500 | | | | |
| 4 | Lens 2 | 9.247 | (ASP) | 0.941 | Plastic | 1.679 | 18.4 | −20.79 |
| 5 | | 5.357 | (ASP) | 0.388 | | | | |
| 6 | Lens 3 | 10.218 | (ASP) | 0.550 | Plastic | 1.530 | 55.8 | −85.82 |
| 7 | | 8.189 | (ASP) | 1.071 | | | | |
| 8 | Lens 4 | 20.257 | (ASP) | 2.400 | Plastic | 1.544 | 56.0 | 35.33 |
| 9 | | −355.852 | (ASP) | 0.100 | | | | |
| 10 | Lens 5 | 19.610 | (ASP) | 0.850 | Plastic | 1.686 | 18.4 | 48.34 |
| 11 | | 47.131 | (ASP) | 0.224 | | | | |
| 12 | Lens 6 | 4.331 | (ASP) | 0.859 | Plastic | 1.566 | 37.4 | −47.70 |
| 13 | | 3.464 | (ASP) | 12.000 | | | | |

TABLE 15-continued

8th Embodiment
f = 28.00 mm, Fno = 3.30, HFOV = 10.8 deg.

| Surface # | | Curvature Radius | Thickness | Material | Index | Abbe # | Focal Length |
|---|---|---|---|---|---|---|---|
| 14 | Filter | Plano | 0.452 | Glass | 1.517 | 64.2 | — |
| 15 | | Plano | 4.942 | | | | |
| 16 | Image | Plano | — | | | | |

Note:
Reference wavelength is 587.6 nm (d-line).

TABLE 16

Aspheric Coefficients

| | Surface # | | | |
|---|---|---|---|---|
| | 1 | 2 | 4 | 5 |
| k = | 4.2241E−01 | 4.5135E+01 | −1.3165E+00 | −1.2129E−01 |
| A4 = | 3.5608E−04 | 6.9174E−04 | −4.1663E−03 | −7.1643E−03 |
| A6 = | −1.8157E−05 | 6.6457E−05 | 7.0412E−04 | 1.4633E−03 |
| A8 = | 3.1593E−06 | −1.6752E−06 | −7.5149E−05 | −2.0384E−04 |
| A10 = | −1.6856E−07 | −2.7553E−07 | 4.5862E−06 | 1.5535E−05 |
| A12 = | 4.8522E−09 | 2.2465E−08 | −1.4463E−07 | −5.9024E−07 |
| A14 = | −3.4396E−11 | −4.7469E−10 | 1.8553E−09 | 8.6952E−09 |
| A16 = | — | — | — | — |

| | Surface # | | | |
|---|---|---|---|---|
| | 6 | 7 | 8 | 9 |
| k = | 1.1536E+00 | 2.8222E−01 | 1.6370E+01 | −9.0000E+01 |
| A4 = | −1.1131E−03 | −8.2411E−05 | 6.3481E−04 | 1.8573E−03 |
| A6 = | 6.9067E−04 | −2.6651E−05 | 3.2430E−05 | 5.6731E−05 |
| A8 = | −1.0895E−04 | 2.4470E−06 | −1.5517E−06 | −2.0636E−05 |
| A10 = | 8.1005E−06 | 4.0858E−09 | −2.4473E−08 | 3.9413E−06 |
| A12 = | −2.3560E−07 | −1.3765E−08 | 8.4743E−09 | −3.7238E−07 |
| A14 = | −1.3435E−09 | 2.7729E−10 | −4.1511E−10 | 2.0005E−08 |
| A16 = | 1.2726E−10 | — | — | −4.7650E−10 |

| | Surface # | | | |
|---|---|---|---|---|
| | 10 | 11 | 12 | 13 |
| k = | 1.8937E+01 | −6.9223E+01 | −4.7610E+00 | −2.9969E+00 |
| A4 = | 2.5672E−03 | 2.3375E−03 | −9.2746E−04 | −2.3981E−03 |
| A6 = | −5.1070E−04 | −6.5584E−04 | −5.3788E−04 | −1.3117E−05 |
| A8 = | 7.0937E−05 | 1.1903E−04 | 9.3847E−05 | −3.3792E−06 |
| A10 = | −7.3238E−06 | −1.4905E−05 | −1.1745E−05 | 1.3103E−06 |
| A12 = | 4.6255E−07 | 1.1392E−06 | 1.0147E−06 | −7.8594E−08 |
| A14 = | −1.2803E−08 | −4.3523E−08 | −4.7015E−08 | 5.2329E−10 |
| A16 = | 7.0931E−11 | 6.3307E−10 | 8.4764E−10 | 3.9991E−11 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 28.00 | TL/f | 0.97 |
| Fno | 3.30 | BL/TD | 1.79 |
| HFOV [deg.] | 10.8 | Fno × EPD [mm] | 28.00 |
| Vdmin | 18.4 | EPD/ΣAT | 3.42 |
| V5/V6 | 0.49 | EPD/Y11 | 1.93 |
| (Vi/Ni)min | 10.90 | Ymax/Ymin | 1.21 |
| CT1/CT2 | 1.73 | Y61i/Y62i | 0.86 |
| CT1/ATmax | 1.52 | ΣAT/BL | 0.14 |
| (R3 − R4)/(R3 + R4) | 0.27 | BL/ImgH | 3.22 |
| (R10 + R11)/(R10 − R11) | 1.20 | f/ImgH | 5.19 |
| (R11 − R12)/(R11 + R12) | 0.11 | Y11/ImgH | 0.81 |
| f/f3 | −0.33 | ImgH/tan(FOV) [mm] | 13.69 |
| f2/f3 | 0.24 | ImgH [mm] | 5.40 |

9th Embodiment

Figure 17:
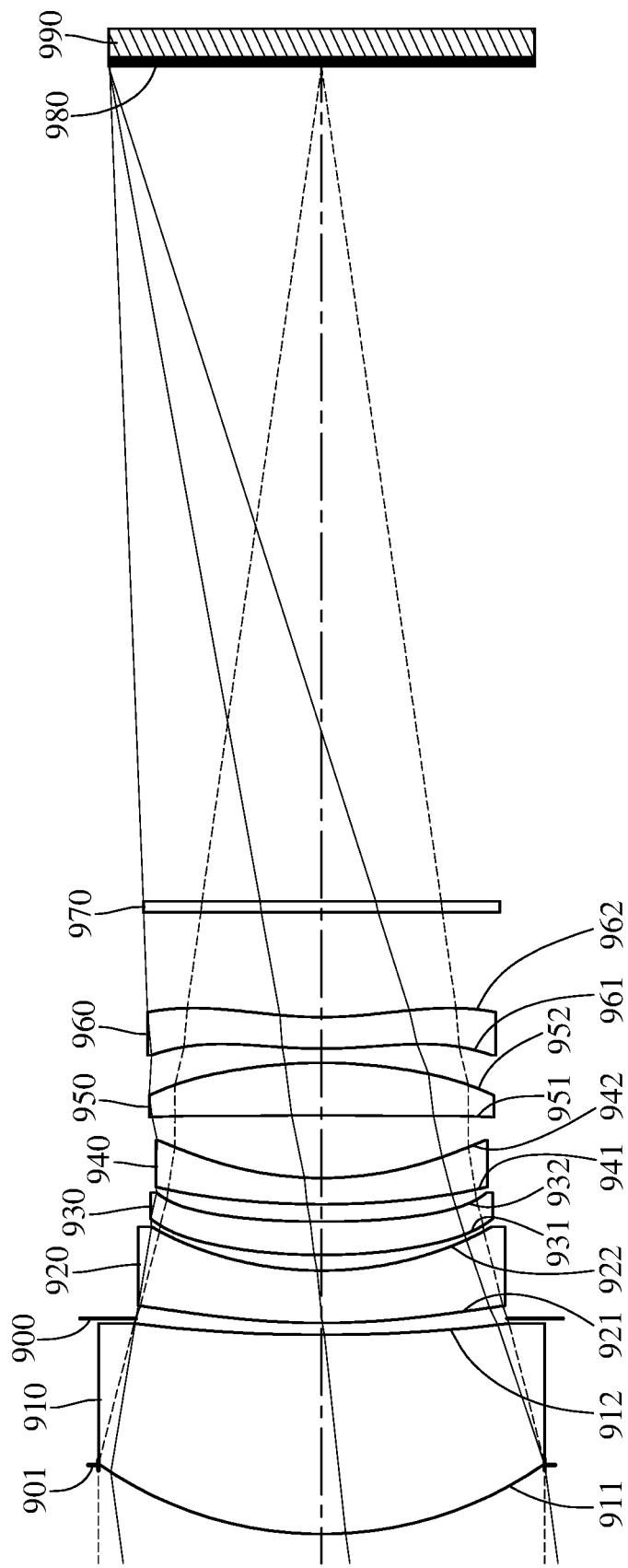
FIG. 17 is a schematic view of an image capturing unit according to the 9th embodiment of the present disclosure.
Figure 18:
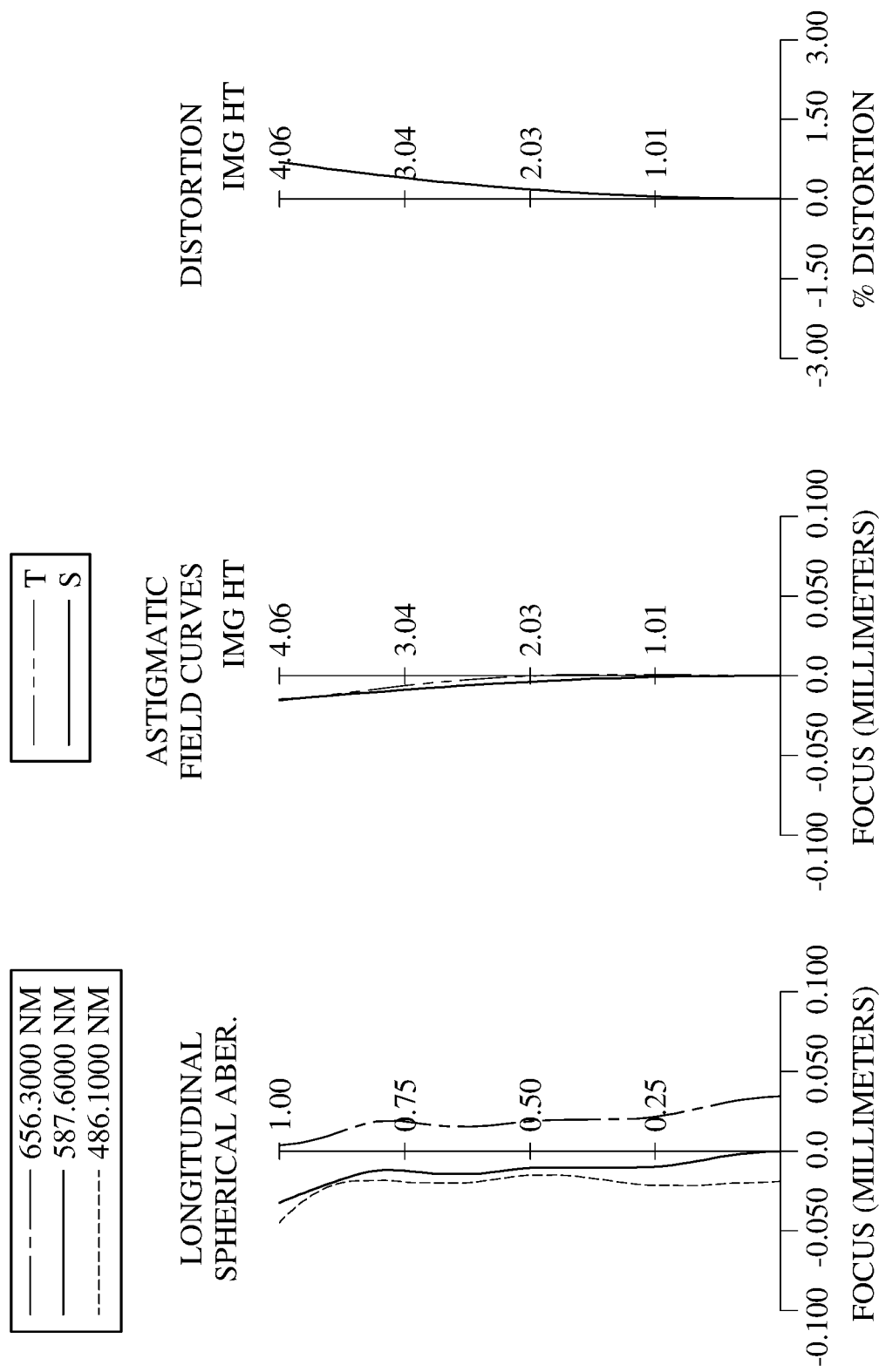
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical image lens assembly (its reference numeral is omitted) of the present disclosure and an image sensor 990. The optical image lens assembly includes, in order from an object side to an image side along an optical path, a stop 901, a first lens element 910, an aperture stop 900, a second lens element 920, a third lens element 930, a fourth lens element 940, a fifth lens element 950, a sixth lens element 960, a filter 970 and an image surface 980. The optical image lens assembly includes six lens elements (910, 920, 930, 940, 950 and 960) with no additional lens element disposed between each of the adjacent six lens elements, wherein there is an air gap along an optical axis between each of all adjacent lens elements.

The first lens element 910 with positive refractive power has an object-side surface 911 being convex in a paraxial region thereof and an image-side surface 912 being concave in a paraxial region thereof. The first lens element 910 is made of glass material and has the object-side surface 911 and the image-side surface 912 being both spherical.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric. The object-side surface 921 of the second lens element 920 has at least one inflection point.

The third lens element 930 with positive refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with negative refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric.

The fifth lens element 950 with positive refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. The object-side surface 951 of the fifth lens element 950 has at least one inflection point.

The sixth lens element 960 with negative refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The object-side surface 961 of the sixth lens element 960 has at least one inflection point. The image-side surface 962 of the sixth lens element 960 has at least one inflection point.

The filter 970 is made of glass material and located between the sixth lens element 960 and the image surface 980, and will not affect the focal length of the optical image lens assembly. The image sensor 990 is disposed on or near the image surface 980 of the optical image lens assembly.

The detailed optical data of the 9th embodiment are shown in Table 17 and the aspheric surface data are shown in Table 18 below.

TABLE 17

9th Embodiment
f = 30.01 mm, Fno = 3.52, HFOV = 7.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −1.320 | | | | |
| 2 | Lens 1 | 7.418 | (SPH) | 3.800 | Glass | 1.620 | 60.4 | 14.98 |
| 3 | | 29.570 | (SPH) | 0.317 | | | | |
| 4 | Ape. Stop | Plano | | −0.089 | | | | |
| 5 | Lens 2 | 14.634 | (ASP) | 1.000 | Plastic | 1.639 | 23.5 | −20.91 |
| 6 | | 6.796 | (ASP) | 0.299 | | | | |
| 7 | Lens 3 | 12.078 | (ASP) | 0.635 | Plastic | 1.534 | 55.9 | 61.16 |
| 8 | | 18.818 | (ASP) | 0.331 | | | | |
| 9 | Lens 4 | 16.612 | (ASP) | 0.500 | Plastic | 1.639 | 23.5 | −17.66 |
| 10 | | 6.639 | (ASP) | 1.199 | | | | |
| 11 | Lens 5 | −38.203 | (ASP) | 1.000 | Plastic | 1.669 | 19.5 | 17.36 |
| 12 | | −8.999 | (ASP) | 0.271 | | | | |
| 13 | Lens 6 | 9.827 | (ASP) | 0.600 | Plastic | 1.639 | 23.5 | −49.00 |
| 14 | | 7.301 | (ASP) | 2.000 | | | | |
| 15 | Filter | Plano | | 0.210 | Glass | 1.517 | 64.2 | — |
| 16 | | Plano | | 15.928 | | | | |
| 17 | Image | Plano | | — | | | | |

Note:
Reference wavelength is 587.6 nm (d-line).
An effective radius of the stop 901 (Surface 1) is 4.252 mm.

TABLE 18

Aspheric Coefficients

| Surface # | | | | |
|---|---|---|---|---|
| 5 | 6 | 7 | 8 | 9 |
| k = −9.3168E+00 | 2.0256E+00 | 9.9611E+00 | 2.5161E+01 | −1.8089E+00 |
| A4 = −2.0103E−04 | −7.1214E−04 | 9.1897E−04 | 1.7687E−03 | 1.6192E−04 |
| A6 = −2.1437E−05 | −1.0120E−04 | −2.3568E−04 | −2.0423E−04 | 1.8780E−05 |
| A8 = 3.0138E−06 | 2.0212E−05 | 5.7824E−05 | 4.1453E−05 | −5.0615E−07 |
| A10 = −2.0884E−07 | −4.3995E−06 | −1.1799E−05 | −7.3996E−06 | 4.2086E−08 |
| A12 = 7.5712E−10 | 4.6562E−07 | 1.2969E−06 | 8.1526E−07 | — |
| A14 = 2.2557E−10 | −1.9135E−08 | −4.8405E−08 | −2.4669E−08 | — |

| Surface # | | | | |
|---|---|---|---|---|
| 10 | 11 | 12 | 13 | 14 |
| k = 7.0049E−02 | −5.0000E+00 | −2.3303E+00 | −2.0071E+01 | −1.3870E+01 |
| A4 = −1.9027E−04 | 3.9639E−03 | 2.3993E−03 | −6.3323E−03 | −5.6886E−03 |
| A6 = −1.7497E−05 | −5.6959E−04 | −5.8785E−04 | 1.6842E−04 | 4.0525E−04 |
| A8 = −8.9550E−07 | 7.1826E−05 | 8.9376E−05 | 2.4204E−05 | −3.3668E−05 |
| A10 = −2.0950E−07 | −1.0664E−05 | −1.3456E−05 | −6.6649E−06 | 2.1584E−06 |
| A12 = — | 9.9206E−07 | 1.2508E−06 | 6.4696E−07 | −1.2889E−07 |
| A14 = — | −4.8587E−08 | −6.3314E−08 | −2.9053E−08 | 6.8796E−09 |
| A16 = — | 1.1222E−09 | 1.4808E−09 | 5.9172E−10 | −1.5533E−10 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 30.01 | TL/f | 0.93 |
| Fno | 3.52 | BL/TD | 1.84 |
| HFOV [deg.] | 7.7 | Fno × EPD [mm] | 30.01 |
| Vdmin | 19.5 | EPD/ΣAT | 3.66 |
| V5/V6 | 0.83 | EPD/Y11 | 2.01 |
| (Vi/Ni)min | 11.65 | Ymax/Ymin | 1.35 |
| CT1/CT2 | 3.80 | Y61 i/Y62 i | 0.83 |
| CT1/ATmax | 3.17 | ΣAT/BL | 0.13 |
| (R3 − R4)/(R3+R4) | 0.37 | BL/ImgH | 4.47 |
| (R10 + R11)/(R10 − R11) | −0.04 | f/ImgH | 7.39 |
| (R11 − R12)/(R11 + R12) | 0.15 | Y11/ImgH | 1.05 |
| f/f3 | 0.49 | ImgH/tan(FOV) [mm] | 14.83 |
| f2/f3 | −0.34 | ImgH [mm] | 4.06 |

10th Embodiment

Figure 19:
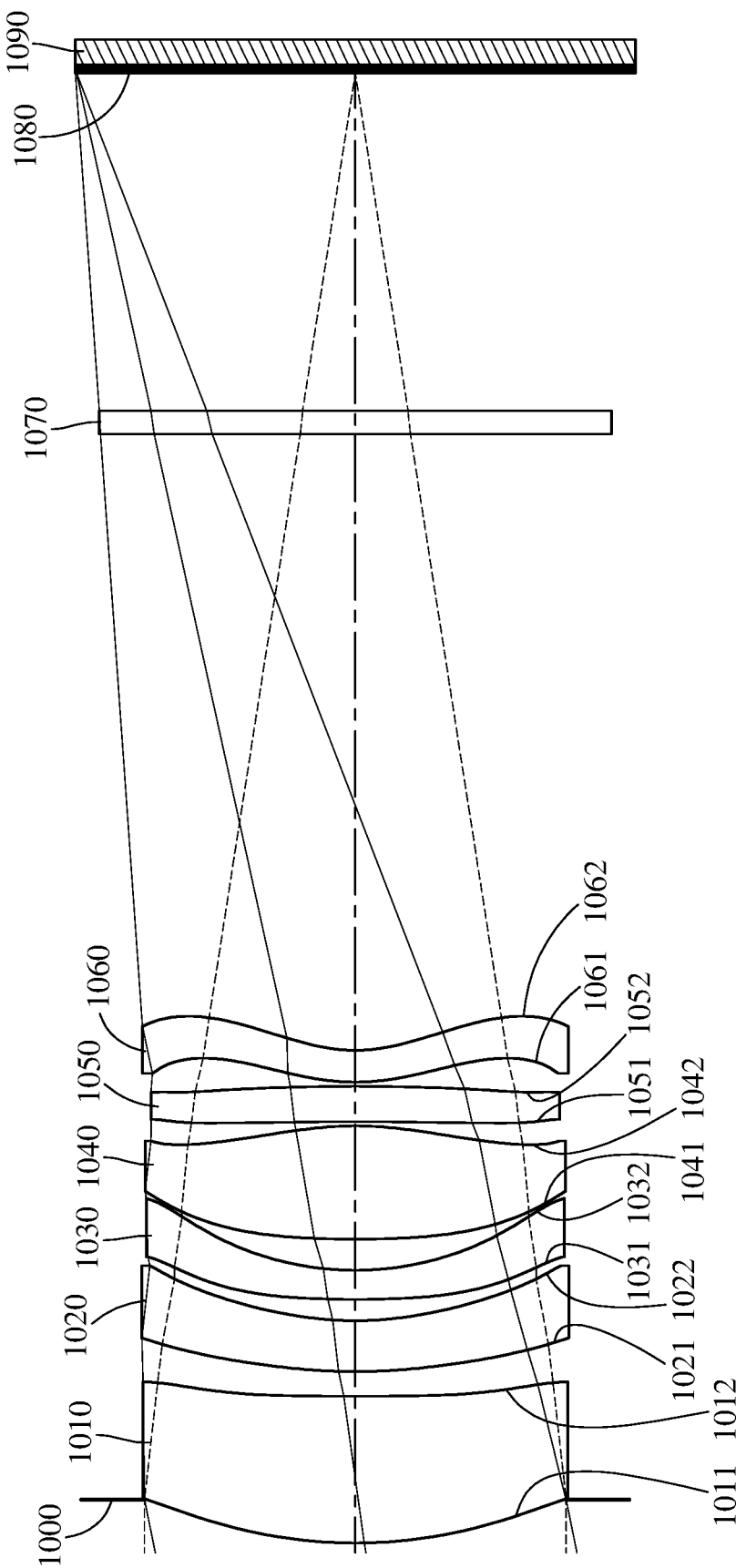
FIG. 19 is a schematic view of an image capturing unit according to the 10th embodiment of the present disclosure.
Figure 20:
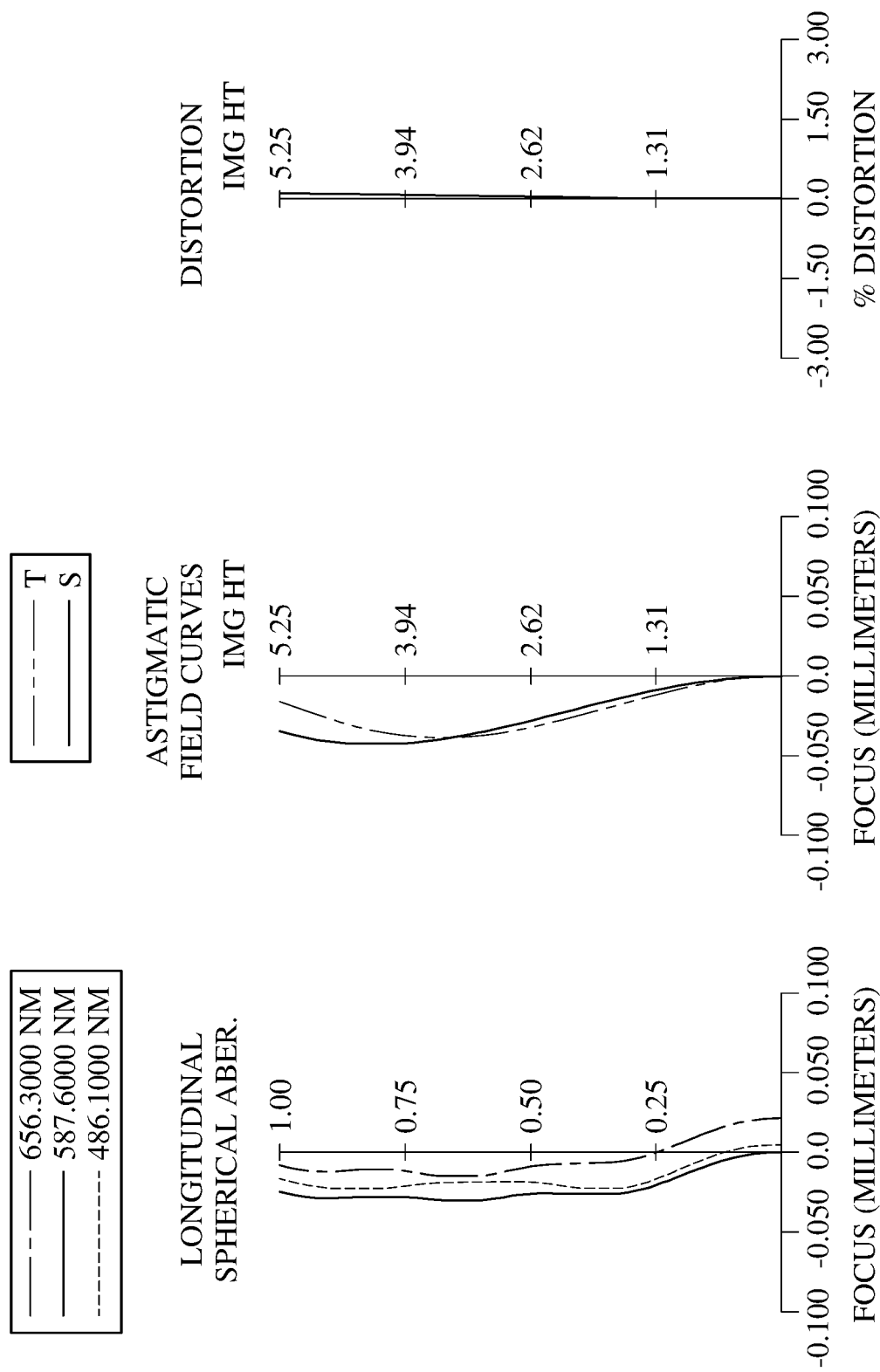
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical image lens assembly (its reference numeral is omitted) of the present disclosure and an image sensor 1090. The optical image lens assembly includes, in order from an object side to an image side along an optical path, an aperture stop 1000, a first lens element 1010, a second lens element 1020, a third lens element 1030, a fourth lens element 1040, a fifth lens element 1050, a sixth lens element 1060, a filter 1070 and an image surface 1080. The optical image lens assembly includes six lens elements (1010, 1020, 1030, 1040, 1050 and 1060) with no additional lens element disposed between each of the adjacent six lens elements, wherein there is an air gap along an optical axis between each of all adjacent lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. The object-side surface 1031 of the third lens element 1030 has at least one inflection point. The image-side surface 1032 of the third lens element 1030 has at least one inflection point.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric. The image-side surface 1042 of the fourth lens element 1040 has at least one inflection point.

The fifth lens element 1050 with positive refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric. The object-side surface 1051 of the fifth lens element 1050 has at least one inflection point. The image-side surface 1052 of the fifth lens element 1050 has at least one inflection point.

The sixth lens element 1060 with negative refractive power has an object-side surface 1061 being convex in a paraxial region thereof and an image-side surface 1062 being concave in a paraxial region thereof. The sixth lens element 1060 is made of plastic material and has the object-side surface 1061 and the image-side surface 1062 being both aspheric. The object-side surface 1061 of the sixth lens element 1060 has at least one inflection point. The image-side surface 1062 of the sixth lens element 1060 has at least one inflection point.

The filter 1070 is made of glass material and located between the sixth lens element 1060 and the image surface 1080, and will not affect the focal length of the optical image lens assembly. The image sensor 1090 is disposed on or near the image surface 1080 of the optical image lens assembly.

The detailed optical data of the 10th embodiment are shown in Table 19 and the aspheric surface data are shown in Table 20 below.

TABLE 19

10th Embodiment
f = 25.8 mm, Fno = 3.25, HFOV = 11.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.816 | | | | |
| 2 | Lens 1 | 9.133 | (ASP) | 2.770 | Plastic | 1.534 | 56.0 | 17.89 |
| 3 | | 183.818 | (ASP) | 0.464 | | | | |
| 4 | Lens 2 | 10.102 | (ASP) | 0.959 | Plastic | 1.679 | 18.4 | −24.62 |
| 5 | | 6.056 | (ASP) | 0.402 | | | | |
| 6 | Lens 3 | 19.604 | (ASP) | 0.550 | Plastic | 1.544 | 56.0 | −14.76 |
| 7 | | 5.638 | (ASP) | 0.587 | | | | |
| 8 | Lens 4 | 20.765 | (ASP) | 2.137 | Plastic | 1.544 | 56.0 | 9.15 |
| 9 | | −6.309 | (ASP) | 0.080 | | | | |
| 10 | Lens 5 | −48.107 | (ASP) | 0.666 | Plastic | 1.686 | 18.4 | 194.33 |
| 11 | | −35.551 | (ASP) | 0.080 | | | | |
| 12 | Lens 6 | 4.080 | (ASP) | 0.600 | Plastic | 1.534 | 56.0 | −25.08 |
| 13 | | 2.967 | (ASP) | 11.628 | | | | |
| 14 | Filter | Plano | | 0.438 | Glass | 1.517 | 64.2 | — |
| 15 | | Plano | | 6.374 | | | | |
| 16 | Image | Plano | | — | | | | |

Note:
Reference wavelength is 587.6 nm (d-line).

TABLE 20

Aspheric Coefficients

| | Surface # | | | |
|---|---|---|---|---|
| | 2 | 3 | 4 | 5 |
| k = | −6.3129E−02 | 5.0000E+01 | 2.7507E−01 | 2.7952E−02 |
| A4 = | 7.9646E−05 | 1.5686E−03 | −4.2762E−03 | −7.5218E−03 |
| A6 = | −2.4825E−05 | 6.5700E−05 | 8.0553E−04 | 1.7031E−03 |
| A8 = | 1.7704E−06 | −5.7525E−06 | −9.3880E−05 | −2.5341E−04 |
| A10 = | −1.5886E−07 | −4.8161E−07 | 6.1259E−06 | 2.0772E−05 |
| A12 = | 3.5965E−09 | 3.9205E−08 | −1.9725E−07 | −8.3956E−07 |
| A14 = | −2.9201E−11 | −8.2310E−10 | 2.3257E−09 | 1.2859E−08 |
| A16 = | — | — | — | — |

| | Surface # | | | |
|---|---|---|---|---|
| | 6 | 7 | 8 | 9 |
| k = | 1.2460E+01 | 6.6885E−01 | 1.5002E+01 | −1.3489E+01 |
| A4 = | 2.3303E−04 | −1.2274E−03 | 2.1618E−03 | 2.0585E−03 |
| A6 = | 8.1155E−04 | 5.3599E−05 | 6.6543E−06 | 4.4262E−06 |
| A8 = | −1.3368E−04 | 1.6548E−06 | −1.9768E−06 | −2.5347E−05 |
| A10 = | 1.0546E−05 | −1.8284E−07 | −1.3919E−07 | 5.2769E−06 |
| A12 = | −3.4510E−07 | −3.8026E−08 | 1.9514E−08 | −5.4466E−07 |
| A14 = | −2.2535E−09 | 5.8124E−10 | −6.3502E−10 | 2.8757E−08 |
| A16 = | 2.4317E−10 | — | — | −5.8117E−10 |

TABLE 20-continued

Aspheric Coefficients

| | Surface # | | | |
|---|---|---|---|---|
| | 10 | 11 | 12 | 13 |
| k = | −9.0000E+01 | −2.0528E+01 | −6.9645E+00 | −4.8956E+00 |
| A4 = | 2.6174E−03 | 2.0992E−03 | −8.8972E−04 | −3.5150E−03 |
| A6 = | −5.9614E−04 | −7.3804E−04 | −7.0061E−04 | −2.6797E−05 |
| A8 = | 9.1659E−05 | 1.4823E−04 | 1.1407E−04 | −6.8389E−06 |
| A10 = | −9.7130E−06 | −1.9750E−05 | −1.5526E−05 | 1.6108E−06 |
| A12 = | 6.5145E−07 | 1.6092E−06 | 1.4214E−06 | −9.9928E−08 |
| A14 = | −1.9039E−08 | −6.6215E−08 | −7.0940E−08 | 1.3336E−09 |
| A16 = | 6.5370E−11 | 1.0047E−09 | 1.4011E−09 | 3.2541E−11 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 25.80 | TL/f | 1.08 |
| Fno | 3.25 | BL/TD | 1.98 |
| HFOV [deg.] | 11.5 | Fno × EPD [mm] | 25.80 |
| Vdmin | 18.4 | EPD/ΣAT | 4.92 |
| V5/V6 | 0.33 | EPD/Y11 | 2.00 |
| (Vi/Ni)min | 10.90 | Ymax/Ymin | 1.05 |
| CT1/CT2 | 2.89 | Y61i/Y62i | 1.00 |
| CT1/ATmax | 4.72 | ΣAT/BL | 0.09 |
| (R3 − R4)/(R3 + R4) | 0.25 | BL/ImgH | 3.51 |
| (R10 + R11)/(R10 − R11) | 0.79 | f/ImgH | 4.91 |
| (R11 − R12)/(R11 + R12) | 0.16 | Y11/ImgH | 0.76 |
| f/f3 | −1.75 | ImgH/tan(FOV) [mm] | 12.37 |
| f2/f3 | 1.67 | ImgH [mm] | 5.25 |

11th Embodiment

Figure 21:
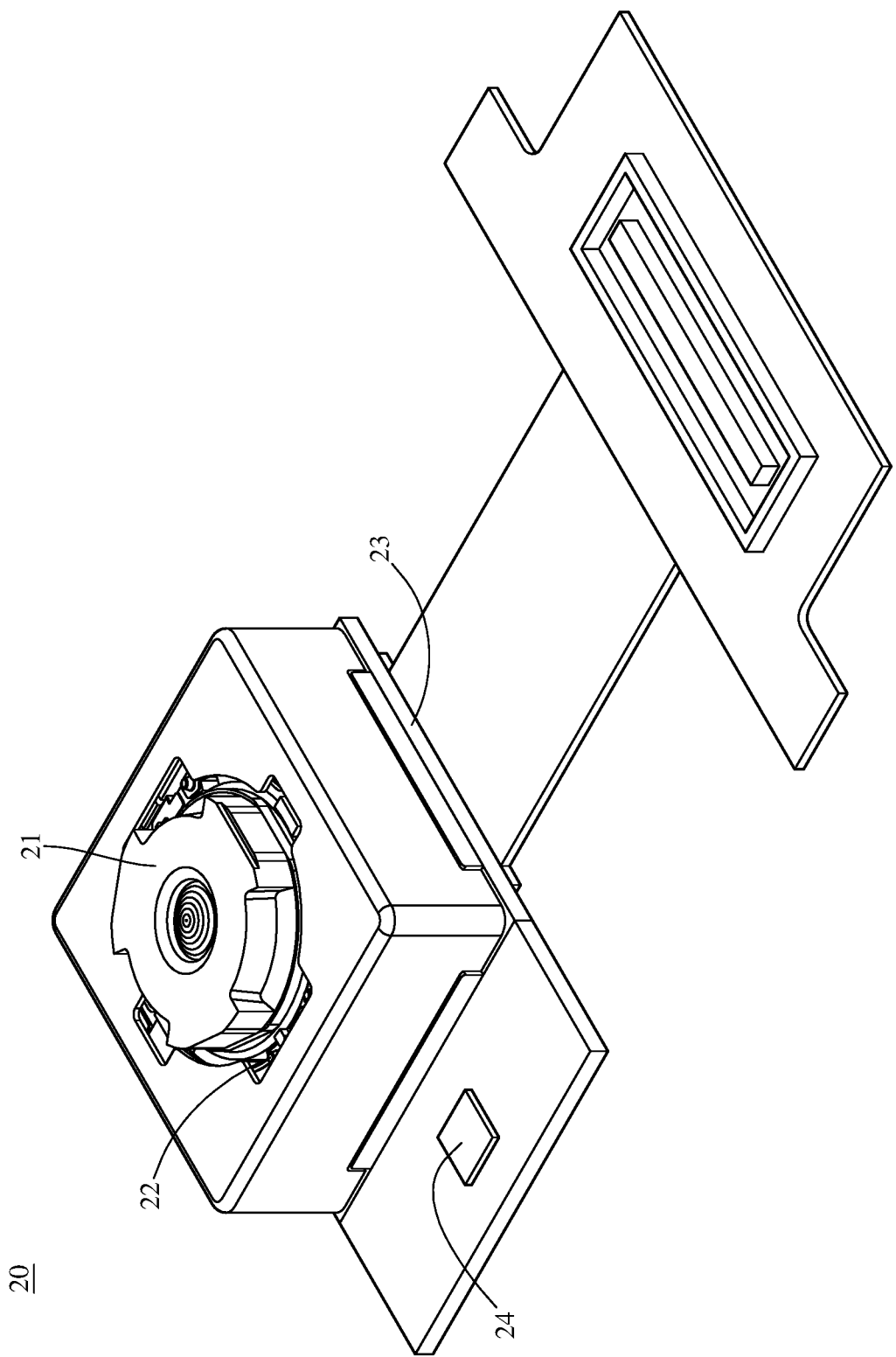
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 20 is a camera module including a lens unit 21, a driving device 22, an image sensor 23 and an image stabilizer 24. The lens unit 21 includes the optical image lens assembly disclosed in the 1st embodiment, a barrel and a holder member (their reference numerals are omitted) for holding the optical image lens assembly. However, the lens unit 21 may alternatively be provided with the optical image lens assembly disclosed in other abovementioned embodiments, and the present disclosure is not limited thereto. The imaging light converges in the lens unit 21 of the image capturing unit 20 to generate an image with the driving device 22 utilized for image focusing on the image sensor 23, and the generated image is then digitally transmitted to other electronic component for further processing.

The driving device 22 can have auto focusing functionality, and different driving configurations can be obtained through the usages of voice coil motors (VCM), micro electro-mechanical systems (MEMS), piezoelectric systems, or shape memory alloy materials. The driving device 22 is favorable for obtaining a better imaging position of the lens unit 21, so that a clear image of the imaged object can be captured by the lens unit 21 with different object distances. The image sensor 23 (for example, CCD or CMOS), which can feature high photosensitivity and low noise, is disposed on the image surface of the optical image lens assembly to provide higher image quality. Moreover, the image sensor 23 can have at least 40 megapixels. Moreover, the image sensor 23 can also have at least 100 megapixels. Therefore, it is favorable for obtaining more image information so as to increase the restoration of image details; and it is also favorable for achieving more diversified image processing for various applications.

The image stabilizer 24, such as an accelerometer, a gyro sensor and a Hall Effect sensor, is configured to work with the driving device 22 to provide optical image stabilization (OIS). The driving device 22 working with the image stabilizer 24 is favorable for compensating for pan and tilt of the lens unit 21 to reduce blurring associated with motion during exposure. In some cases, the compensation can be provided by electronic image stabilization (EIS) with image processing software, thereby improving image quality while in motion or low-light conditions.

12th Embodiment

Figure 22:
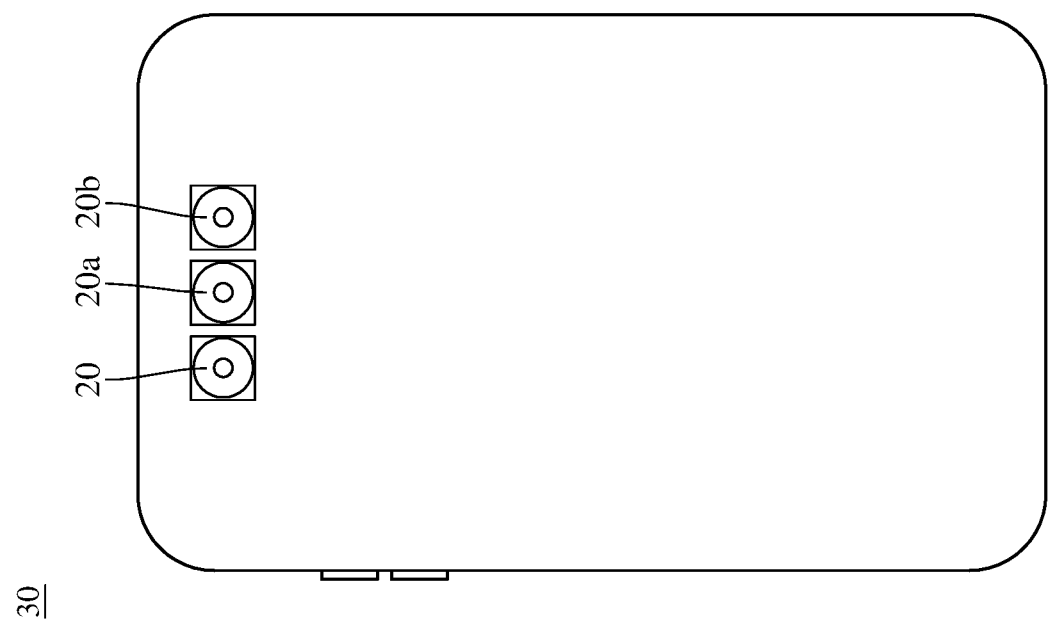
FIG. 22 is one perspective view of an electronic device according to the 12th embodiment of the present disclosure.
Figure 23:
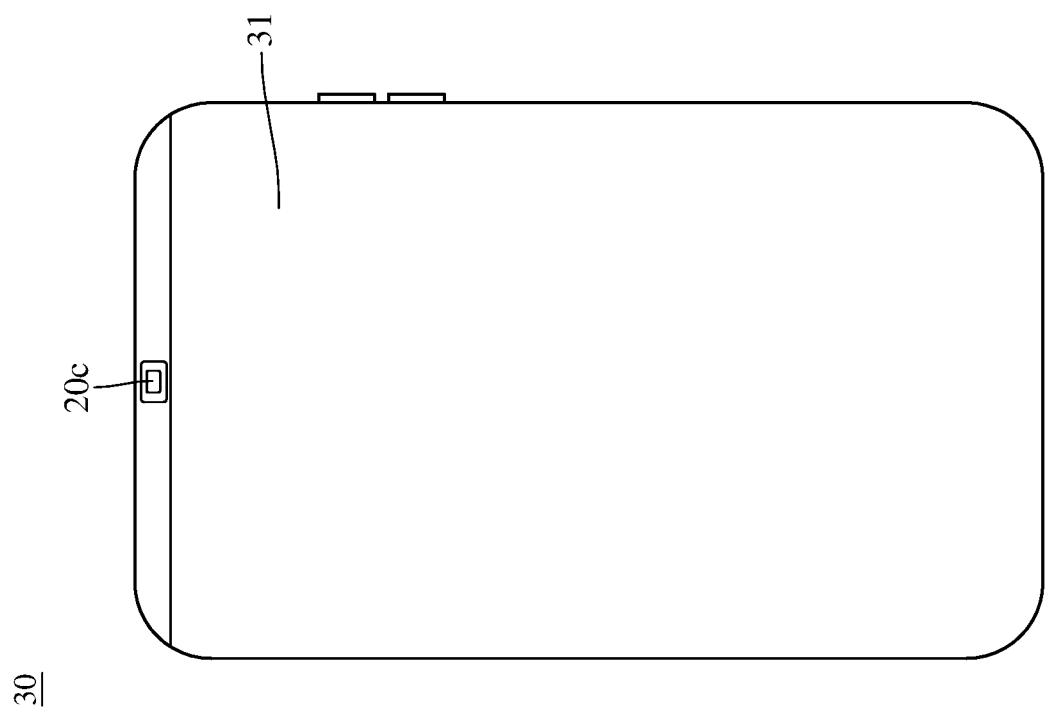
FIG. 23 is another perspective view of the electronic device in FIG. 22.

FIG. 22 is one perspective view of an electronic device according to the 12th embodiment of the present disclosure. FIG. 23 is another perspective view of the electronic device in FIG. 22.

In this embodiment, an electronic device 30 is a smartphone including the image capturing unit 20 disclosed in the 11th embodiment, an image capturing unit 20a, an image capturing unit 20b, an image capturing unit 20c and a display unit 31. As shown in FIG. 22, the image capturing unit 20, the image capturing unit 20a and the image capturing unit 20b are disposed on the same side of the electronic device 30 and face the same side, and each of the image capturing units 20, 20a and 20b has a single focal point. As shown in FIG. 23, the image capturing unit 20c and the display unit 31 are disposed on the opposite side of the electronic device 30, such that the image capturing unit 20c can be a front-facing camera of the electronic device 30 for taking selfies, but the present disclosure is not limited thereto. Furthermore, each of the image capturing units 20a, 20b and 20c can include the optical image lens assembly of the present disclosure and can have a configuration similar to that of the image capturing unit 20. In detail, each of the image capturing units 20a, 20b and 20c can include a lens unit, a driving device, an image sensor and an image stabilizer, and each of the lens unit can include an optical lens assembly such as the optical image lens assembly of the present disclosure, a barrel and a holder member for holding the optical lens assembly.

Figure 28:
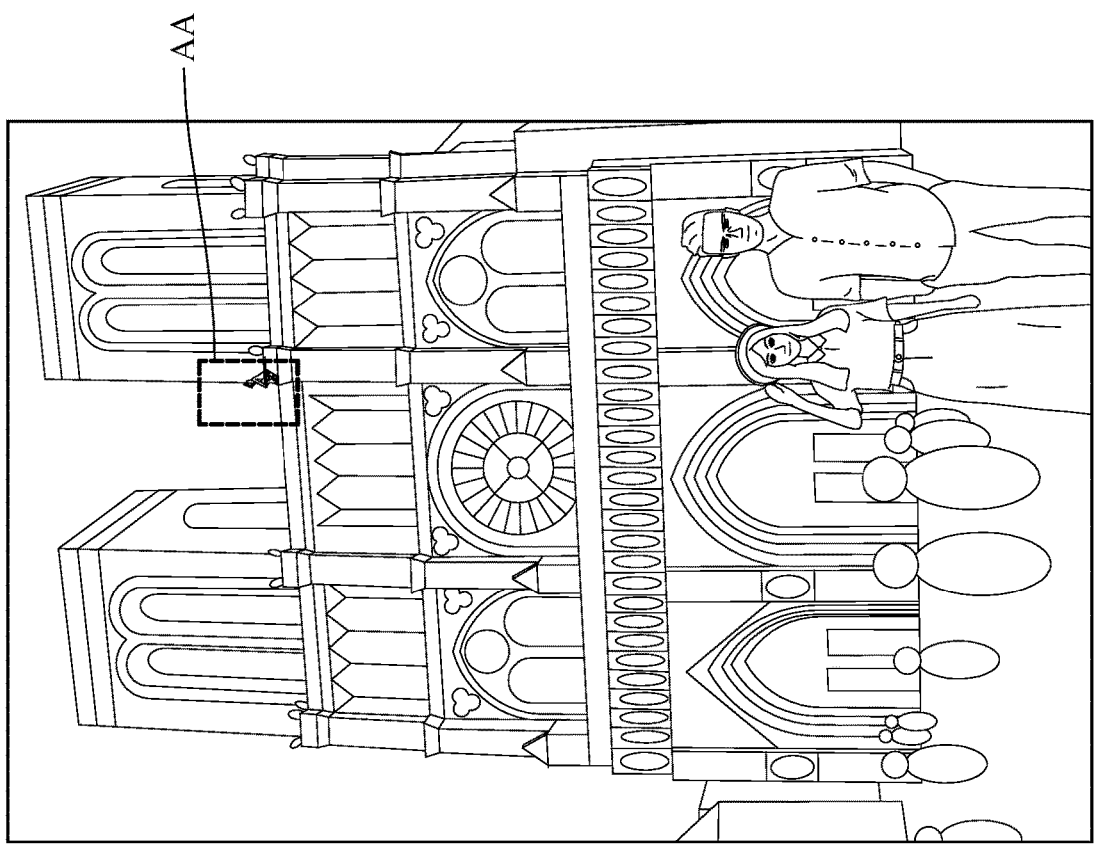
FIG. 28 shows an image captured by an electronic device with an equivalent focal length between 80 mm and 150 mm.
Figure 29:
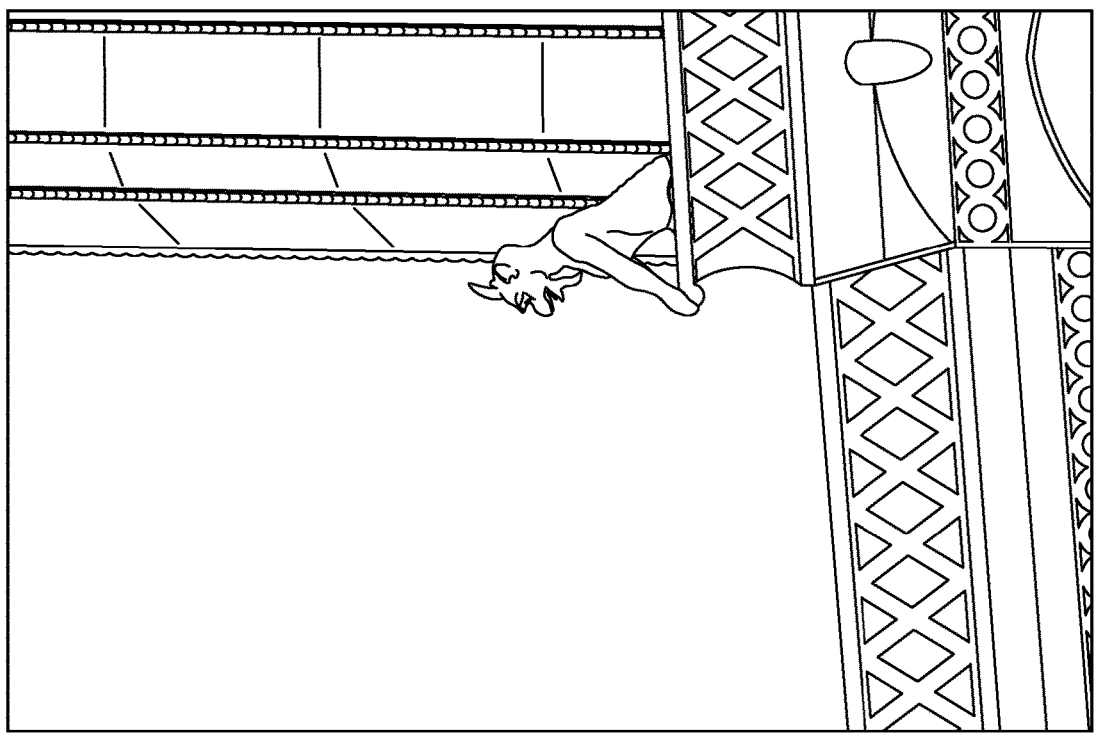
FIG. 29 shows an image captured by an electronic device with an equivalent focal length between 200 mm and 500 mm.

The image capturing unit 20 is a telephoto image capturing unit, the image capturing unit 20a is a wide-angle image capturing unit, the image capturing unit 20b is an ultra-wide-angle image capturing unit, and the image capturing unit 20c is a wide-angle image capturing unit. In this embodiment, the image capturing units 20, 20a and 20b have different fields of view, such that the electronic device 30 can have various magnification ratios so as to meet the requirement of optical zoom functionality. Moreover, a maximum field of view of the image capturing unit 20 and a maximum field of view of the image capturing unit 20a can differ by at least 20 degrees. Therefore, it is favorable for providing the electronic device 30 with different image capturing ranges, such that the electronic device 30 can perform zoom photographing, thereby increasing the application ranges. Moreover, a ratio of the equivalent focal length of the image capturing unit 20 to the equivalent focal length of the image capturing unit 20a can be larger than three. Therefore, it is favorable for using different image capturing units to capture different image ranges for various scenarios so as to increase application fields. In detail, a single prime lens can capture image information of different areas in a high-pixel and large-size image sensor (e.g., the abovementioned image sensor 23 with at least 40 megapixels) so as to achieve a zoom photographing effect by post-processing technique, and the partially captured image would not be in poor quality due to the high pixel fineness of the image sensor. For example, the image capturing unit 20 can achieve an equivalent focal length between 80 mm and 150 mm with the resolution of the image sensor 23, which is at least 40 megapixels, as shown by the captured people and whole cathedral of FIG. 28; and the image capturing unit 20 can also achieve an equivalent focal length between 200 mm and 500 mm with a portion of the resolution of the image sensor 23, which is at least eight megapixels, as shown by the captured detail image of Chimera (gargoyle) on the façade of the cathedral of FIG. 29, wherein the captured detail image corresponds to an enlarged area AA of the dotted range in FIG. 28. In this embodiment, the electronic device 30 includes multiple image capturing units 20, 20a, 20b and 20c, but the present disclosure is not limited to the number and arrangement of image capturing units.

13th Embodiment

Figure 24:
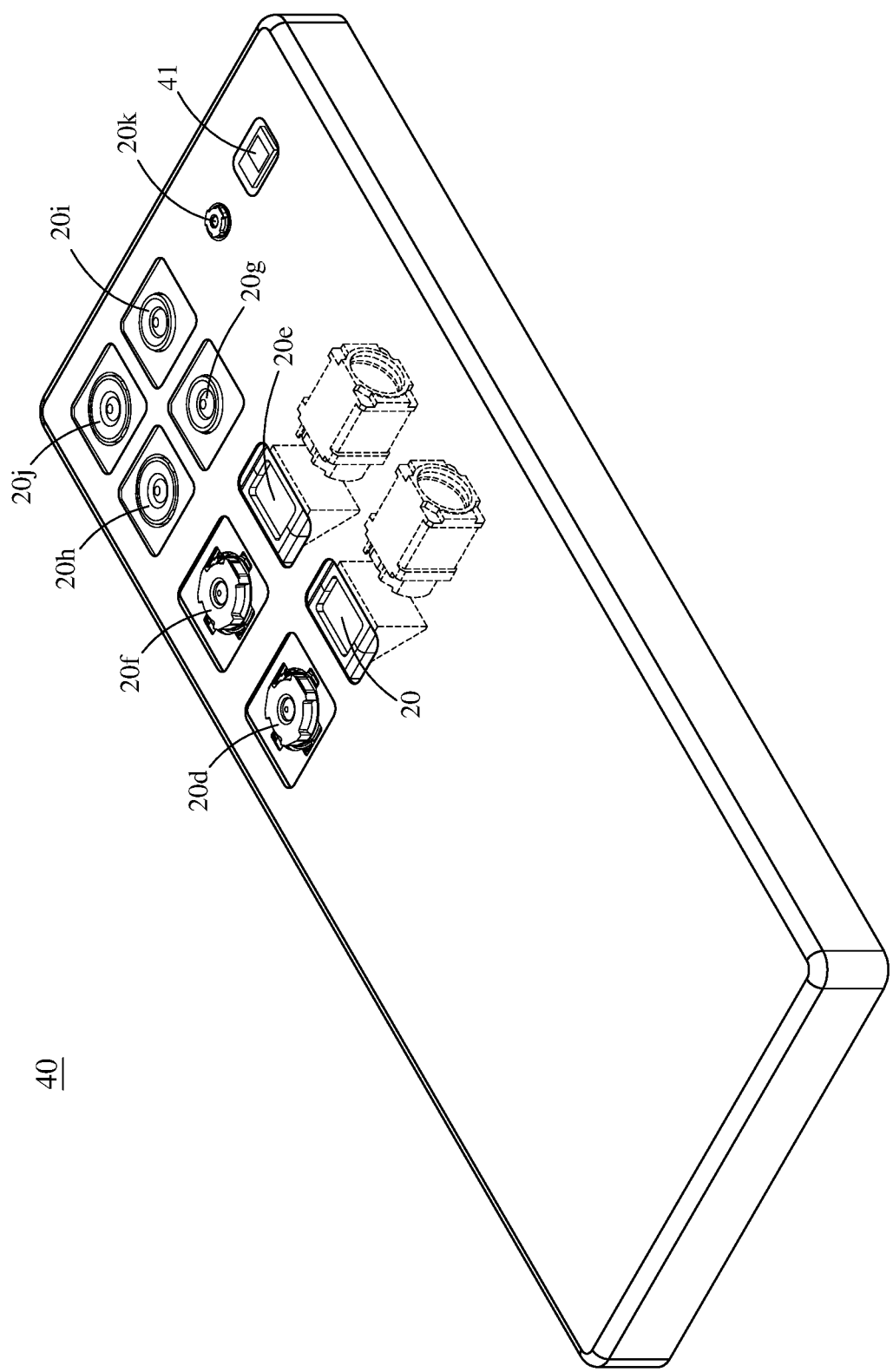
FIG. 24 is one perspective view of an electronic device according to the 13th embodiment of the present disclosure.
Figure 25:
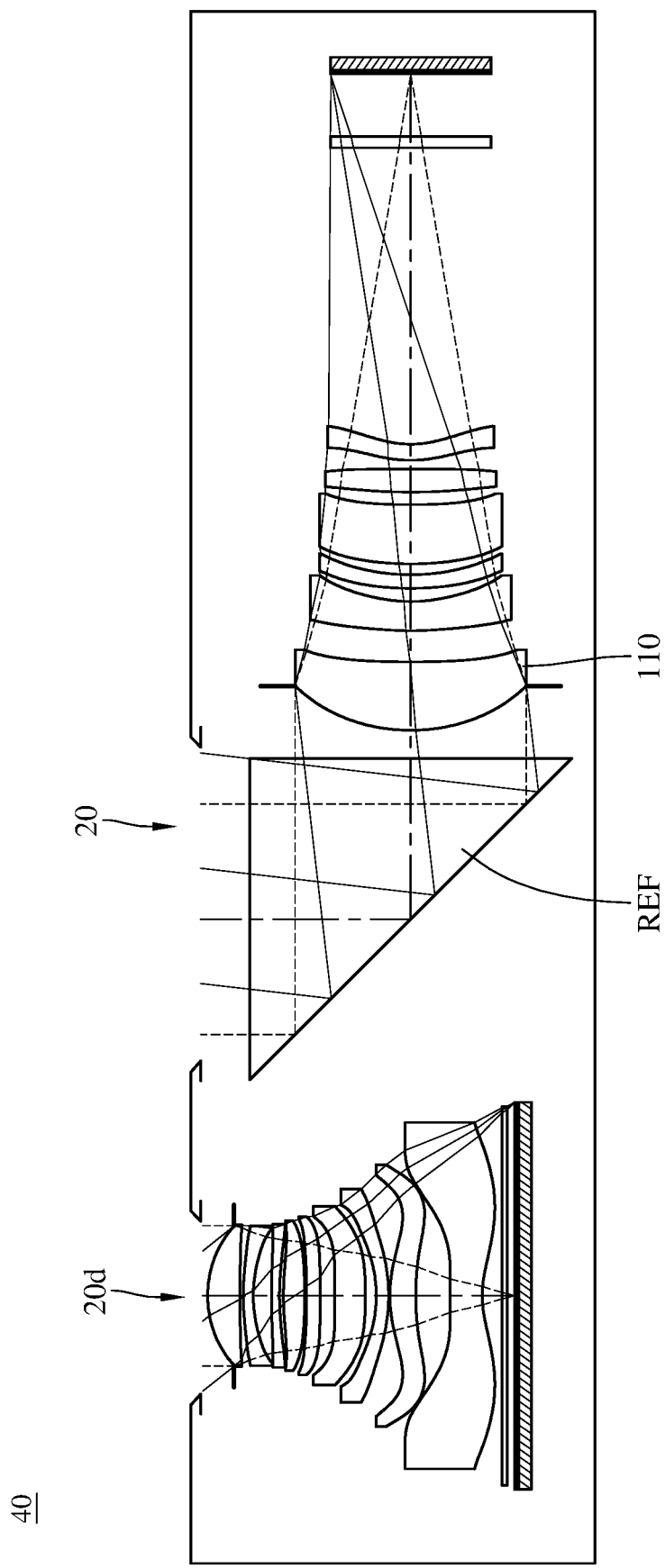
FIG. 25 shows a schematic view of a configuration of a reflective element in an optical image lens assembly of an electronic device in FIG. 24.
Figure 26:
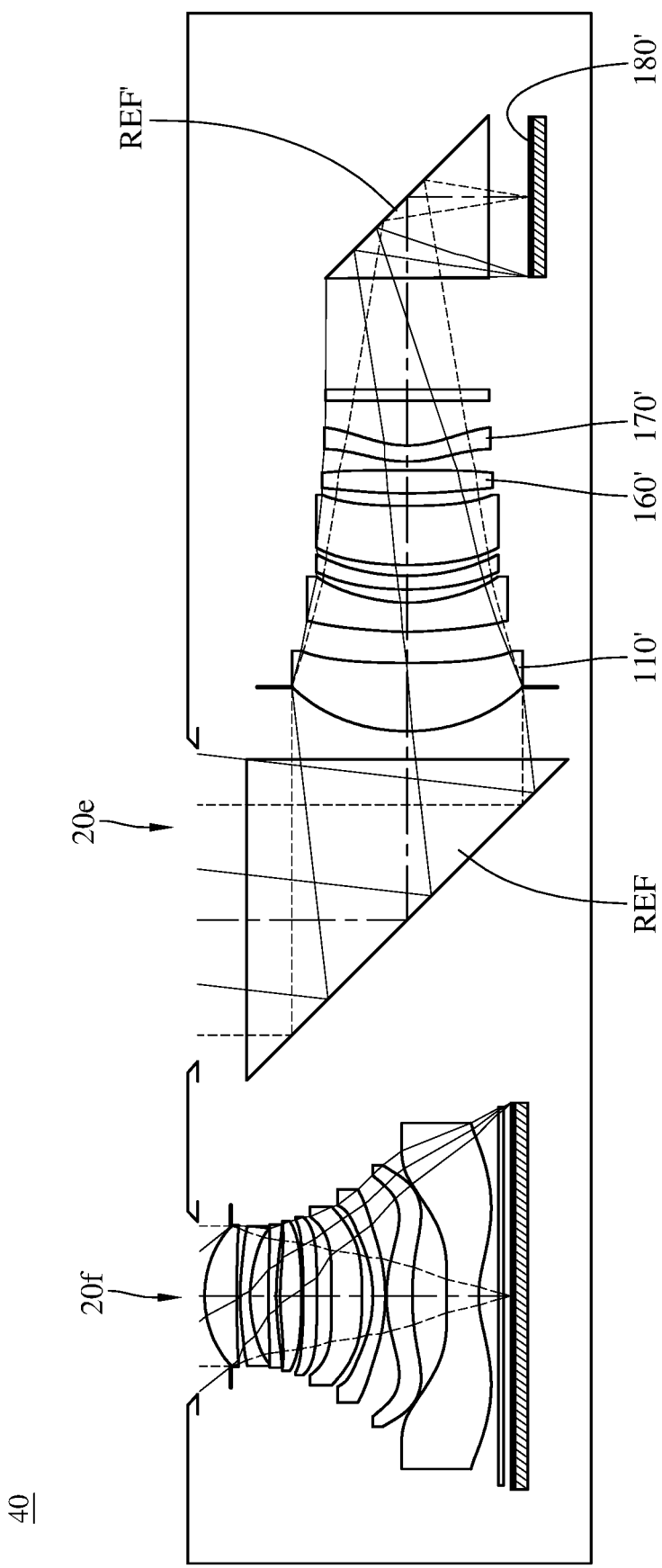
FIG. 26 shows a schematic view of a configuration of two reflective elements in another optical image lens assembly of an electronic device in FIG. 24.
Figure 27:
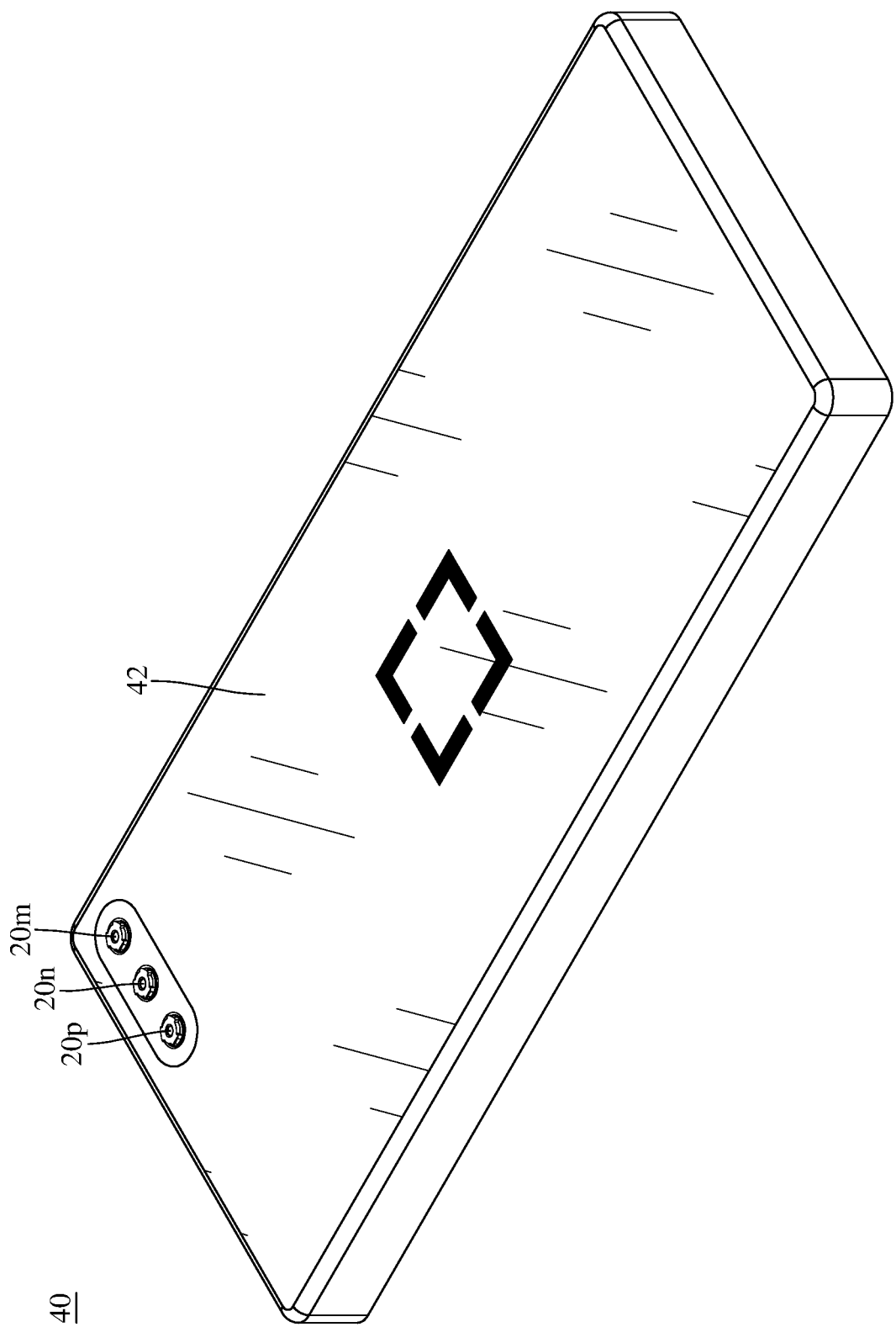
FIG. 27 is another perspective view of the electronic device in FIG. 24.

FIG. 24 is one perspective view of an electronic device according to the 13th embodiment of the present disclosure. FIG. 25 shows a schematic view of a configuration of a reflective element in an optical image lens assembly of an electronic device in FIG. 24. FIG. 26 shows a schematic view of a configuration of two reflective elements in another optical image lens assembly of an electronic device in FIG. 24. FIG. 27 is another perspective view of the electronic device in FIG. 24.

In this embodiment, an electronic device 40 is a smartphone including the image capturing unit 20 disclosed in the 11th embodiment, an image capturing unit 20d, an image capturing unit 20e, an image capturing unit 20f, an image capturing unit 20g, an image capturing unit 20h, an image capturing unit 20i, an image capturing unit 20j, an image capturing unit 20k, an image capturing unit 20m, an image capturing unit 20n, an image capturing unit 20p, a flash module 41 and a display unit 42. The image capturing unit 20, 20d, 20e, 20f, 20g, 20h, 20i, 20j and 20k are disposed on the same side of the electronic device 40 and face the same side, while the image capturing units 20m, 20n and 20p and the display unit 42 are disposed on the opposite side of the electronic device 40. Furthermore, each of the image capturing units 20d, 20e, 20f, 20g, 20h, 20i, 20j, 20k, 20m, 20n and 20p can include the optical image lens assembly of the present disclosure and can have a configuration similar to that of the image capturing units 20a, 20b and 20c, so the details in this regard will not be provided again.

The image capturing unit 20 is a telephoto image capturing unit, the image capturing unit 20d is a wide-angle image capturing unit, the image capturing unit 20e is a telephoto image capturing unit, the image capturing unit 20f is a wide-angle image capturing unit, the image capturing unit 20g is a telephoto image capturing unit, the image capturing unit 20h is an ultra-wide-angle image capturing unit, the image capturing unit 20i is a telephoto image capturing unit, the image capturing unit 20j is an ultra-wide-angle image capturing unit, the image capturing unit 20k is a ToF (time of flight) image capturing unit, the image capturing unit 20m is a wide-angle image capturing unit, the image capturing unit 20n is an ultra-wide-angle image capturing unit, and the image capturing unit 20p is a ToF image capturing unit.

In this embodiment, the image capturing units 20, 20d, 20e, 20f, 20g, 20h, 20i, 20j, 20m and 20n have different fields of view, such that the electronic device 40 can have various magnification ratios so as to meet the requirement of optical zoom functionality. Moreover, a maximum field of view of the image capturing unit 20e and a maximum field of view of the image capturing unit 20f can differ by at least 20 degrees. Therefore, it is favorable for providing the electronic device 40 with different image capturing ranges, such that the electronic device 40 can perform zoom photographing, thereby increasing the application ranges. Moreover, a ratio of the equivalent focal length of the image capturing unit 20e to the equivalent focal length of the image capturing unit 20f can be larger than three. Therefore, it is favorable for using different image capturing units to capture different image ranges for various scenarios so as to increase application fields. In detail, a single prime lens can capture image information of different areas in a high-pixel and large-size image sensor (e.g., the image capturing unit 20e of this embodiment can have an image sensor 180' with at least 40 megapixels) so as to achieve a zoom photographing effect by post-processing technique, and the partially captured image would not be in poor quality due to the high pixel fineness of the image sensor 180'. For example, the image capturing unit 20e can achieve an equivalent focal length between 80 mm and 150 mm with the resolution of the image sensor 180', which is at least 40 megapixels, as shown by the captured people and whole cathedral of FIG. 28; and the image capturing unit 20e can also achieve an equivalent focal length between 200 mm and 500 mm with a portion of the resolution of the image sensor 180', which is at least eight megapixels, as shown by the captured detail image of Chimera (gargoyle) on the façade of the cathedral of FIG. 29, wherein the captured detail image corresponds to an enlarged area AA of the dotted range in FIG. 28.

Figure 31:
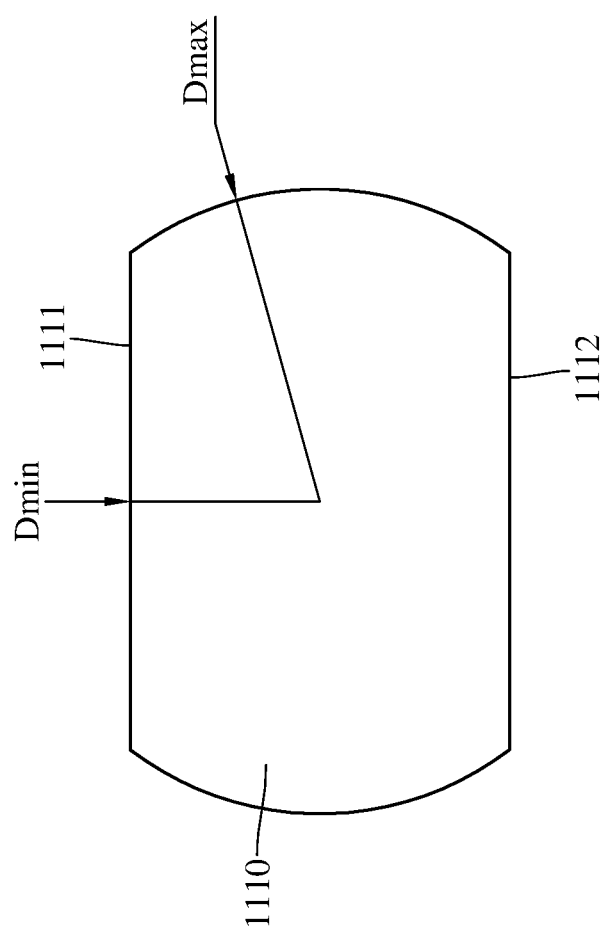
FIG. 31 shows a schematic view of a single lens element of an image capturing unit according to one embodiment of the present disclosure

In this embodiment, the optical lens assembly of the image capturing unit 20 includes a plurality of lens elements (not numbered), and the lens elements include a first lens element (not numbered). The first lens element can have an appearance similar to that of the first lens element 1110 in FIG. 31, but the present disclosure is not limited thereto. Each of all lens elements of the image capturing unit 20 can have an appearance similar to that of the first lens element 1110. As shown in FIG. 31, the first lens element 1110 has two trimmed edges 1111 and 1112 at outer rims, such that the first lens element 1110 is a non-circular lens element, and distances between the center to outer rims of the first lens element 1110 would be different. Specifically, when a minimum distance from the center to the outer rim of the first lens element 1110 is Dmin, and a maximum distance from the center to the outer rim of the first lens element 1110 is Dmax, the following condition is satisfied: Dmin/Dmax<0.80. Therefore, it is favorable for reducing the size of the image capturing unit 20 in the direction parallel to Dmin so as to reduce the thickness of the electronic device 40.

Moreover, each of the image capturing units 20 and 20e can be a telephoto image capturing unit having a reflective element configuration. In detail, as shown in FIG. 25, the image capturing unit 20 further includes a reflective element REF, while the image capturing unit 20d includes no reflective element, such that the optical axis of the image capturing unit 20 is different from the optical axis of the image capturing unit 20d. Specifically, the optical axis of the image capturing unit 20 can be perpendicular to the optical axis of the image capturing unit 20d. Therefore, it is favorable for adjusting the optical axis according to different optical specifications so as to achieve compactness of the electronic device 40. The reflective element REF is a prism disposed on an object side of the first lens element 110. Specifically, the reflective element REF is disposed in the electronic device 40 and located between an imaged object (not shown) and the first lens element 110 along an optical path, but the present disclosure is not limited to the type, number and position of the reflective element. For example, the reflective element REF may be a mirror. In addition, the capturing unit 20e includes reflective elements REF and REF', while the image capturing unit 20f includes no reflective element, such that the optical axis of the image capturing unit 20e is different from the optical axis of the image capturing unit 20f. Specifically, the optical axis of the image capturing unit 20e can be perpendicular to the optical axis of the image capturing unit 20f. Therefore, it is favorable for adjusting the optical axis according to different optical specifications so as to achieve compactness of the electronic device 40. The reflective elements REF and REF' are prisms respectively disposed on an object side of the first lens element 110' and an image side of the sixth lens element 160'. Specifically, the reflective element REF is disposed in the electronic device 40 and located between an imaged object (not shown) and the first lens element 110' along an optical path, and the reflective element REF' is disposed in the electronic device 40 and located between the filter 170' and the image surface 180' along an optical path. Also, the reflective elements REF and REF' may also be mirrors. In this embodiment, the reflective element configuration of each of the image capturing unit 20 and 20e can be similar to, for example, one of the structures shown in FIG. 32 to FIG. 34 which can be referred to foregoing descriptions corresponding to FIG. 32 to FIG. 34 so the details in this regard will not be provided again. In addition, the image capturing units 20k and 20p can determine depth information of the imaged object. In this embodiment, the electronic device 40 includes multiple image capturing units 20, 20d, 20e, 20f, 20g, 20h, 20i, 20j, 20k, 20m, 20n and 20p, but the present disclosure is not limited to the number and arrangement of image capturing units. When a user captures images of an object, light rays converge in the image capturing unit 20, 20d, 20e, 20f, 20g, 20h, 20i, 20j, 20k, 20m, 20n or 20p to generate image(s), the flash module 41 is activated for light supplement, and the subsequent processing would be performed by an image processor, etc.

The smartphone in this embodiment is only exemplary for showing the image capturing unit 20 of the present disclosure installed in an electronic device, and the present disclosure is not limited thereto. The image capturing unit 20 can be optionally applied to optical systems with a movable focus. Furthermore, the optical image lens assembly of the image capturing unit 20 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image lens assembly comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;
    wherein the first lens element has positive refractive power, the object-side surface of the sixth lens element is convex in a paraxial region thereof, the image-side surface of the sixth lens element is concave in a paraxial region thereof, at least one of the object-side surface and the image-side surface of at least one lens element of the optical image lens assembly has at least one inflection point, and a thickness along an optical axis of the first lens element is a maximum value among thicknesses along the optical axis of all lens elements of the optical image lens assembly; and
    wherein a distance along the optical axis between the image-side surface of the sixth lens element and an image surface is BL, a distance along the optical axis between the object-side surface of the first lens element and the image-side surface of the sixth lens element is TD, an Abbe number of the fifth lens element is V5, an Abbe number of the sixth lens element is V6, a focal length of the optical image lens assembly is f, a focal length of the third lens element is f3, a curvature radius of the object-side surface of the sixth lens element is R11, a curvature radius of the image-side surface of the sixth lens element is R12, and the following conditions are satisfied:

$1.0 < BL/TD < 5.0;$ $0.10 < V5/V6 < 1.80;$ $-5.0 < f/f3 < 1.80$; and $-0.50 < (R11-R12)/(R11+R12) < 0.50$.

2. The optical image lens assembly of claim 1, wherein the object-side surface of the first lens element is convex in a paraxial region thereof, the second lens element has negative refractive power, and at least one of the object-side surface and the image-side surface of the sixth lens element has at least one inflection point.

3. The optical image lens assembly of claim 1, wherein an Abbe number of the first lens element is V1, an Abbe number of the second lens element is V2, an Abbe number of the third lens element is V3, an Abbe number of the fourth lens element is V4, the Abbe number of the fifth lens element is V5, the Abbe number of the sixth lens element is V6, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the i-th lens element is Ni, a minimum value of Vi/Ni is (Vi/Ni) min, and at least one lens element of the optical image lens assembly satisfies the following condition:

$3.0 < (Vi/Ni) \min < 12.0$, wherein $i=1,2,3,4,5$ or $6$.

4. The optical image lens assembly of claim 1, wherein a curvature radius of the image-side surface of the fifth lens element is R10, the curvature radius of the object-side surface of the sixth lens element is R11, and the following condition is satisfied:

$-0.10 < (R10+R11)/(R10-R11) < 1.30$.

5. The optical image lens assembly of claim 1, wherein the thickness along the optical axis of the first lens element is CT1, a maximum value among distances along the optical axis between each of all adjacent lens elements of the optical image lens assembly is ATmax, and the following condition is satisfied:

$1.0 < CT1/AT\max < 5.0$.

6. The optical image lens assembly of claim 1, wherein a distance along the optical axis between the object-side surface of the first lens element and the image surface is TL, the focal length of the optical image lens assembly is f, and the following condition is satisfied:

$0.70 < TL/f < 1.05$.

7. The optical image lens assembly of claim 1, wherein an entrance pupil diameter of the optical image lens assembly is EPD, a maximum effective radius of the object-side surface of the first lens element is Y11, and the following condition is satisfied:

$1.60 < EPD/Y11 < 2.10$.

8. The optical image lens assembly of claim 1, wherein an entrance pupil diameter of the optical image lens assembly is EPD, a sum of distances along the optical axis between each of all adjacent lens elements of the optical image lens assembly is ΣAT, and the following condition is satisfied:

$2.20 < EPD/\Sigma AT$.

9. The optical image lens assembly of claim 1, wherein the distance along the optical axis between the image-side surface of the sixth lens element and the image surface is BL, a maximum image height of the optical image lens assembly is ImgH, the focal length of the optical image lens assembly is f, and the following conditions are satisfied:

$2.0 < BL/\text{Img}H < 5.5$; and $2.6 < f/\text{Img}H < 15.0$.

10. The optical image lens assembly of claim 1, wherein a maximum image height of the optical image lens assembly is ImgH, a maximum field of view of the optical image lens assembly is FOV, and the following condition is satisfied:

$10.5 \text{ [mm]} < \text{Img}H/\tan(\text{FOV}) < 30.0 \text{ [mm]}$.

11. The optical image lens assembly of claim 1, wherein at least one lens element of the optical image lens assembly is a non-circular lens element;

wherein a minimum distance from a center to an outer rim of the non-circular lens element is Dmin, a maximum distance from the center to the outer rim of the non-circular lens element is Dmax, and the following condition is satisfied:

$D\min/D\max < 0.80$.

12. An image capturing unit, comprising:
the optical image lens assembly of claim 1; and
an image sensor disposed on the image surface of the optical image lens assembly, wherein the image sensor has at least 40 megapixels.

13. An electronic device, comprising at least two image capturing units which face a same side, wherein the at least two image capturing units comprise:
a first image capturing unit, comprising the optical image lens assembly of claim 1 and an image sensor that is disposed on the image surface of the optical image lens assembly, wherein the image sensor has a resolution of at least 40 megapixels, the first image capturing unit achieves an equivalent focal length between 80 mm and 150 mm with the resolution of the image sensor, and the first image capturing unit achieves an equivalent focal length between 200 mm and 500 mm with a portion of the resolution of the image sensor, which is at least eight megapixels; and
a second image capturing unit, comprising an optical lens assembly and an image sensor that is disposed on an image surface of the optical lens assembly;
wherein a maximum field of view of the first image capturing unit and a maximum field of view of the second image capturing unit differ by at least 20 degrees.

14. An optical image lens assembly comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;
wherein the first lens element has positive refractive power, the object-side surface of the sixth lens element is convex in a paraxial region thereof, the image-side surface of the sixth lens element is concave in a paraxial region thereof, and at least one of the object-side surface and the image-side surface of at least one lens element of the optical image lens assembly has at least one inflection point; and
wherein a distance along an optical axis between the image-side surface of the sixth lens element and an image surface is BL, a distance along the optical axis between the object-side surface of the first lens element and the image-side surface of the sixth lens element is TD, an Abbe number of the fifth lens element is V5, an Abbe number of the sixth lens element is V6, a focal length of the second lens element is f2, a focal length of the third lens element is f3, and the following conditions are satisfied:

0.70<$BL/TD$<5.0;

0.10<$V5/V6$<0.95; and

−0.70<$f2/f3$<300.0.

15. The optical image lens assembly of claim 14, wherein the object-side surface of the first lens element is convex in a paraxial region thereof, the second lens element has negative refractive power, and at least one of the object-side surface and the image-side surface of the sixth lens element has at least one inflection point.

16. The optical image lens assembly of claim 14, wherein the image-side surface of the second lens element is concave in a paraxial region thereof, the image-side surface of the fifth lens element is convex in a paraxial region thereof, and there is an air gap along the optical axis between each of all adjacent lens elements of the optical image lens assembly.

17. The optical image lens assembly of claim 14, wherein a minimum value among Abbe numbers of all lens elements of the optical image lens assembly is Vdmin, and the following condition is satisfied:

10.0<$Vd$min<21.0.

18. The optical image lens assembly of claim 14, wherein a sum of distances along the optical axis between each of all adjacent lens elements of the optical image lens assembly is ΣAT, the distance along the optical axis between the image-side surface of the sixth lens element and the image surface is BL, and the following condition is satisfied:

Σ$AT/BL$<0.30.

19. The optical image lens assembly of claim 14, wherein a maximum value among maximum effective radii of all lens surfaces of the optical image lens assembly is Ymax, a minimum value among maximum effective radii of all lens surfaces of the optical image lens assembly is Ymin, and the following condition is satisfied:

1.0<$Y$max/$Y$min<1.60.

20. The optical image lens assembly of claim 14, wherein a maximum image height of the optical image lens assembly is ImgH, and the following condition is satisfied:

4.50 [mm]<Img$H$<10.0 [mm].

21. The optical image lens assembly of claim 14, wherein an f-number of the optical image lens assembly is Fno, an entrance pupil diameter of the optical image lens assembly is EPD, and the following condition is satisfied:

25.0 [mm]<$Fno$×EPD<40.0 [mm].

22. The optical image lens assembly of claim 14, further comprising a reflective element.

23. An optical image lens assembly comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;

wherein the first lens element has positive refractive power, the object-side surface of the sixth lens element is convex in a paraxial region thereof, the image-side surface of the sixth lens element is concave in a paraxial region thereof, and at least one of the object-side surface and the image-side surface of at least one lens element of the optical image lens assembly has at least one inflection point; and wherein a distance along an optical axis between the image-side surface of the sixth lens element and an image surface is BL, a distance along the optical axis between the object-side surface of the first lens element and the image-side surface of the sixth lens element is TD, an Abbe number of the fifth lens element is V5, an Abbe number of the sixth lens element is V6, a focal length of the optical image lens assembly is f, a focal length of the third lens element is f3, and the following conditions are satisfied:

1.0<$BL/TD$<5.0;

0.10<$V5/V6$<0.95; and

−5.0<$f/f3$<0.72.

24. The optical image lens assembly of claim 23, wherein the image-side surface of the third lens element is concave in a paraxial region thereof; and wherein a thickness along the optical axis of the first lens element is CT1, a thickness along the optical axis of the second lens element is CT2, and the following condition is satisfied:

1.50<$CT1/CT2$<4.0.

25. The optical image lens assembly of claim 23, wherein a curvature radius of the object-side surface of the second lens element is R3, a curvature radius of the image-side surface of the second lens element is R4, and the following condition is satisfied:

0<($R3-R4$)/($R3+R4$)<1.80.

26. The optical image lens assembly of claim 23, wherein a maximum effective radius of the object-side surface of the first lens element is Y11, a maximum image height of the optical image lens assembly is ImgH, and the following condition is satisfied:

0.70<$Y11$/Img$H$<1.20.

27. The optical image lens assembly of claim 23, wherein half of a maximum field of view of the optical image lens assembly is HFOV, and the following condition is satisfied:

5.0 [deg.]<$HFOV$<15.0 [deg.].

28. The optical image lens assembly of claim 23, wherein a vertical distance between an inflection point on the object-side surface of the sixth lens element and the optical axis is Y61i, a vertical distance between an inflection point on the image-side surface of the sixth lens element and the optical axis is Y62i, and at least one inflection point on the object-side surface of the sixth lens element and at least one inflection point on the image-side surface of the sixth lens element satisfy the following condition:

0.70<$Y61i/Y62i$<1.50.

29. The optical image lens assembly of claim 23, wherein the first lens element has a maximum effective radius of the object-side surface and a maximum effective radius of the image-side surface thereof, and one of the maximum effective radii of the first lens element is a maximum value among maximum effective radii on the object-side surfaces and the image-side surfaces of all lens elements of the optical image lens assembly.

30. An electronic device, comprising at least two image capturing units which face a same side, wherein the at least two image capturing units comprise:
- a first image capturing unit, comprising:
  - an optical image lens assembly, comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;
  - wherein the first lens element has positive refractive power, and at least one of the object-side surface and the image-side surface of at least one lens element of the optical image lens assembly has at least one inflection point; and
  - wherein a minimum value among Abbe numbers of all lens elements of the optical image lens assembly is Vdmin, an f-number of the optical image lens assembly is Fno, an entrance pupil diameter of the optical image lens assembly is EPD, a maximum image height of the optical image lens assembly is ImgH, half of a maximum field of view of the optical image lens assembly is HFOV, and the following conditions are satisfied:

$10.0 < Vd\text{min} < 21.0$;

$27.0 \text{ [mm]} < Fno \times EPD < 40.0 \text{ [mm]}$;

$4.50 \text{ [mm]} < ImgH < 10.0 \text{ [mm]}$; and $5.0 \text{ [deg.]} < HFOV < 15.0 \text{ [deg.]}$; and

- an image sensor, wherein the image sensor is disposed on an image surface of the optical image lens assembly; the image sensor has a resolution of at least 40 megapixels, the first image capturing unit achieves an equivalent focal length between 80 mm and 150 mm with the resolution of the image sensor, and the first image capturing unit achieves an equivalent focal length between 200 mm and 500 mm with a portion of the resolution of the image sensor, which is at least eight megapixels; and
- a second image capturing unit, comprising an optical lens assembly and an image sensor that is disposed on an image surface of the optical lens assembly;
- wherein a maximum field of view of the first image capturing unit and a maximum field of view of the second image capturing unit differ by at least 20 degrees.

31. An electronic device, comprising at least two image capturing units which face a same side, wherein the at least two image capturing units comprise:
- a first image capturing unit, comprising:
  - an optical image lens assembly, comprising, in order from an object side to an image side along an optical path, a first lens element and a second lens element, and each of all lens elements of the optical image lens assembly having an object-side surface facing toward the object side and an image-side surface facing toward the image side;
  - wherein the first lens element has positive refractive power, the second lens element has negative refractive power, and at least one of the object-side surface and the image-side surface of at least one lens element of the optical image lens assembly has at least one inflection point; and
  - wherein a minimum value among Abbe numbers of all lens elements of the optical image lens assembly is Vdmin, an f-number of the optical image lens assembly is Fno, an entrance pupil diameter of the optical image lens assembly is EPD, a focal length of the optical image lens assembly is f, a maximum image height of the optical image lens assembly is ImgH, and the following conditions are satisfied:

$10.0 < Vd\text{min} < 21.0$;

$25.0 \text{ [mm]} < Fno \times EPD < 45.0 \text{ [mm]}$; and $3.5 < f/ImgH < 9.0$; and

- an image sensor, wherein the image sensor is disposed on an image surface of the optical image lens assembly, and the image sensor has a resolution of at least 40 megapixels; and
- a second image capturing unit, comprising an optical lens assembly and an image sensor that is disposed on an image surface of the optical lens assembly;
- wherein a maximum field of view of the first image capturing unit and a maximum field of view of the second image capturing unit differ by at least 20 degrees.

32. The electronic device of claim 31, wherein the object-side surface of the first lens element is convex in a paraxial region thereof, and the image-side surface of the second lens element is concave in a paraxial region thereof;
- wherein a maximum value among maximum effective radii of all lens surfaces of the optical image lens assembly is Ymax, a minimum value among maximum effective radii of all lens surfaces of the optical image lens assembly is Ymin, a maximum effective radius of the object-side surface of the first lens element is Y11, the maximum image height of the optical image lens assembly is ImgH, and the following conditions are satisfied:

$1.0 < Y\text{max}/Y\text{min} < 1.60$; and $0.70 < Y11/ImgH < 1.20$.

33. The electronic device of claim 31, further comprising a reflective element, wherein each of at least two lens elements of the optical image lens assembly is a non-circular lens element;
- wherein a minimum distance from a center to an outer rim of the non-circular lens element is Dmin, a maximum distance from the center to the outer rim of the non-circular lens element is Dmax, and the following condition is satisfied:

$D\text{min}/D\text{max} < 0.80$.

34. The electronic device of claim 31, wherein the optical image lens assembly comprises at least five lens elements, and the resolution of the image sensor of the first image capturing unit is at least 100 megapixels.

35. The electronic device of claim 31, wherein a ratio of an equivalent focal length of the first image capturing unit to an equivalent focal length of the second image capturing unit is larger than three.

36. The electronic device of claim 31, wherein an optical axis of the first lens element and the second lens element of the first image capturing unit is perpendicular to an optical axis of the optical lens assembly of the second image capturing unit.

37. The electronic device of claim 31, wherein the first image capturing unit achieves an equivalent focal length between 80 mm and 150 mm with the resolution of the image sensor, and the first image capturing unit achieves an equivalent focal length between 200 mm and 500 mm with a portion of the resolution of the image sensor, which is at least eight megapixels.

* * * * *